United States Patent [19]
O'Connor et al.

[11] Patent Number: 6,026,485
[45] Date of Patent: *Feb. 15, 2000

[54] INSTRUCTION FOLDING FOR A STACK-BASED MACHINE

[75] Inventors: James Michael O'Connor, Mountain View; Marc Tremblay, Palo Alto, both of Calif.

[73] Assignee: Sun Microsystems, Inc., Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/786,351

[22] Filed: Jan. 23, 1997

Related U.S. Application Data

[63] Continuation-in-part of application No. 08/643,984, May 7, 1996, abandoned
[60] Provisional application No. 60/010,527, Jan. 24, 1996.

[51] Int. Cl.[7] .................................................. G06F 9/38
[52] U.S. Cl. ......................... 712/226; 712/26; 712/202; 712/209; 712/217; 395/709
[58] Field of Search ..................................... 395/567, 393, 395/704, 709, 385, 800.26; 712/226, 26, 202, 209, 217

[56] References Cited

U.S. PATENT DOCUMENTS

| | | | |
|---|---|---|---|
| 4,439,828 | 3/1984 | Martin | 395/567 |
| 5,187,793 | 2/1993 | Keith et al. | 395/775 |
| 5,313,614 | 5/1994 | Goettelman et al. | 395/500 |
| 5,359,507 | 10/1994 | Egami | 364/140.06 |
| 5,367,650 | 11/1994 | Sharangpani et al. | 395/375 |
| 5,479,643 | 12/1995 | Bhasker et al. | 395/500 |
| 5,499,352 | 3/1996 | Clift et al. | 395/393 |
| 5,522,051 | 5/1996 | Sharangpani | 395/378 |
| 5,524,262 | 6/1996 | Colwell et al. | 395/800.23 |
| 5,581,183 | 12/1996 | Lindstedt et al. | 324/309 |
| 5,596,732 | 1/1997 | Hosoi | 395/709 |
| 5,600,726 | 2/1997 | Morgan et al. | 380/49 |
| 5,634,118 | 5/1997 | Blomgren | 395/567 |
| 5,657,486 | 8/1997 | Czamara et al. | 395/595 |
| 5,699,537 | 12/1997 | Sharangpani et al. | 395/393 |
| 5,740,441 | 4/1998 | Yellin et al. | 395/704 |
| 5,862,370 | 1/1999 | Dockser | 395/567 |

FOREIGN PATENT DOCUMENTS

| | | |
|---|---|---|
| 0 011 442 A1 | 5/1980 | European Pat. Off. . |
| 0 071 028 A2 | 2/1983 | European Pat. Off. . |
| WO 94/27214 A1 | 11/1994 | WIPO . |

OTHER PUBLICATIONS

Hamacher et al. (Computer Organization) McGrow–Hill, Inc. pp. 103–114, Jun. 1984.

Hunter, "Compilers: their design and construction using Pascal", Wiley, 1985, pp. 213–214.

(List continued on next page.)

*Primary Examiner*—Meng-Ai T. An
*Assistant Examiner*—Gautam R. Patel
*Attorney, Agent, or Firm*—Skjerven, Morrill, MacPherson, Franklin & Friel, LLP

[57] ABSTRACT

An instruction decoder allows the folding away of JAVA virtual machine instructions pushing an operand onto the top of a stack merely as a precursor to a second JAVA virtual machine instruction which operates on the top of stack operand. Such an instruction decoder identifies foldable instruction sequences and supplies an execution unit with a single equivalent folded operation thereby reducing processing cycles otherwise required for execution of multiple operations corresponding to the multiple instructions of the folded instruction sequence. Instruction decoder embodiments described herein provide for folding of two, three, four, or more instruction folding. For example, in one instruction decoder embodiment described herein, two load instructions and a store instruction can be folded into execution of operation corresponding to an instruction appearing therebetween in the instruction sequence.

26 Claims, 15 Drawing Sheets

OTHER PUBLICATIONS

Peter Wayner, *Sun Gambles on Java Chips*, Nov. 1996, *Byte*, vol. 21, No. 11, pp. 79, 80, 82, 84, 86 & 88.

Brian Case, *Java Performance Advancing Rapidly Just–In–Time Compilers Show Java Can Compete with Compiled Code*, May 27, 1997, *Microdesign Resources*, pp. 17–19.

Sun Microsystems, Inc., *Sun Microelectronics' picoJava™ I Posts Outstanding Performance*, 1996 (WPR–0015–01) (4 pages).

Sun Microstystems, Inc., *picojava™ I Microprocessor Core Architecture*, 1996, (WPR–0014–01) (7 pages).

Sun Microsystems, Inc., *Sun Unveils Java Processors*, 1996, (News Release #95–042) (2 pages).

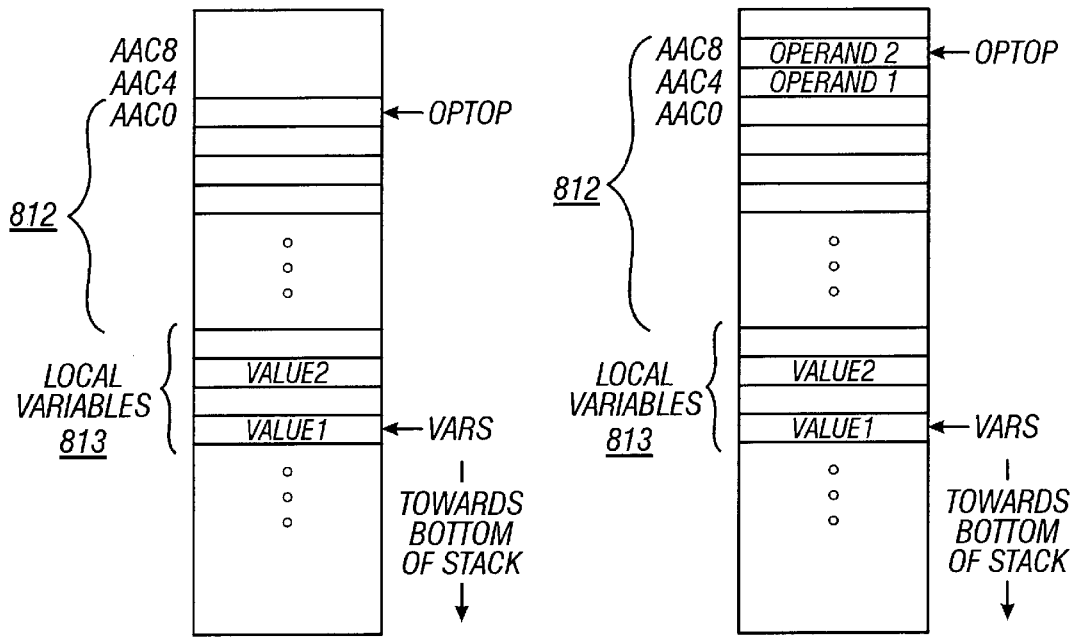
FIG. 9A        FIG. 9B
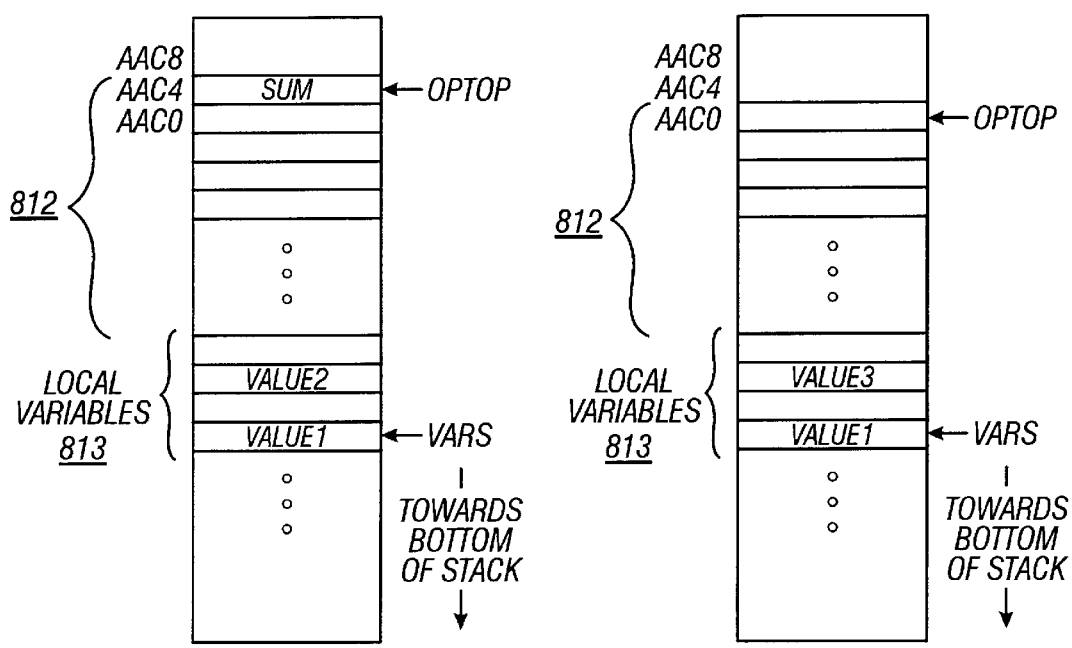
FIG. 9C        FIG. 9D

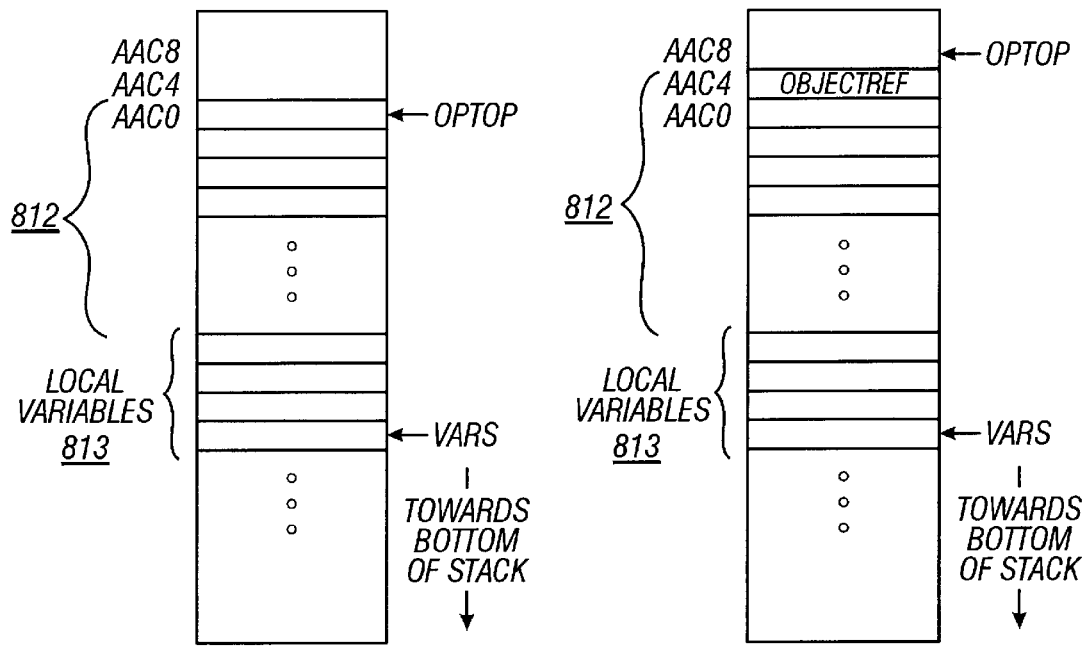
FIG. 10A
FIG. 10B
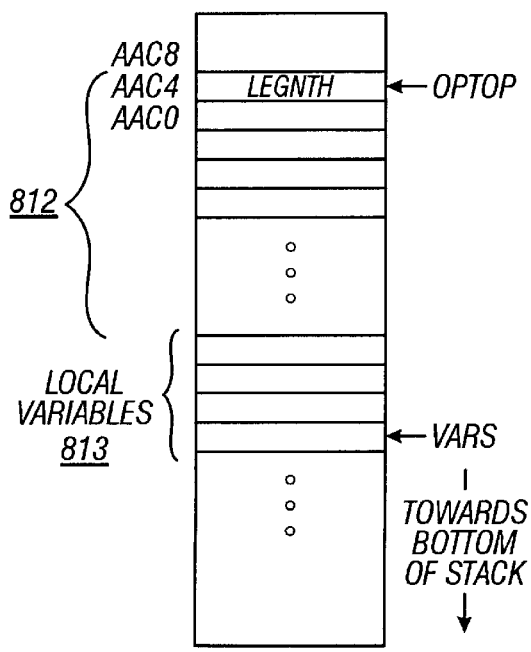
FIG. 10C

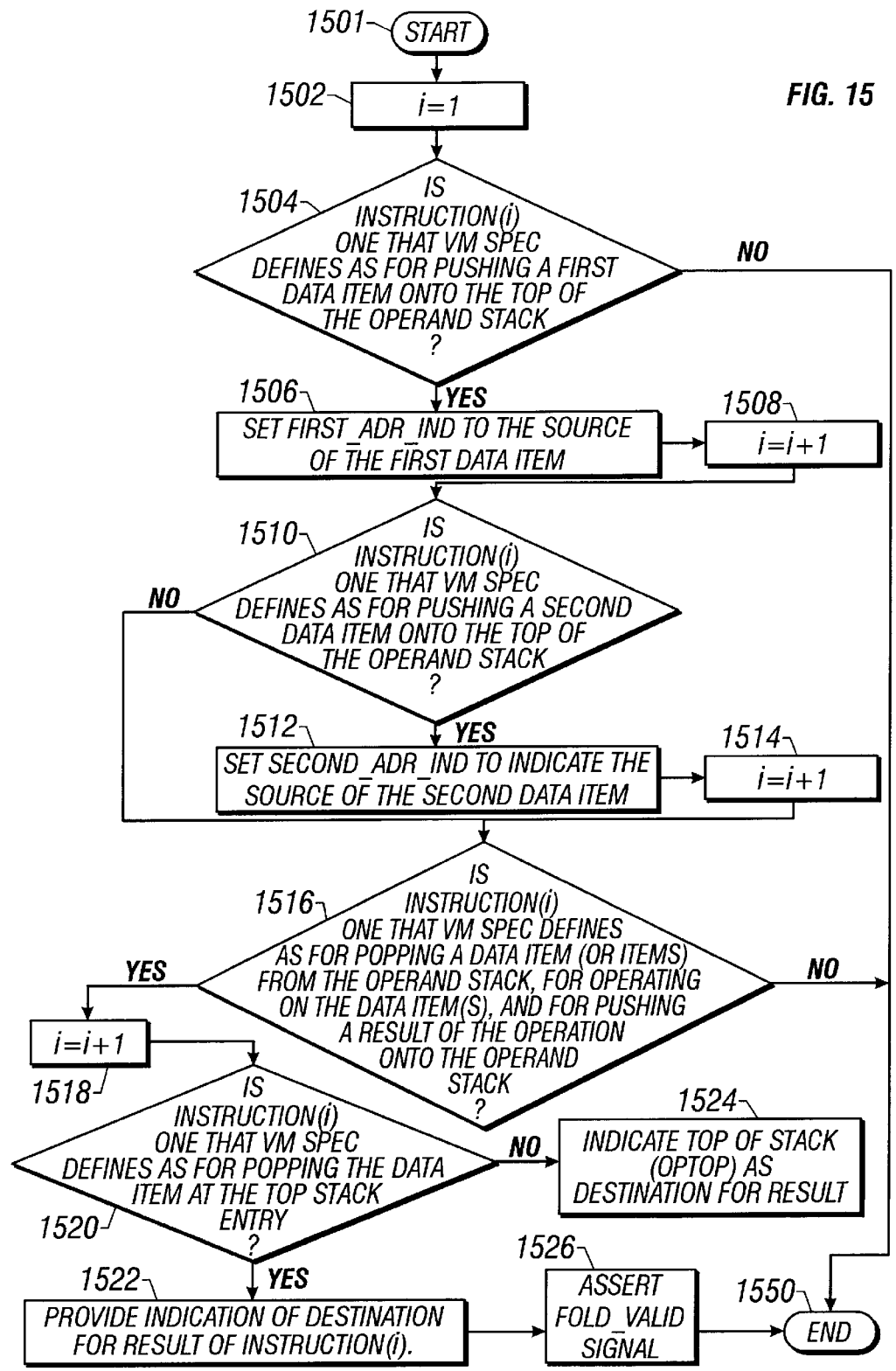

INSTRUCTION FOLDING FOR A STACK-BASED MACHINE

RELATED APPLICATIONS

This application claims the benefit of U.S. Provisional Application No. 60/010,527, filed Jan. 24, 1996, entitled "METHODS AND APPARATUSES FOR IMPLEMENTING THE JAVA VIRTUAL MACHINE" (JAVA is a trademark of Sun Microsystems, Inc.) and naming Marc Tremblay, James Michael O'Connor, Robert Garner, and William N. Joy as inventors, and is a continuation-in-part application of U.S. application Ser. No. 08/643,984, now abandoned, filed May 7, 1996, entitled "METHOD AND APPARATUS FOR INSTRUCTION FOLDING FOR A STACK-BASED TYPE PROCESSOR" and naming James Michael O'Connor and Marc Tremblay as inventors that also claimed the benefit of U.S. Provisional Application No. 60/010,527, filed Jan. 24, 1996, entitled "METHODS AND APPARATUSES FOR IMPLEMENTING THE JAVA VIRTUAL MACHINE" and naming Marc Tremblay, James Michael O'Connor, Robert Gamer, and William N. Joy as inventors.

REFERENCE TO APPENDIX I

A portion of the disclosure of this patent document including Section I, The JAVA Virtual Machine Specification and Section A thereto, contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

The present invention relates to instruction decoders for a stack machine, and in particular, to methods and apparati for folding a sequence of multiple instructions into a single folded operation.

2. Description of the Related Art

Many individuals and organizations in the computer and communications industries tout the Internet as the fastest growing market on the planet. In the 1990s, the number of users of the Internet appears to be growing exponentially with no end in sight. In June of 1995, an estimated 6,642,000 hosts were connected to the Internet; this represented an increase from an estimated 4,852,000 hosts in January, 1995. The number of hosts appears to be growing at around 75% per year. Among the hosts, there were approximately 120,000 networks and over 27,000 web servers. The number of web servers appears to be approximately doubling every 53 days.

In July 1995, with over 1,000,000 active Internet users, over 12,505 usenet news groups, and over 10,000,000 usenet readers, the Internet appears to be destined to explode into a very large market for a wide variety of information and multimedia services.

In addition, to the public carrier network or Internet, many corporations and other businesses are shifting their internal information systems onto an intranet as a way of more effectively sharing information within a corporate or private network. The basic infrastructure for an intranet is an internal network connecting servers and desktops, which may or may not be connected to the Internet through a firewall. These intranets provide services to desktops via standard open network protocols which are well established in the industry. Intranets provide many benefits to the enterprises which employ them, such as simplified internal information management and improved internal communication using the browser paradigm. Integrating Internet technologies with a company's enterprise infrastructure and legacy systems also leverages existing technology investment for the party employing an intranet. As discussed above, intranets and the Internet are closely related, with intranets being used for internal and secure communications within the business and the Internet being used for external transactions between the business and the outside world. For the purposes of this document, the term "networks" includes both the Internet and intranets. However, the distinction between the Internet and an intranet should be born in mind where applicable.

In 1990, programmers at Sun Microsystems wrote a universal programming language. This language was eventually named the JAVA programming language. (JAVA is a trademark of Sun Microsystems of Mountain View, Calif.) The JAVA programming language resulted from programming efforts which initially were intended to be coded in the C++ programming language; therefore, the JAVA programming language has many commonalities with the C++ programming language. However, the JAVA programming language is a simple, object-oriented, distributed, interpreted yet high performance, robust yet safe, secure, dynamic, architecture neutral, portable, and multi-threaded language.

The JAVA programming language has emerged as the programming language of choice for the Internet as many large hardware and software companies have licensed it from Sun Microsystems. The JAVA programming language and environment is designed to solve a number of problems in modern programming practice. The JAVA programming language omits many rarely used, poorly understood, and confusing features of the C++ programming language. These omitted features primarily consist of operator overloading, multiple inheritance, and extensive automatic coercions. The JAVA programming language includes automatic garbage collection that simplifies the task of programming because it is no longer necessary to allocated and free memory as in the C programming language. The JAVA programming language restricts the use of pointers as defined in the C programming language, and instead has true arrays in which array bounds are explicitly checked, thereby eliminating vulnerability to many viruses and nasty bugs. The JAVA programming language includes objective-C interfaces and specific exception handlers.

The JAVA programming language has an extensive library of routines for coping easily with TCP/IP protocol (Transmission Control Protocol based on Internet protocol), HTTP (Hypertext Transfer Protocol) and FTP (File Transfer Protocol). The JAVA programming language is intended to be used in networked/distributed environments. The JAVA programming language enabled the construction of virus-free, tamper-free systems. The authentication techniques are based on public-key encryption.

SUMMARY OF THE INVENTION

A JAVA virtual machine is an stack-oriented abstract computing machine, which like a physical computing machine has an instruction set and uses various storage areas. A JAVA virtual machine need not understand the JAVA programming language; instead it understands a class file format. A class file includes JAVA virtual machine instructions (or bytecodes) and a symbol table, as well as other ancillary information. Programs written in the JAVA programming language (or in other languages) may be compiled to produce a sequence of JAVA virtual machine instructions.

Typically, in a stack-oriented machine, instructions typically operate on data at the top of an operand stack. One or more first instructions, such as a load from local variable instruction, are executed to push operand data onto the operand stack as a precursor to execution of an instruction which immediately follows such instruction(s). The instruction which follows, e.g., an add operation, pops operand data from the top of the stack, operates on the operand data, and pushes a result onto the operand stack, replacing the operand data at the top of the operand stack.

A suitably configured instruction decoder allows the folding away of instructions pushing an operand onto the top of a stack merely as a precursor to a second instruction which operates on the top of stack operand. The instruction decoder identifies foldable instruction sequences (typically 2, 3, or 4 instructions) and supplies an execution unit with an equivalent folded operation (typically a single operation) thereby reducing processing cycles otherwise required for execution of multiple operations corresponding to the multiple instructions of the folded instruction sequence. Using an instruction decoder in accordance with the present invention, multiple load instructions and a store instruction can be folded into execution of an instruction appearing therebetween in the instruction sequence. For example, an instruction sequence including a pair of load instructions (for loading integer operands from local variables to the top of stack), an add instruction (for popping the integer operands of the stack, adding them, and placing the result at the top of stack), and an store instruction (for popping the result from the stack and storing the result in a local variable) can be folded into a single equivalent operation specifying source and destination addresses in stack and local variable storage which are randomly accessible.

In accordance with an embodiment of the present invention, an apparatus includes an instruction store, an operand stack, a data store, an execution unit, and an instruction decoder. The instruction decoder is coupled to the instruction store to identify a foldable sequence of instructions represented therein. The foldable sequence includes first and second instructions, in which the first instruction is for pushing a first operand value onto the operand stack from the data store merely as a first source operand for a second instruction. The instruction decoder coupled to supply the execution unit with a single folded operation equivalent to the foldable sequence and including a first operand address identifier selective for the first operand value in the data store, thereby obviating an explicit operation corresponding to the first instruction.

In a further embodiment, if the sequence of instructions represented in the instruction buffer is not a foldable sequence, the instruction decoder supplies the execution unit with an operation identifier and operand address identifier corresponding to the first instruction only.

In another further embodiment, the instruction decoder further identifies a third instruction in the foldable sequence. This third instruction is for pushing a second operand value onto the operand stack from the data store merely as a second source operand for the second instruction. The single folded operation is equivalent to the foldable sequence and includes a second operand address identifier selective for the second operand value in the data store, thereby obviating an explicit operation corresponding to the third instruction.

In yet another further embodiment, the instruction decoder further identifies a fourth instruction in the foldable sequence. This fourth instruction is for popping a result of the second instruction from the operand stack and storing the result in a result location of the data store. The single folded operation is equivalent to the foldable sequence and includes a destination address identifier selective for the result location in the data store, thereby obviating an explicit operation corresponding to the fourth instruction.

In still yet another further embodiment, the instruction decoder includes normal and folded decode paths and switching means. The switching means are responsive to the folded decode path for selecting operation, operand, and destination identifiers from the folded decode path in response to a fold indication therefrom, and for otherwise selecting operation, operand, and destination identifiers from the normal decode path.

In various further alternative embodiments, the apparatus is for a virtual machine instruction processor wherein instructions generally source operands from, and target a result to, uppermost entries of an operand stack. In one such alternative embodiment, the virtual machine instruction processor is a hardware virtual machine instruction processor and the instruction decoder includes decode logic. In another, the virtual machine instruction processor includes a just-in-time compiler implementation and the instruction decoder includes software executable on a hardware processor. The hardware processor includes the execution unit. In yet another, the virtual machine instruction processor includes a bytecode interpreter implementation and the instruction decoder including software executable on a hardware processor. The hardware processor includes the execution unit.

In accordance with another embodiment of the present invention, a method includes (a) determining if a first instruction of a virtual machine instruction sequence is an instruction for pushing a first operand value onto the operand stack from a data store merely as a first source operand for a second instruction; and if the result of the (a) determining is affirmative, supplying an execution unit with a single folded operation equivalent to a foldable sequence comprising the first and second instructions. The single folded operation includes a first operand identifier selective for the first operand value, thereby obviating an explicit operation corresponding to the first instruction.

In a further embodiment, the method includes supplying, if the result of the (a) determining is negative, the execution unit with an operation equivalent to the first instruction in the virtual machine instruction sequence.

In another further embodiment, the method includes (b) determining if a third instruction of the virtual machine instruction sequence is an instruction for popping a result value of the second instruction from the operand stack and storing the result value in a result location of the data store and, if the result of the (b) determining is affirmative, further including a result identifier selective for the result location with the equivalent single folded operation, thereby further obviating an explicit operation corresponding to the third instruction. In a further embodiment, the method includes including, if the result of the (b) determining is negative, a result identifier selective for a top location of the operand stack with the equivalent single folded operation. In certain embodiments, the (a) determining and the (b) determining are performed substantially in parallel.

In accordance with yet another embodiment of the present invention, a stack-based virtual machine implementation includes a randomly-accessible operand stack representation, a randomly-accessible local variable storage representation, and a virtual machine instruction decoder for selectively decoding virtual machine instructions and folding together a selected sequence thereof to eliminate unnecessary temporary storage of operands on the operand stack.

In various alternative embodiments, the stack-based virtual machine implementation (1) is a hardware virtual machine instruction processor including a hardware stack cache, a hardware instruction decoder, and an execution unit or (2) includes software encoded in a computer readable medium and executable on a hardware processor. In the hardware virtual machine instruction processor embodiment, (a) the randomly-accessible operand stack local variable storage representations at least partially reside in the hardware stack cache, and (b) the virtual machine instruction decoder includes the hardware instruction decoder coupled to provide the execution unit with opcode, operand, and result identifiers respectively selective for a hardware virtual machine instruction processor operation and for locations in the hardware stack cache as a single hardware virtual machine instruction processor operation equivalent to the selected sequence of virtual machine instructions. In the software embodiment, (a) the randomly-accessible operand stack local variable storage representations at least partially reside in registers of the hardware processor, (b) the virtual machine instruction decoder is at least partially implemented in the software, and (c) the virtual machine instruction decoder is coupled to provide opcode, operand, and result identifiers respectively selective for a hardware processor operation and for locations in the registers as a single hardware processor operation equivalent to the selected sequence of virtual machine instructions.

In accordance with still yet another embodiment of the present invention, a hardware virtual machine instruction decoder includes a normal decode path, a fold decode path, and switching means. The fold decode path is for decoding a sequence of virtual machine instructions and, if the sequence is foldable, supplying (a) a single operation identifier, (b) one or more operand identifiers; and (c) a destination identifier, which are together equivalent to the sequence of virtual machine instructions. The switching means is responsive to the folded decode path for selecting operation, operand, and destination identifiers from the folded decode path in response to a fold indication therefrom, and otherwise selecting operation, operand, and destination identifiers from the normal decode path.

BRIEF DESCRIPTION OF THE DRAWINGS

The present invention may be better understood, and its numerous objects, features, and advantages made apparent to those skilled in the art by referencing the accompanying drawings.

FIGS. 9A–D illustrate an iload (integer load)/ iadd (integer add)/ istore (integer store) instruction sequence operating on an operand stack and local variable storage. FIGS. 9A, 9B, 9C, and 9D, respectively depict operand stack contents before iload instructions, after iload instructions but before an iadd instruction, after the iadd instruction but before an istore instruction, and after the istore instruction. Intermediate stages depicted in FIGS. 9B and 9C are eliminated by instruction folding in accordance with an exemplary embodiment of the present invention.

FIGS. 10A, 10B and 10C illustrate an aload (object reference load)/ arraylength (integer add) instruction sequence operating on the operand stack and local variable storage. FIGS. 9A, 9B, and 9C, respectively depict operand stack contents before the load instruction, after the aload instruction but before an arraylength instruction (without instruction folding), and after the arraylength instruction. The intermediate stage depicted in FIG. 10B is eliminated by instruction folding in accordance with an exemplary embodiment of the present invention.

FIG. 15 is a flow chart depicting an exemplary sequence of operations for identifying a foldable instruction sequence in accordance with an exemplary embodiment of the present invention.

Like or similar features may be designated by the same reference numeral(s) throughout the drawings.

DESCRIPTION OF THE PREFERRED EMBODIMENT(S)

Figure 1:
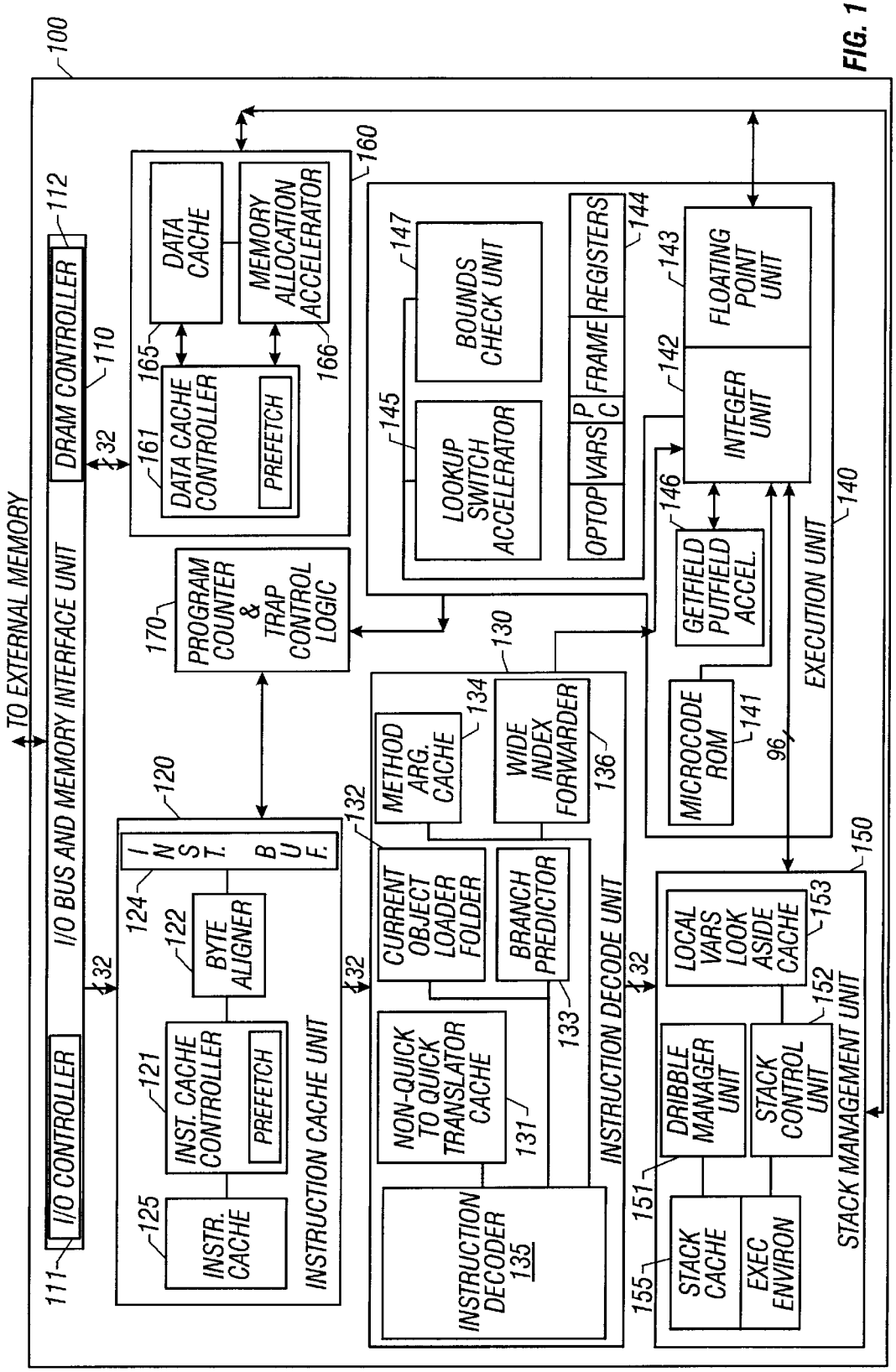
FIG. 1 is a block diagram of one embodiment of virtual machine hardware processor that includes an instruction decoder for providing instruction folding in accordance with this invention.

FIG. 1 illustrates one embodiment of a virtual machine instruction hardware processor 100, hereinafter hardware processor 100, that includes an instruction decoder 135 for folding a sequence of multiple instructions into a single folded operation in accordance with the present invention, and that directly executes virtual machine instructions that are processor architecture independent. The performance of hardware processor 100 in executing virtual machine instructions is much better than high-end CPUs, such as the Intel PENTIUM microprocessor or the Sun Microsystems ULTRASPARC processor, (ULTRASPARC is a trademark of Sun Microsystems of Mountain View, Calif., and PENTIUM is a trademark of Intel Corp. of Sunnyvale, Calif.) interpreting the same virtual machine instructions with a software JAVA interpreter. or with a JAVA just-in-time compiler; is low cost; and exhibits low power consumption. As a result, hardware processor 100 is well suited for portable applications. Hardware processor 100 provides similar advantages for other virtual machine stack-based architectures as well as for virtual machines utilizing features such as garbage collection, thread synchronization, etc.

In view of these characteristics, a system based on hardware processor 100 presents attractive price for performance characteristics, if not the best overall performance, as compared with alternative virtual machine execution environments including software interpreters and just-in-time compilers. Nonetheless, the present invention is not limited to virtual machine hardware processor embodiments, and encompasses any suitable stack-based, or non-stack-based, machine implementations, including implementations emulating the JAVA virtual machine as a software interpreter, compiling JAVA virtual machine instructions (either in batch or just-in-time) to machine instruction native to a particular hardware processor, or providing hardware implementing the JAVA virtual machine in microcode, directly in silicon, or in some combination thereof.

Regarding price for performance characteristics, hardware processor 100 has the advantage that the 250 Kilobytes to 500 Kilobytes (Kbytes) of memory storage, e.g., read-only memory or random access memory, typically required by a software interpreter, is eliminated. A simulation of hardware processor 100 showed that hardware processor 100 executes virtual machine instructions twenty times faster than a software interpreter running on a variety of applications on a PENTIUM processor clocked at the same clock rate as hardware processor 100, and executing the same virtual machine instructions. Another simulation of hardware processor 100 showed that hardware processor 100 executes virtual machine instructions five times faster than a just-in-time compiler running on a PENTIUM processor running at the same clock rate as hardware processor 100, and executing the same virtual machine instructions.

In environments in which the expense of the memory required for a software virtual machine instruction interpreter is prohibitive, hardware processor 100 is advantageous. These applications include, for example, an Internet chip for network appliances, a cellular telephone processor, other telecommunications integrated circuits, or other low-power, low-cost applications such as embedded processors, and portable devices.

Instruction decoder 135, as described herein, allows the folding away of JAVA virtual machine instructions pushing an operand onto the top of a stack merely as a precursor to a second JAVA virtual machine instruction which operates on the top of stack operand. Such an instruction decoder identifies foldable instruction sequences and supplies an execution unit with a single equivalent folded operation thereby reducing processing cycles otherwise required for execution of multiple operations corresponding to the multiple instructions of the folded instruction sequence. Instruction decoder embodiments described herein provide for folding of two, three, four, or more instruction folding. For example, in one instruction decoder embodiment described herein, two load instructions and a store instruction can be folded into execution of operation corresponding to an instruction appearing therebetween in the instruction sequence.

As used in herein, a virtual machine is an abstract computing machine that, like a real computing machine, has an instruction set and uses various memory areas. A virtual machine specification defines a set of processor architecture independent virtual machine instructions that are executed by a virtual machine implementation, e.g., hardware processor 100. Each virtual machine instruction defines a specific operation that is to be performed. The virtual computing machine need not understand the computer language that is used to generate virtual machine instructions or the underlying implementation of the virtual machine. Only a particular file format for virtual machine instructions needs to be understood. In an exemplary embodiment, the virtual machine instructions are JAVA virtual machine instructions. Each JAVA virtual machine instruction includes one or more bytes that encode instruction identfying information, operands, and any other required information.

Section I, which is incorporated herein by reference in its entirety, includes an illustrative set of the JAVA virtual machine instructions. The particular set of virtual machine instructions utilized is not an essential aspect of this invention. In view of the virtual machine instructions in Section I and this disclosure, those of skill in the art can modify the invention for a particular set of virtual machine instructions, or for changes to the JAVA virtual machine specification.

Figure 2:
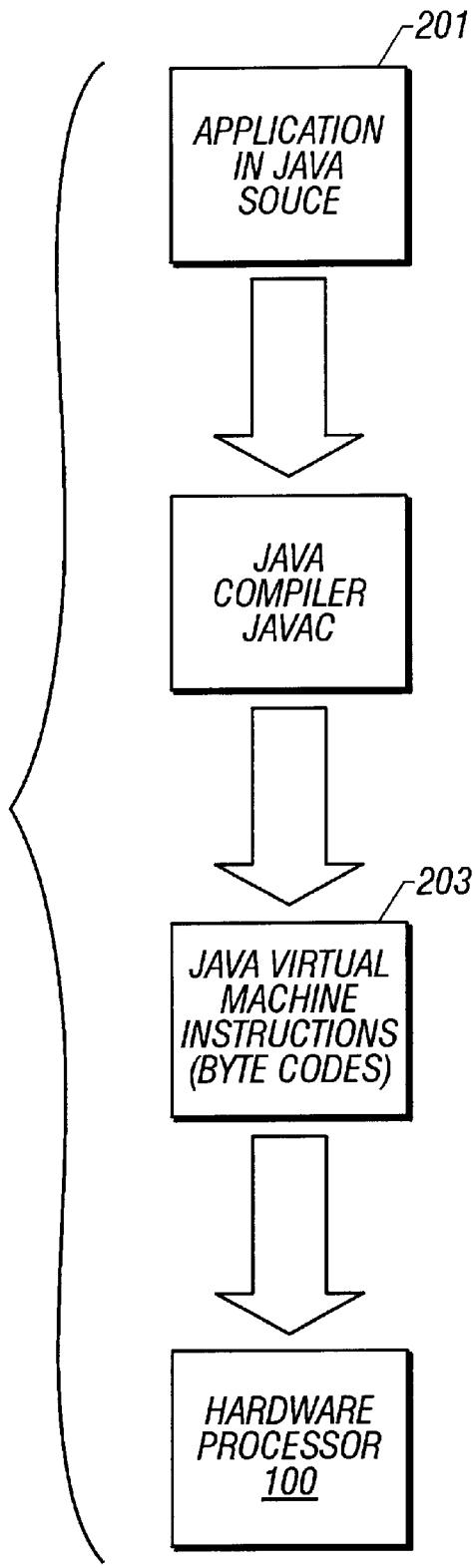
FIG. 2 is an process flow diagram for generation of virtual machine instructions that are used in one embodiment of this invention.

A JAVA compiler JAVAC, (FIG. 2) that is executing on a computer platform, converts an application 201 written in the JAVA computer language to an architecture neutral object file format encoding a compiled instruction sequence 203, according to the JAVA Virtual Machine Specification, that includes a compiled instruction set. However, for this invention, only a source of virtual machine instructions and related information is needed. The method or technique used to generate the source of virtual machine instructions and related information is not essential to this invention.

Compiled instruction sequence 203 is executable on hardware processor 100 as well as on any computer platform that implements the JAVA virtual machine using, for example, a software interpreter or just-in-time compiler. However, as described above, hardware processor 100 provides significant performance advantages over the software implementations.

In this embodiment, hardware processor 100 (FIG. 1) processes the JAVA virtual machine instructions, which include bytecodes. Hardware processor 100, as explained more completely below, executes directly most of the bytecodes. However, execution of some of the bytecodes is implemented via microcode.

One strategy for selecting virtual machine instructions that are executed directly by hardware processor 100 is described herein by way of an example. Thirty percent of the JAVA virtual machine instructions are pure hardware translations; instructions implemented in this manner include constant loading and simple stack operations. The next 50% of the virtual machine instructions are implemented mostly, but not entirely, in hardware and require some firmware assistance; these include stack based operations and array instructions. The next 10% of the JAVA virtual machine instructions are implemented in hardware, but require significant firmware support as well; these include function invocation and function return. The remaining 10% of the JAVA virtual machine instructions are not supported in hardware, but rather are supported by a firmware trap and/or microcode; these include functions such as exception handlers. Herein, firmware means microcode stored in ROM that when executed controls the operations of hardware processor 100.

In one embodiment, hardware processor 100 includes an I/O bus and memory interface unit 110, an instruction cache unit 120 including instruction cache 125, an instruction decode unit 130, a unified execution unit 140, a stack management unit 150 including stack cache 155, a data cache unit 160 including a data cache 165, and program counter and trap control logic 170. Each of these units is described more completely below.

Also, as illustrated in FIG. 1, each unit includes several elements. For clarity and to avoid distracting from the invention, the interconnections between elements within a unit are not shown in FIG. 1. However, in view of the following description, those of skill in the art will understand the interconnections and cooperation between the elements in a unit and between the various units.

The pipeline stages implemented using the units illustrated in FIG. 1 include fetch, decode, execute, and write-back stages. If desired, extra stages for memory access or exception resolution are provided in hardware processor 100.

Figure 3:
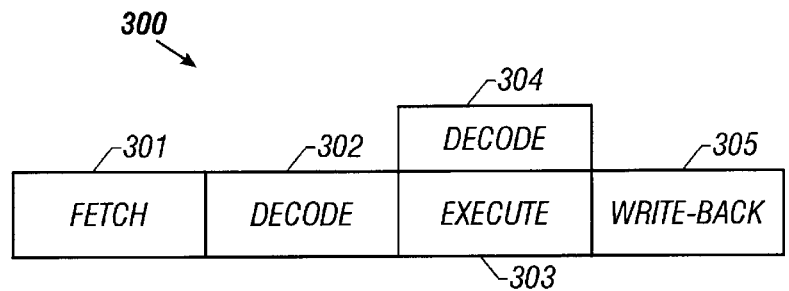
FIG. 3 illustrates an instruction pipeline implemented in the hardware processor of FIG. 1.

FIG. 3 is an illustration of a four stage pipeline for execution of instructions in the exemplary embodiment of processor 100. In fetch stage 301, a virtual machine instruction is fetched and placed in instruction buffer 124 (FIG. 1). The virtual machine instruction is fetched from one of (i) a fixed size cache line from instruction cache 125 or (ii) microcode ROM 141 in execution unit 140.

With regard to fetching, aside from instructions tableswitch and lookupswitch, (See Section I.) each virtual machine instruction is between one and five bytes long. Thus, to keep things simple, at least forty bits are required to guarantee that all of a given instruction is contained in the fetch.

Another alternative is to always fetch a predetermined number of bytes, for example, four bytes, starting with the opcode. This is sufficient for 95% of JAVA virtual machine instructions (See Section I). For an instruction requiring more than three bytes of operands, another cycle in the front end must be tolerated if four bytes are fetched. In this case, the instruction execution can be started with the first operands fetched even if the full set of operands is not yet available.

In decode stage 302 (FIG. 3), the virtual machine instruction at the front of instruction buffer 124 (FIG. 1) is decoded and instruction folding is performed if possible. Stack cache 155 is accessed only if needed by the virtual machine instruction. Register OPTOP, that contains a pointer OPTOP to a top of a stack 400 (FIG. 4), is also updated in decode stage 302 (FIG. 3).

Herein, for convenience, the value in a register and the register are assigned the same reference numeral. Further, in the following discussion, use of a register to store a pointer is illustrative only of one embodiment. Depending on the specific implementation of the invention, the pointer may be implemented using hardware register, a hardware counter, a software counter, a software pointer, or other equivalent embodiments known to those of skill in the art. The particular implementation selected is not essential to the invention, and typically is made based on a price to performance trade-off.

In execute stage 303, the virtual machine instruction is executed for one or more cycles. Typically, in execute stage 303, an ALU in integer unit 142 (FIG. 1) is used either to do an arithmetic computation or to calculate the address of a load or store from data cache unit (DCU) 160. If necessary, traps are prioritized and taken at the end of execute stage 303 (FIG. 3). For control flow instructions, the branch address is calculated in execute stage 303, as well as the condition upon which the branch is dependent.

Cache stage 304 is a non-pipelined stage. Data cache 165 (FIG. 1) is accessed if needed during execution stage 303 (FIG. 3). The reason that stage 304 is non-pipelined is because hardware processor 100 is a stack-based machine. Thus, the instruction following a load is almost always dependent on the value returned by the load. Consequently, in this embodiment, the pipeline is held for one cycle for a data cache access. This reduces the pipeline stages, and the die area taken by the pipeline for the extra registers and bypasses.

Write-back stage 305 is the last stage in the pipeline. In stage 305, the calculated data is written back to stack cache 155.

Hardware processor 100, in this embodiment, directly implements a stack 400 (FIG. 4A) that supports the JAVA virtual machine stack-based architecture (See Section I). Sixty-four entries on stack 400 are contained on stack cache 155 in stack management unit 150. Some entries in stack 400 may be duplicated on stack cache 150. Operations on data are performed through stack cache 155.

Stack 400 of hardware processor 100 is primarily used as a repository of information for methods. At any point in time, hardware processor 100 is executing a single method. Each method has memory space, i.e., a method frame on stack 400, allocated for a set of local variables, an operand stack, and an execution environment structure.

A new method frame, e.g., method frame two 410, is allocated by hardware processor 100 upon a method invocation in execution stage 303 (FIG. 3) and becomes the current frame, i.e., the frame of the current method. Current frame 410 (FIG. 4A), as well as the other method frames, may contain a part of or all of the following six entities, depending on various method invoking situations:

1. Object reference;
2. Incoming arguments;
3. Local variables;
4. Invoker's method context;
5. Operand stack; and
6. Return value from method.

Figure 4A:
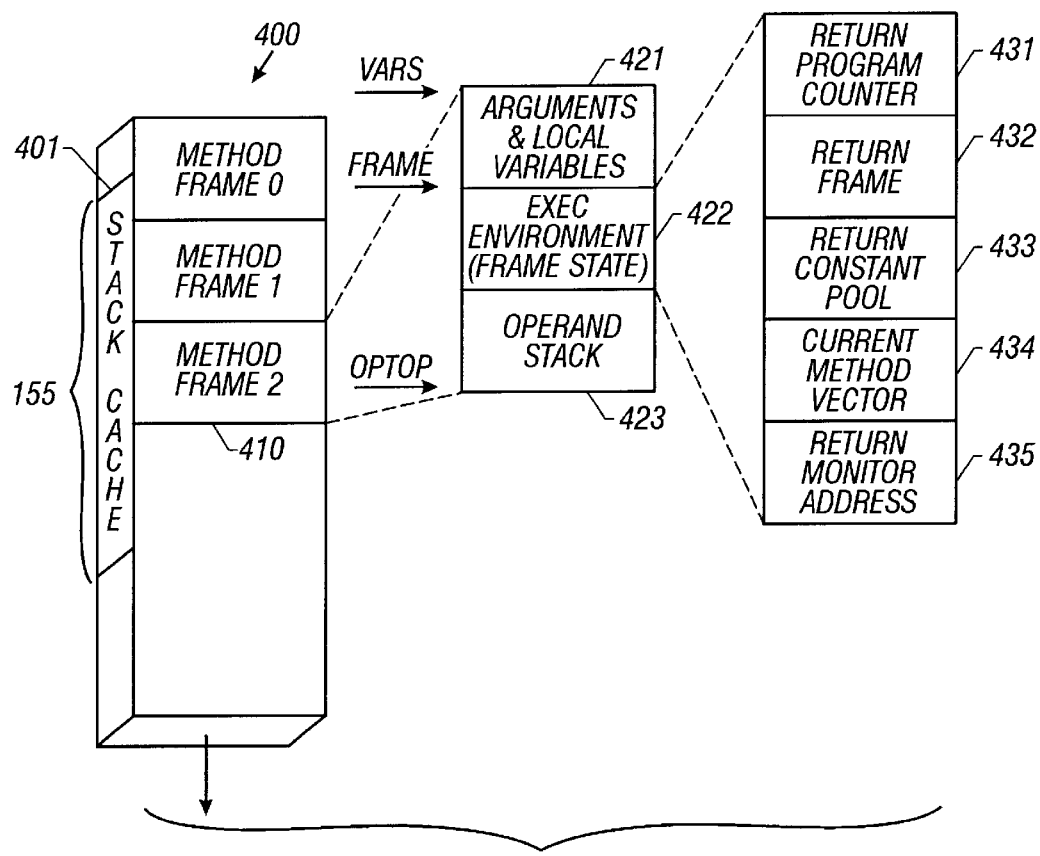
FIG. 4A is an illustration of the one embodiment of the logical organization of a stack structure where each method frame includes a local variable storage area, an environment storage area, and an operand stack utilized by the hardware processor of FIG. 1.

In FIG. 4A, object reference, incoming arguments, and local variables are included in arguments and local variables area 421. The invoker's method context is included in execution environment 422, sometimes called frame state, that in turn includes: a return program counter value 431 that is the address of the virtual machine instruction, e.g., JAVA opcode, next to the method invoke instruction; a return frame 432 that is the location of the calling method's frame; a return constant pool pointer 433 that is a pointer to the calling method's constant pool table; a current method vector 434 that is the base address of the current method's vector table; and a current monitor address 435 that is the address of the current method's monitor.

The object reference is an indirect pointer to an object-storage representing the object being targeted for the method invocation. JAVA compiler JAVAC (See FIG. 2.) generates an instruction to push this pointer onto operand stack 423 prior to generating an invoke instruction. This object reference is accessible as local variable zero during the execution of the method. This indirect pointer is not available for a static method invocation as there is no target-object defined for a static method invocation.

The list of incoming arguments transfers information from the calling method to the invoked method. Like the object reference, the incoming arguments are pushed onto stack 400 by JAVA compiler generated instructions and may be accessed as local variables. JAVA compiler JAVAC (See FIG. 2) statically generates a list of arguments for current method 410 (FIG. 4A), and hardware processor 100 determines the number of arguments from the list. When the object reference is present in the frame for a non-static method invocation, the first argument is accessible as local variable one. For a static method invocation, the first argument becomes local variable zero.

For 64-bit arguments, as well as 64-bit entities in general, the upper 32-bits, i.e., the 32 most significant bits, of a 64-bit entity are placed on the upper location of stack 400, i.e., pushed on the stack last. For example, when a 64-bit entity is on the top of stack 400, the upper 32-bit portion of the 64-bit entity is on the top of the stack, and the lower 32-bit portion of the 64-bit entity is in the storage location immediately adjacent to the top of stack 400.

The local variable area on stack 400 (FIG. 4A) for current method 410 represents temporary variable storage space which is allocated and remains effective during invocation of method 410. JAVA compiler JAVAC (FIG. 2) statically determines the required number of local variables and hardware processor 100 allocates temporary variable storage space accordingly.

When a method is executing on hardware processor 100, the local variables typically reside in stack cache 155 and are addressed as offsets from the pointer VARS (FIGS. 1 and 4A), which points to the position of the local variable zero. Instructions are provided to load the values of local variables onto operand stack 423 and store values from operand stack into local variables area 421.

The information in execution environment 422 includes the invoker's method context. When a new frame is built for the current method, hardware processor 100 pushes the invoker's method context onto newly allocated frame 410, and later utilizes the information to restore the invoker's method context before returning. Pointer FRAME (FIGS. 1 and 4A) is a pointer to the execution environment of the current method. In the exemplary embodiment, each register in register set 144 (FIG. 1) is 32-bits wide. Operand stack 423 is allocated to support the execution of the virtual machine instructions within the current method. Program counter register PC (FIG. 1) contains the address of the next instruction, e.g., opcode, to be executed. Locations on operand stack 423 (FIG. 4A) are used to store the operands of virtual machine instructions, providing both source and target storage locations for instruction execution. The size of operand stack 423 is statically determined by JAVA compiler JAVAC (FIG. 2) and hardware processor 100 allocates space for operand stack 423 accordingly. Register OPTOP (FIGS. 1 and 4A) holds a pointer to a top of operand stack 423.

The invoked method may return its execution result onto the invoker's top of stack, so that the invoker can access the return value with operand stack references. The return value is placed on the area where an object reference or an argument is pushed before a method invocation.

Simulation results on the JAVA virtual machine indicate that method invocation consumes a significant portion of the execution time (20–40%). Given this attractive target for accelerating execution of virtual machine instructions, hardware support for method invocation is included in hardware processor 100, as described more completely below.

The beginning of the stack frame of a newly invoked method, i.e., the object reference and the arguments passed by the caller, are already stored on stack 400 since the object reference and the incoming arguments come from the top of the stack of the caller. As explained above, following these items on stack 400, the local variables are loaded and then the execution environment is loaded.

One way to speed up this process is for hardware processor 100 to load the execution environment in the background and indicate what has been loaded so far, e.g., simple one bit scoreboarding. Hardware processor 100 tries to execute the bytecodes of the called method as soon as possible, even though stack 400 is not completely loaded. If accesses are made to variables already loaded, overlapping of execution with loading of stack 400 is achieved, otherwise a hardware interlock occurs and hardware processor 100 just waits for the variable or variables in the execution environment to be loaded.

Figure 4B:
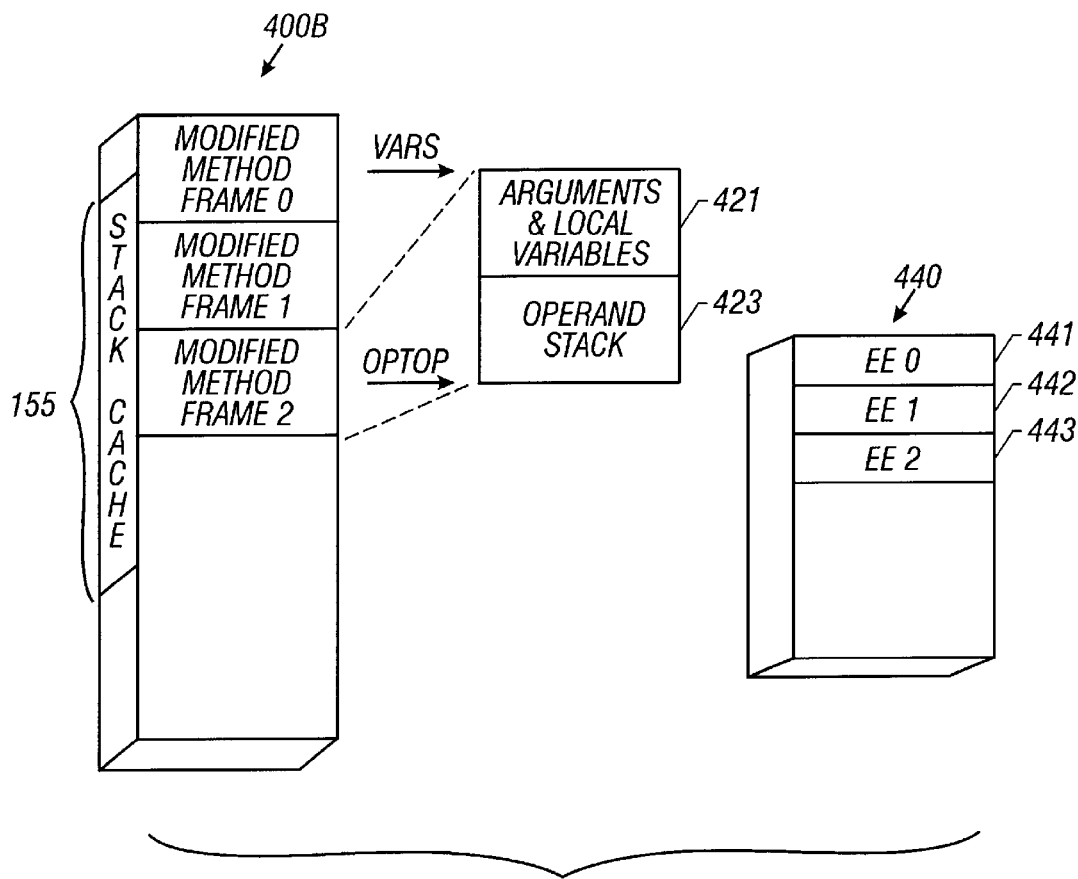
FIG. 4B is an illustration of an alternative embodiment of the logical organization of a stack structure where each method frame includes a local variable storage area and an operand stack on the stack, and an environment storage area for the method frame is included on a separate execution environment stack.

FIG. 4B illustrates another way to accelerate method invocation. Instead of storing the entire method frame in stack 400, the execution environment of each method frame is stored separately from the local variable area and the operand stack of the method frame. Thus, in this embodiment, stack 400B contains modified method frames, e.g. modified method frame 410B having only local variable area 421 and operand stack 423. Execution environment 422 of the method frame is stored in an execution environment memory 440. Storing the execution environment in execution environment memory 440 reduces the amount of data in stack cache 155. Therefore, the size of stack cache 155 can be reduced. Furthermore, execution environment memory 440 and stack cache 155 can be accessed simultaneously. Thus, method invocation can be accelerated by loading or storing the execution environment in parallel with loading or storing data onto stack 400B.

In one embodiment of stack management unit 150, the memory architecture of execution environment memory 440 is also a stack. As modified method frames are pushed onto stack 400*b* through stack cache 155, corresponding execution environments are pushed onto execution environment memory 440. For example, since modified method frames 0 to 2, as shown in FIG. 4B, are in stack 400B, execution environments (EE) 0 to 2, respectively, are stored in execution environment memory circuit 440.

To further enhance method invocation, an execution environment cache can be added to improve the speed of saving and retrieving the execution environment during method invocation. The architecture described more completely below for stack cache 155, dribbler manager unit 151, and stack control unit 152 for caching stack 400, can also be applied to caching execution environment memory 440.

Figure 4C:
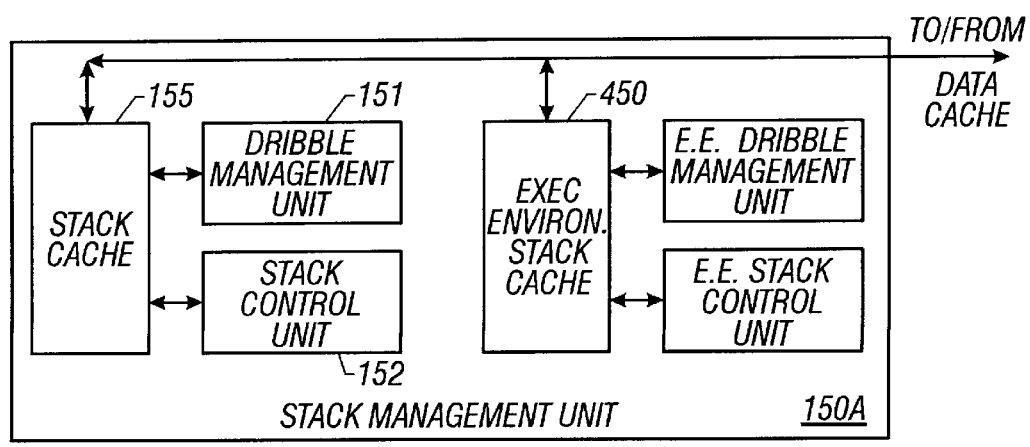
FIG. 4C is an illustration of an alternative embodiment of the stack management unitfor the stack and execution environment stack of FIG. 4B.

FIG. 4C illustrates an embodiment of stack management unit 150 modified to support both stack 400b and execution environment memory 440. Specifically, the embodiment of stack management unit 150 in FIG. 4C adds an execution environment stack cache 450, an execution environment dribble manager unit 460, and an execution environment stack control unit 470. Typically, execution dribble manager unit 460 transfers an entire execution environment between execution environment cache 450 and execution environment memory 440 during a spill operation or a fill operation.

I/O Bus and Memory Interface Unit

I/O bus and memory interface unit 110 (FIG. 1), sometimes called interface unit 110, implements an interface between hardware processor 100 and a memory hierarchy which in an exemplary embodiment includes external memory and may optionally include memory storage and/or interfaces on the same die as hardware processor 100. In this embodiment, I/O controller 111 interfaces with external I/O devices and memory controller 112 interfaces with external memory. Herein, external memory means memory external to hardware processor 100. However, external memory either may be included on the same die as hardware processor 100, may be external to the die containing hardware processor 100, or may include both on- and off-die portions.

In another embodiment, requests to I/O devices go through memory controller 112 which maintains an address map of the entire system including hardware processor 100. On the memory bus of this embodiment, hardware processor 100 is the only master and does not have to arbitrate to use the memory bus.

Hence, alternatives for the input/output bus that interfaces with I/O bus and memory interface unit 110 include supporting memory-mapped schemes, providing direct support for PCI, PCMCIA, or other standard busses. Fast graphics (w/ VIS or other technology) may optionally be included on the die with hardware processor 100.

I/O bus and memory interface unit 110 generates read and write requests to external memory. Specifically, interface unit 110 provides an interface for instruction cache and data cache controllers 121 and 161 to the external memory. Interface unit 110 includes arbitration logic for internal requests from instruction cache controller 121 and data cache controller 161 to access external memory and in response to a request initiates either a read or a write request on the memory bus to the external memory. A request from data cache controller 121 is always treated as higher priority relative to a request from instruction cache controller 161.

Interface unit 110 provides an acknowledgment signal to the requesting instruction cache controller 121, or data cache controller 161 on read cycles so that the requesting controller can latch the data. On write cycles, the acknowledgment signal from interface unit 110 is used for flow control so that the requesting instruction cache controller 121 or data cache controller 161 does not generate a new request when there is one pending. Interface unit 110 also handles errors generated on the memory bus to the external memory.

Instruction Cache Unit

Instruction cache unit (ICU) 120 (FIG. 1) fetches virtual machine instructions from instruction cache 125 and provides the instructions to instruction decode unit 130. In this embodiment, upon a instruction cache hit, instruction cache controller 121, in one cycle, transfers an instruction from instruction cache 125 to instruction buffer 124 where the instruction is held until integer execution unit IEU, that is described more completely below, is ready to process the instruction. This separates the rest of pipeline 300 (FIG. 3) in hardware processor 100 from fetch stage 301. If it is undesirable to incur the complexity of supporting an instruction-buffer type of arrangement, a temporary one instruction register is sufficient for most purposes. However, instruction fetching, caching, and buffering should provide sufficient instruction bandwidth to support instruction folding as described below.

The front end of hardware processor 100 is largely separate from the rest of hardware processor 100. Ideally, one instruction per cycle is delivered to the execution pipeline.

The instructions are aligned on an arbitrary eight-bit boundary by byte aligner circuit 122 in response to a signal from instruction decode unit 130. Thus, the front end of hardware processor 100 efficiently deals with fetching from any byte position. Also, hardware processor 100 deals with the problems of instructions that span multiple cache lines of cache 125. In this case, since the opcode is always the first byte, the design is able to tolerate an extra cycle of fetch latency for the operands. Thus, a very simple de-coupling between the fetching and execution of the bytecodes is possible.

In case of an instruction cache miss, instruction cache controller 121 generates an external memory request for the missed instruction to I/O bus and memory interface unit 110. If instruction buffer 124 is empty, or nearly empty, when there is an instruction cache miss, instruction decode unit 130 is stalled, i.e., pipeline 300 is stalled. Specifically, instruction cache controller 121 generates a stall signal upon a cache miss which is used along with an instruction buffer empty signal to determine whether to stall pipeline 300. Instruction cache 125 can be invalidated to accommodate self-modifying code, e.g., instruction cache controller 121 can invalidate a particular line in instruction cache 125.

Thus, instruction cache controller 121 determines the next instruction to be fetched, i.e., which instruction in instruction cache 125 needs to accessed, and generates address, data and control signals for data and tag RAMs in instruction cache 125. On a cache hit, four bytes of data are fetched from instruction cache 125 in a single cycle, and a maximum of four bytes can be written into instruction buffer 124.

Byte aligner circuit 122 aligns the data out of the instruction cache RAM and feeds the aligned data to instruction buffer 124. As explained more completely below, the first two bytes in instruction buffer 124 are decoded to determine the length of the virtual machine instruction. Instruction buffer 124 tracks the valid instructions in the queue and updates the entries, as explained more completely below.

Instruction cache controller 121 also provides the data path and control for handling instruction cache misses. On an instruction cache miss, instruction cache controller 121 generates a cache fill request to I/O bus and memory interface unit 110.

On receiving data from external memory, instruction cache controller 121 writes the data into instruction cache 125 and the data are also bypassed into instruction buffer 124. Data are bypassed to instruction buffer 124 as soon as the data are available from external memory, and before the completion of the cache fill.

Instruction cache controller 121 continues fetching sequential data until instruction buffer 124 is full or a branch or trap has taken place. In one embodiment, instruction buffer 124 is considered full if there are more than eight bytes of valid entries in buffer 124. Thus, typically, eight bytes of data are written into instruction cache 125 from external memory in response to the cache fill request sent to interface unit 110 by instruction cache unit 120. If there is a branch or trap taken while processing an instruction cache miss, only after the completion of the miss processing is the trap or branch executed.

When an error is generated during an instruction cache fill transaction, a fault indication is generated and stored into instruction buffer 124 along with the virtual machine instruction, i.e., a fault bit is set. The line is not written into instruction cache 125. Thus, the erroneous cache fill transaction acts like a non-cacheable transaction except that a fault bit is set. When the instruction is decoded, a trap is taken.

Instruction cache controller 121 also services non-cacheable instruction reads. An instruction cache enable (ICE) bit, in a processor status register in register set 144, is used to define whether a load can be cached. If the instruction cache enable bit is cleared, instruction cache unit 120 treats all loads as non-cacheable loads. Instruction cache controller 121 issues a non-cacheable request to interface unit 110 for non-cacheable instructions. When the data are available on a cache fill bus for the non-cacheable instruction, the data are bypassed into instruction buffer 124 and are not written into instruction cache 125.

In this embodiment, instruction cache 125 is a direct-mapped, eight-byte line size cache. Instruction cache 125 has a single cycle latency. The cache size is configurable to 0K, 1K, 2K, 4K, 8K and 16K byte sizes where K means kilo. The default size is 4K bytes. Each line has a cache tag entry associated with the line. Each cache tag contains a twenty bit address tag field and one valid bit for the default 4K byte size.

Instruction buffer 124, which, in an exemplary embodiment, is a twelve-byte deep first-in, first-out (FIFO) buffer, de-links fetch stage 301 (FIG. 3) from the rest of pipeline 300 for performance reasons. Each instruction in buffer 124 (FIG. 1) has an associated valid bit and an error bit. When the valid bit is set, the instruction associated with that valid bit is a valid instruction. When the error bit is set, the fetch of the instruction associated with that error bit was an erroneous transaction. Instruction buffer 124 includes an instruction buffer control circuit (not shown) that generates signals to pass data to and from instruction buffer 124 and that keeps track of the valid entries in instruction buffer 124, i.e., those with valid bits set.

In an exemplary embodiment, four bytes can be received into instruction buffer 124 in a given cycle. Up to five bytes, representing up to two virtual machine instructions, can be read out of instruction buffer 124 in a given cycle. Alternative embodiments, particularly those providing folding of multi-byte virtual machine instructions and/or those providing folding of more than two virtual machine instructions, provide higher input and output bandwidth. Persons of ordinary skill in the art will recognize a variety of suitable instruction buffer designs including, for example, alignment logic, circular buffer design, etc. When a branch or trap is taken, all the entries in instruction buffer 124 are nullified and the branch/trap data moves to the top of instruction buffer 124.

In the embodiment of FIG. 1, a unified execution unit 140 is shown. However, in another embodiment, instruction decode unit 120, integer unit 142, and stack management unit 150 are considered a single integer execution unit, and floating point execution unit 143 is a separate optional unit. In still other embodiments, the various elements in the execution unit may be implemented using the execution unit of another processor. In general the various elements included in the various units of FIG. 1 are exemplary only of one embodiment. Each unit could be implemented with all or some of the elements shown. Again, the decision is largely dependent upon a price vs. performance trade-off.

Instruction Decode Unit

As explained above, virtual machine instructions are decoded in decode stage 302 (FIG. 3) of pipeline 300. In an exemplary embodiment, two bytes, that can correspond to two virtual machine instructions, are fetched from instruction buffer 124 (FIG. 1). The two bytes are decoded in parallel to determine if the two bytes correspond to two virtual machine instructions, e.g., a first load top of stack instruction and a second add top two stack entries instruction, that can be folded into a single equivalent operation. Folding refers to supplying a single equivalent operation corresponding to two or more virtual machine instructions.

In an exemplary hardware processor 100 embodiment, a single-byte first instruction can be folded with a second instruction. However, alternative embodiments provide folding of more than two virtual machine instructions, e.g., two to four virtual machine instructions, and of multi-byte virtual machine instructions, though at the cost of instruction decoder complexity and increased instruction bandwidth. In the exemplary processor 100 embodiment, if the first byte, which corresponds to the first virtual machine instruction, is a multi-byte instruction, the first and second instructions are not folded.

An optional current object loader folder 132 exploits instruction folding, such as that described above and as well as in greater detail below in virtual machine instruction sequences which simulation results have shown to be particularly frequent and therefore a desirable target for optimization. In particular, method invocations typically load an object reference for the corresponding object onto the operand stack and fetch a field from the object. Instruction folding allow this extremely common virtual machine instruction sequence to be executed using an equivalent folded operation.

Quick variants are not part of the virtual machine instruction set (See Chapter 3 of Section I), and are invisible outside of a JAVA virtual machine implementation. However, inside a virtual machine implementation, quick variants have proven to be an effective optimization (See Section A in Section I; which is an integral part of this specification.) Supporting writes for updates of various instructions to quick variants in a non-quick to quick translator cache 131 changes the normal virtual machine instruction to a quick virtual machine instruction to take advantage of the large benefits bought from the quick variants. In particular, as described in more detail in U.S. patent application Ser. No. 08/788,805, entitled "NON-QUICK INSTRUCTION ACCELERATOR AND METHOD OF IMPLEMENTING SAME" naming Marc Tremblay and James Michael O'Connor as inventors, assigned to the assignee of this application, and filed on even date herewith which is incorporated herein by reference in its entirety, when the information required to initiate execution of an instruction has been assembled for the first time, the information is stored in a cache along with the value of program counter PC as tag in non-quick to quick translator cache 131 and the instruction is identified as a quick-variant. In one embodiment, this is done with self-modifying code.

Upon a subsequent call of that instruction, instruction decode unit 130 detects that the instruction is identified as a quick-variant and simply retrieves the information needed to initiate execution of the instruction from non-quick to quick translator cache 131. Non-quick to quick translator cache is an optional feature of hardware processor 100.

With regard to branching, a very short pipe with quick branch resolution is sufficient for most implementations. However, an appropriate simple branch prediction mechanism can alternatively be introduced, e.g., branch predictor circuit 133. Implementations for branch predictor circuit 133 include branching based on opcode, branching based on offset, or branching based on a two-bit counter mechanism.

The JAVA virtual machine specification defines an instruction invokenonvirtual, opcode 183, which, upon execution, invokes methods. The opcode is followed by an index byte one and an index byte two. (See Section I.) Operand stack 423 contains a reference to an object and some number of arguments when this instruction is executed.

Index bytes one and two are used to generate an index into the constant pool of the current class. The item in the constant pool at that index points to a complete method signature and class. Signatures are defined in Section I and that description is incorporated herein by reference.

The method signature, a short, unique identifier for each method, is looked up in a method table of the class indicated. The result of the lookup is a method block that indicates the type of method and the number of arguments for the method. The object reference and arguments are popped off this method's stack and become initial values of the local variables of the new method. The execution then resumes with the first instruction of the new method. Upon execution, instructions invokevirtual, opcode 182, and invokestatic, opcode 184, invoke processes similar to that just described. In each case, a pointer is used to lookup a method block.

A method argument cache 134, that also is an optional feature of hardware processor 100, is used, in a first embodiment, to store the method block of a method for use, after the first call to the method, along with the pointer to the method block as a tag. Instruction decode unit 130 uses index bytes one and two to generate the pointer and then uses the pointer to retrieve the method block for that pointer in cache 134. This permits building the stack frame for the newly invoked method more rapidly in the background in subsequent invocations of the method. Alternative embodiments may use a program counter or method identifier as a reference into cache 134. If there is a cache miss, the instruction is executed in the normal fashion and cache 134 is updated accordingly. The particular process used to determine which cache entry is overwritten is not an essential aspect of this invention. A least-recently used criterion could be implemented, for example.

In an alternative embodiment, method argument cache 134 is used to store the pointer to the method block, for use after the first call to the method, along with the value of program counter PC of the method as a tag. Instruction decode unit 130 uses the value of program counter PC to access cache 134. If the value of program counter PC is equal to one of the tags in cache 134, cache 134 supplies the pointer stored with that tag to instruction decode unit 130. Instruction decode unit 139 uses the supplied pointer to retrieve the method block for the method. In view of these two embodiments, other alternative embodiments will be apparent to those of skill in the art.

Wide index forwarder 136, which is an optional element of hardware processor 100, is a specific embodiment of instruction folding for instruction wide. Wide index forwarder 136 handles an opcode encoding an extension of an index operand for an immediately subsequent virtual machine instruction. In this way, wide index forwarder 136 allows instruction decode unit 130 to provide indices into local variable storage 421 when the number of local variables exceeds that addressable with a single byte index without incurring a separate execution cycle for instruction wide.

Aspects of instruction decoder 135, particularly instruction folding, non-quick to quick translator cache 131, current object loader folder 132, branch predictor 133, method argument cache 134, and wide index forwarder 136 are also useful in implementations that utilize a software interpreter or just-in-time compiler, since these elements can be used to accelerate the operation of the software interpreter or just-in-time compiler. In such an implementation, typically, the virtual machine instructions are translated to an instruction for the processor executing the interpreter or compiler, e.g., any one of a Sun processor, a DEC processor, an Intel processor, or a Motorola processor, for example, and the operation of the elements is modified to support execution on that processor. The translation from the virtual machine instruction to the other processor instruction can be done either with a translator in a ROM or a simple software translator. For additional examples of dual instruction set processors, see U.S. Pat. No. 5,925,123, entitled "A PROCESSOR FOR EXECUTING INSTRUCTION SETS RECEIVED FROM A NETWORK OR SUPPLIED BY FROM A LOCAL MEMORY" naming Marc Tremblay and James Michael O'Connor as inventors, assigned to the assignee of this application, and filed on even date herewith, which is incorporated herein by reference in its entirety.

As explained above, one embodiment of processor 100 implements instruction folding to enhance the performance of processor 100. In general, instruction folding in accordance with the present invention can be used in any of a stack-based virtual machine implementation, including, e.g., in a hardware processor implementation, in a software interpreter implementation, in a just-in-time compiler implementation, etc. Thus, while various embodiments of instruction folding are described in the following more detailed description in terms of a hardware processor, those of skill in the art will appreciate, in view of this description, suitable extensions of instruction folding to other stack-based virtual machine implementations.

Figure 7:
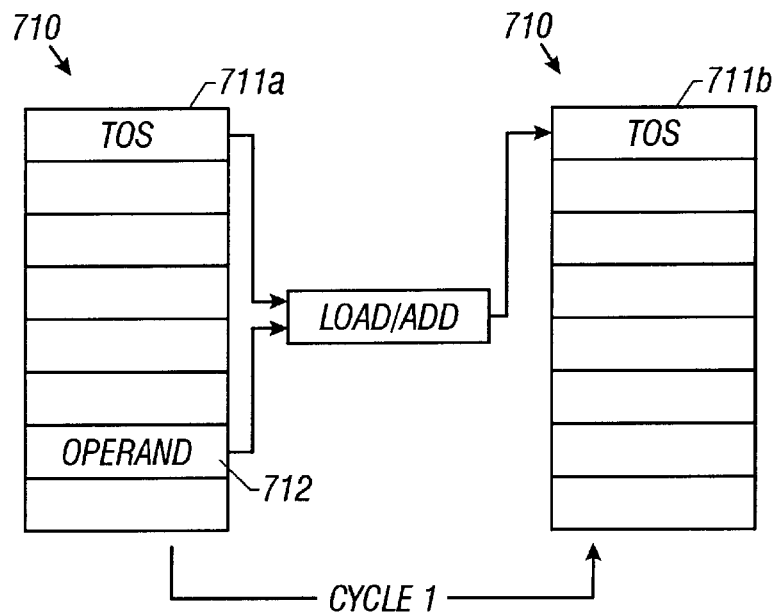
FIG. 7 is a contrasting illustration of folded execution of first and second stack instructions such as those depicted in FIG. 6, wherein the first (push data item onto the top of the stack) operation is obviated in accordance with an exemplary embodiment of the present invention.

FIG. 7 illustrates folded execution of first and second stack instructions, according to the principles of this invention. In this embodiment, a first operand for an addition instruction resides in top-of-stack (TOS) entry 711a of stack 710. A second operand resides in entry 712 of stack 710. Notice that entry 712 is not physically adjacent to top-of stack entry 711a and in fact, is in the interior of stack 710. An instruction stream includes a load top-of-stack instruction for pushing the second operand onto the top of stack (see description of instruction iload in Section I) and an addition instruction for operating on the first and second operands residing in the top two entries of stack 710 (see description of instruction iadd in Section I). However, to speed execution of the instruction stream, the load top-of-stack and addition instructions are folded into a single operation whereby the explicit sequential execution of the load top-of-stack instruction and the associated execution cycle are eliminated. Instead, a folded operation corresponding to the addition instruction operates on the first and second operands, which reside in TOS entry 711a and entry 712 of stack 710. The result of the folded operation is pushed onto stack 710 at TOS entry 711b. Thus, folding according to the principles of this invention enhances performance compared to an unfolded method for executing the same sequence of instructions.

Figure 6:
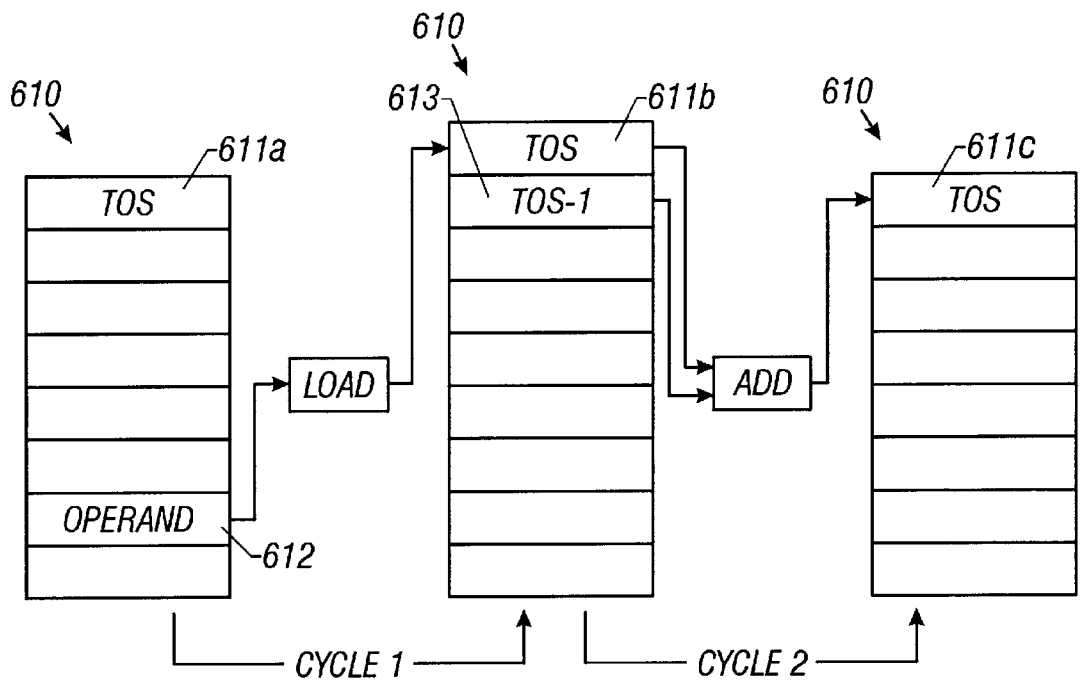
FIG. 6 is an illustration, in the context of a stack data structure, of data flows associated with a pair of stack instructions, wherein the first stack instruction pushes a data item onto the top of the stack only to be consumed by the second stack instruction which pops the top two stack entries off the stack and pushes their sum onto the top of the stack.

Without instruction folding, a first operand for an addition instruction resides in top-of-stack (TOS) entry 611a of stack 610 (see FIG. 6). A second operand resides in entry 612 of stack 610. A load to top-of-stack instruction pushes the second operand onto the top of stack 610 and typically requires an execution cycle. The push results in the second and first operands residing in TOS entry 611b and (TOS-1) entry 613, respectively. Thereafter, the addition instruction operates, in another execution cycle, on the first and second operands which properly reside in the top two entries, i.e., TOS entry 611b and (TOS-1) entry 613, of stack 610 in accordance with the semantics of a stack architecture. The result of the addition instruction is pushed onto stack 610 at TOS entry 611c and after the addition instruction is completed, it is as if the first and second operand data were never pushed onto stack 610. As described above, folding reduces the execution cycles required to complete the addition and so enhances the speed of execution of the instruction stream. More complex folding, e.g., folding including store instructions and folding including larger numbers of instructions, is described in greater detail below.

In general, instruction decoder unit 130 (FIG. 1) examines instructions in a stream of instructions. Instruction decoder unit 130 folds first and second adjacent instructions together and provides a single equivalent operation for execution by execution unit 140 when instruction decoder unit 130 detects that the first and second instructions have neither structural nor resource dependencies and the second instruction operates on data provided by the first instruction. Execution of the single operations obtains the same result as execution of an operation corresponding to the first instruction followed by execution an operation corresponding to the second instruction, except that an execution cycle has been eliminated.

As described above, the JAVA virtual machine is stack-oriented and specifies an instruction set, a register set, an operand stack, and an execution environment. Although, the present invention is described in relation to the JAVA Virtual Machine, those of skill in the art will appreciate that the invention is not limited to embodiments implementing or related to the JAVA virtual machine and, instead, encompasses systems, articles, methods, and apparati for a wide variety of stack machine environments, both virtual and physical.

As illustrated in FIG. 4A, according to the JAVA Virtual Machine Specification, each method has storage allocated for an operand stack and a set of local variables. Similarly, in the embodiment of FIG. 8 (see also FIG. 4A), a series of method frames e.g., method frame 801 and method frame 802 on stack 803, each include an operand stack instance, local variable storage instance, and frame state information instance for respective methods invoked along the execution path of a JAVA program. A new frame is created and becomes current each time a method is invoked and is destroyed after the method completes execution. A frame ceases to be current if its method invokes another method. On method return, the current frame passes back the result of its method invocation, if any, to the previous frame via stack 803. The current frame is then discarded and the previous frame becomes current. Folding in accordance with the present invention, as described more completely below, is not dependent upon a particular process used to allocate or define memory space for a method, such as a frame, and can, in general, be used in any stack based architecture.

This series of method frames may be implemented in any of a variety of suitable memory hierarchies, including for example register/ cache/ memory hierarchies. However, irrespective of the memory hierarchy chosen, an operand stack instance 812 (FIG. 8) is implemented in randomly-accessible storage 810, i.e., at least some of the entries in operand stack instance 812 can be accessed from locations other than the top most locations of operand stack instance 812 in contrast with a conventional stack implementation in which only the top entry or topmost entries of the stack can be accessed. As described above, register OPTOP stores a pointer that identifies the top of operand stack instance 812 associated with the current method. The value stored in register OPTOP is maintained to identify the top entry of an operand stack instance corresponding to the current method.

In addition, local variables for the current method are represented in randomly-accessible storage 810. A pointer stored in register VARS identifies the starting address of local variable storage instance 813 associated with the current method. The value in register VARS is maintained to identify a base address of the local variable storage instance corresponding to the current method.

Figure 8:
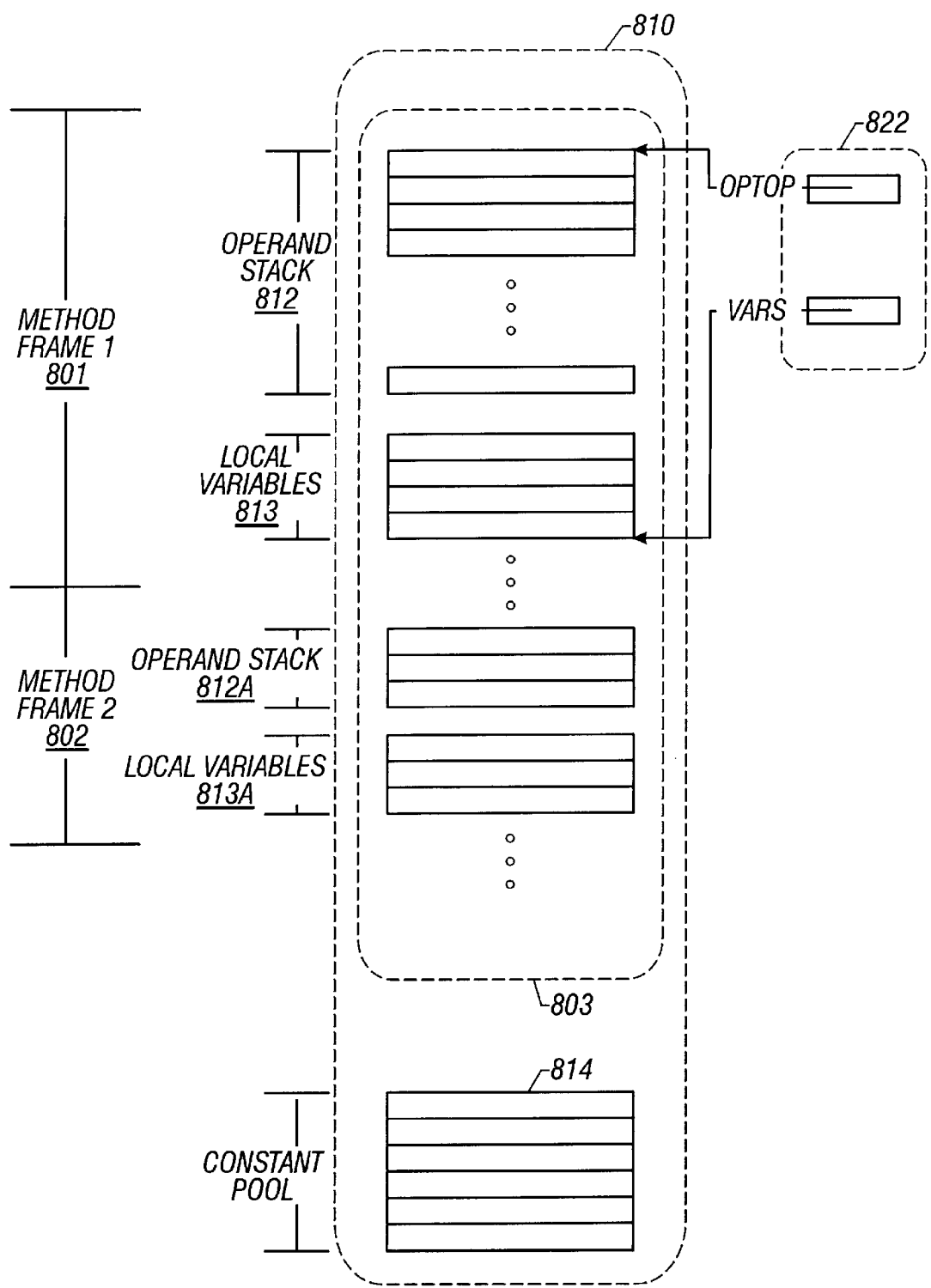
FIG. 8 is a block diagram depicting relationships between operand stack, local variable storage, and constant pool portions of memory storage together with register variables for access thereof in accordance with an exemplary embodiment of the present invention.

Entries in operand stack instance 812 and local variable storage instance 813 are referenced by indexing off of values represented in registers OPTOP and VARS, respectively, that in the embodiment of FIG. 1 are included in register set 144, and in the embodiment of FIG. 8 are included in pointer registers 822. Pointer registers 822 may be represented in physical registers of a processor implementing the JAVA Virtual Machine, or optionally, in randomly-accessible storage 810. In an exemplary embodiment, commonly used offsets OPTOP−1, OPTOP−2, VARS+1, VARS+2, and VARS+3 are derived from the values in registers OPTOP and VARS, respectively. Alternatively, the additional offsets could be stored in registers of pointer registers 822.

Operand stack instance 812 and local variable storage instance 813 associated with the current method are preferably represented in a flat 64-entry cache, e.g., stack cache 155 (see FIG. 1) whose contents are kept updated so that a working set of operand stack and local variable storage entries are cached. However, depending on the size of the current frame, the current frame including operand stack instance 812 and local variable storage instance 813 may be fully or partially represented in the cache. Operand stack and local variable storage entries for frames other than the current frame may also be represented in the cache if space allows. A suitable representation of a cache suitable for use with the folding of this invention is described in greater detail in U.S. patent application Ser. No. 08/787,736, entitled "METHODS AND APPARATI FOR STACK CACHING" naming Marc Tremblay and James Michael O'Connor as inventors, assigned to the assignee of this application, and filed on even date herewith, the detailed description of which is incorporated herein by reference, and in U.S. patent application Ser. No. 08/787,617, entitled "METHOD FRAME STORAGE USING MULTIPLE MEMORY CIRCUITS" naming Marc Tremblay and James Michael O'Connor as inventors, assigned to the assignee of this application, and filed on even date herewith, the detailed description of which also is incorporated herein by reference. However, other representations, including separate and/or uncached operand stack and local variable storage areas, are also suitable.

In addition to method frames and their associated operand stack and local variable storage instances, a constant area 814 is provided in the address space of a processor implementing the JAVA virtual machine for commonly-used constants, e.g., constants specified by JAVA virtual machine instructions such as instruction iconst. In some cases, an operand source is represented as an index into constant area 814. In the embodiment of FIG. 8, constant area 814 is represented in randomly-accessible storage 810. Optionally, entries of constant area 814 could also be cached, e.g., in stack cache 155.

Although those of skill in the art will recognize the advantages of maintaining an operand stack and local variable storage instance for each method, as well as the opportunities for passing parameters and results created by maintaining the various instances of operand stack and local variable storage in a stack-oriented structure, in the interest of clarity, the description which follows focuses on the particular instances (operand stack instance 812 and local variable storage instance 813) of each associated the current method. Hereafter, these particular instances of an operand stack and local variable storage are referred to simply as operand stack 812 and local variable storage 813. Despite this simplification for purposes of illustration, those of skill in the art will appreciate that operand stack 812 and local variable storage 813 refer to any instances of an operand stack and variable storage associated with the current method, including representations which maintain separate instances for each method and representations which combine instances into a composite representation.

Operand sources and result targets for JAVA Virtual Machine instructions typically identify entries of operand stack instance 812 or local variable storage instance 813, i.e., identify entries of the operand stack and local variable storage for the current method. By way of example, and not limitation, representative JAVA virtual machine instructions are described in Chapter 3 of *The JAVA Virtual Machine Specification* which is included at Section I.

JAVA virtual machine instructions rarely explicitly designate both the source of the operand, or operands, and the result destination. Instead, either the source or the destination is implicitly the top of operand stack 812. Some JAVA bytecodes explicitly designate neither a source nor a destination. For example, instruction iconst_0 pushes a constant integer zero onto operand stack 812. The constant zero is implicit in the instruction, although the instruction may actually be implemented by a particular JAVA virtual machine implementation using a representation of the value zero from a pool of constants, such as constant area 814, as the source for the zero operand. An instruction decoder for a JAVA virtual machine implementation that implements instruction iconst_0 in this way could generate, as the source address, the index of the entry in constant area 814 where the constant zero is represented.

Prior to considering the various embodiments of folding in accordance with the present invention, it is informative to consider execution of JAVA virtual machine instructions, such as the iadd instruction and the arraylength instruction, without the folding process. After the operations associated with typical execution of JAVA virtual machine instructions are understood, the advantages of this invention will be more apparent. Further, this understanding will assist those of skill in the art in extending the invention to other stack-based architectures that do not rely upon the JAVA virtual machine instructions.

Focusing illustratively on operand stack and local variable storage structures associated with the current method and referring now to FIGS. 9A–D, the JAVA virtual machine integer add instruction, iadd, generates the sum of first and second integer operands, referred to as operand1 and operand2, respectively, that are at the top two locations of operand stack 812. The top two locations are identified, at the time of instruction iadd execution, by pointer OPTOP in register OPTOP and by pointer OPTOP-1. The result of the execution of instruction iadd, i.e., the sum of first and second integer operands, is pushed onto operand stack 812.

FIG. 9A shows the state of operand stack 812 and local variable storage 813 that includes first and second values, referred to as value1 and value2, before execution of a pair of JAVA virtual machine integer load instructions iload. In FIG. 9A, pointer OPTOP has the value AAC0h.

FIG. 9B shows operand stack 812 after execution of the pair of instructions iload that load integer values from local variable storage 813 onto operand stack 812, pushing (i.e., copying) values value1 and value2 from locations identified by pointer VARS in register VARS and by pointer VARS+2 onto operand stack 812 as operand1 at location AAC4h and operand2 at location AAC8h, and updating pointer OPTOP in the process to value AAC8h. FIG. 9C shows operand stack 812 after instruction iadd has been executed. Execution of instruction iadd pops operands operand1 and operand2 off operand stack 812, calculates the sum of operands operand1 and operand2, and pushes that sum onto operand stack 812 at location AAC4h. After execution of instruction iadd, pointer OPTOP has the value AAC0h and points to the operand stack 812 entry storing the sum.

FIG. 9D shows operand stack 812 after an instruction istore has been executed. Execution of instruction istore pops the sum off operand stack 812 and stores the sum in the local variable storage 813 entry at the location identified by pointer VARS+2.

Variations for other instructions which push operands onto operand stack 812 and which operate on values residing at the top of operand stack 812 will be apparent to those of skill in the art. For example, variations for alternate operations and for data types requiring multiple operand stack 812 entries, e.g., long integer values, double-precision floating point values, etc., will be apparent to those of skill in the art in view of this disclosure.

The folding example of FIGS. 10A–C is analogous to that illustrated with reference to FIGS. 9A–D, though with only load folding illustrated. Execution of JAVA virtual machine length of array instruction arraylength determines the length of an array whose object reference pointer objectref is at the top of operand stack 812, and pushes the length onto operand stack 812. FIG. 10A shows the state of operand stack 812 and local variable storage 813 before execution of JAVA virtual machine reference load instruction aload that is used to load an object reference from local variable storage 813 onto the top of operand stack 812. In FIG. 10A, pointer OPTOP has the value AAC0h.

FIG. 10B shows operand stack 812 after execution of instruction aload pushes, i.e., copies, object reference pointer objectref onto the top of operand stack 812 and updates pointer OPTOP to AAC4h in the process.

FIG. 10C shows operand stack 812 after instruction arraylength has been executed. Execution of instruction arraylength pops object reference pointer objectref off operand stack 812, calculates the length of the array referenced thereby, and pushes that length onto operand stack 812. Suitable implementations of the instruction arraylength may supply object reference pointer objectref to an execution unit, e.g., execution unit 140, which subsequently overwrites the object reference pointer objectref with the value length.

Whether the object reference pointer objectref is popped from operand stack 812 or simply overwritten, after execution of instruction arraylength, pointer OPTOP has the value AAC4h and points to the operand stack 812 entry storing the value length.

Figure 11:
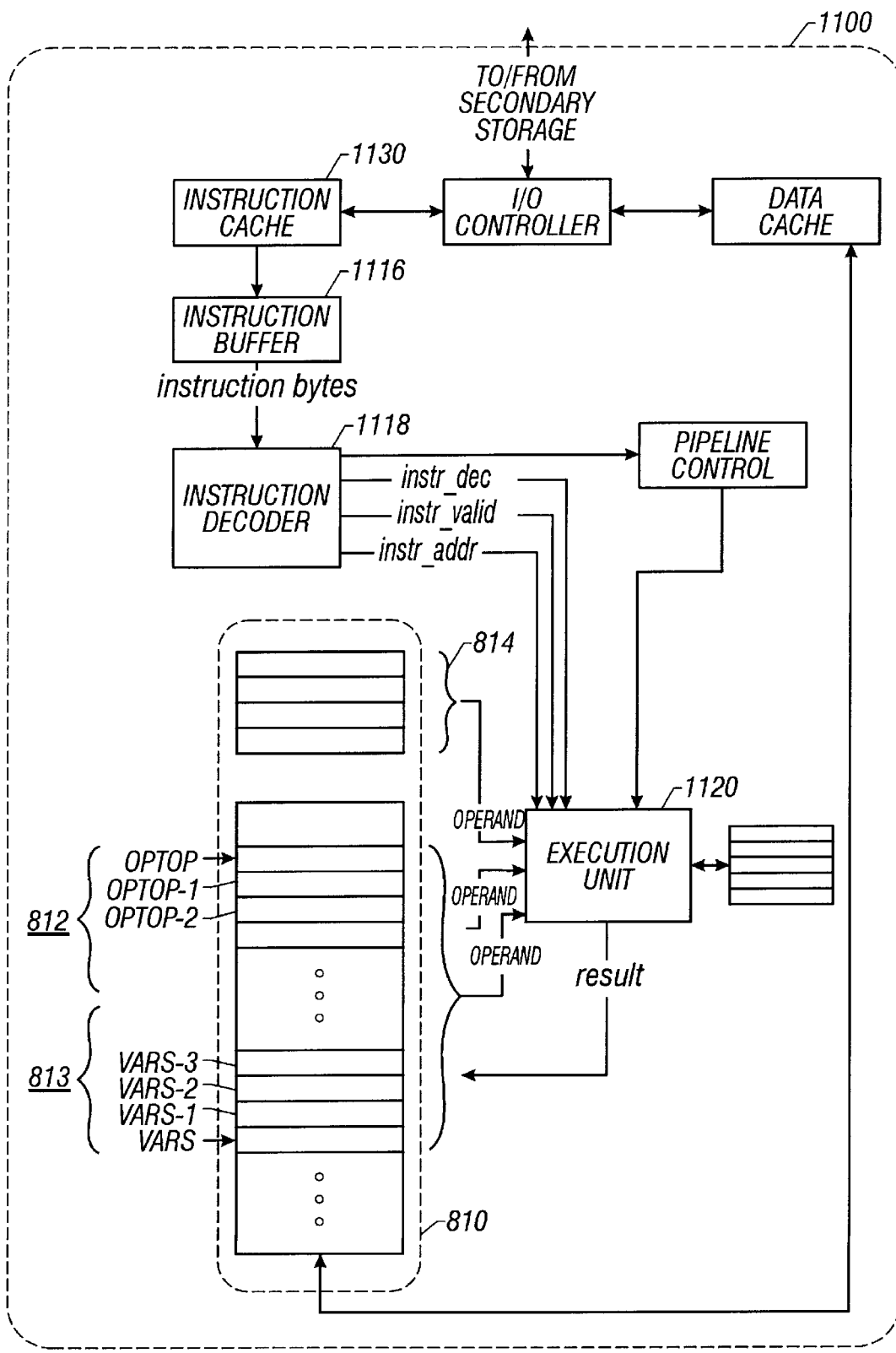
FIG. 11 is a functional block diagram of a stack based processor including an instruction decoder providing instruction folding in accordance with an exemplary embodiment of the present invention.

FIG. 11 illustrates a processor 1100 wherein loads, such as those illustrated in FIGS. 9A and 9B and in FIGS. 10A and 10B, are folded into execution of subsequent instructions, e.g., into execution of subsequent instruction iadd, or instruction arraylength. In this way, intermediate execution cycles associated with loading operands operand1 and operand2 for instruction iadd, or with loading pointer objectref for instruction arraylength onto the top of operand stack 812 can be eliminated. As a result, single cycle execution of groups of JAVA virtual machine instructions e.g., the group of instructions iload, iload, iadd, and istore, or the group of instructions aload and arraylength, is provided by processor 1100. One embodiment of processor 1100 is presented in FIG. 1 as hardware processor 100. However, hardware processor 1100 includes other embodiments that do not include the various optimizations of hardware processor 100. Further, the folding processes described below could be implemented in a software interpreter or a included within a just-in-time compiler. In the processor 1100 embodiment of FIG. 11, stores such as that illustrated in FIG. 9D, are folded into execution of prior instructions, e.g., in FIG. 9D, into execution of the immediately prior instruction iadd.

The instruction folding is provided primarily by instruction decoder 1118. Instruction decoder 1118 retrieves fetched instructions from instruction buffer 1116 and depending upon the nature of instructions in the fetched instruction sequence, supplies execution unit 1120 with decoded operation and operand addressing information implementing the instruction sequence as a single folded operation. Unlike instructions of the JAVA virtual machine instruction set to which the instruction sequence from instruction buffer 1116 conforms, decoded operations supplied to execution unit 1120 by instruction decoder 1118 operate on operand values represented in entries of local variable storage 813, operand stack 812, and constant area 814.

In the exemplary embodiment of FIG. 11, valid operand sources include local variable storage 813 entries identified by pointers VARS, VARS+1, VARS+2, and VARS+3, as well as operand stack 812 entries identified by pointers OPTOP, OPTOP−1, and OPTOP−2. Similarly, valid result targets include local variable storage 813 entries identified by operands VARS, VARS+1, VARS+2, and VARS+3. Embodiments in accordance with FIG. 11 may also provide for constant area 814 entries as valid operand sources as well as other locations in operand stack 812 and local variable storage 813.

Figure 12:
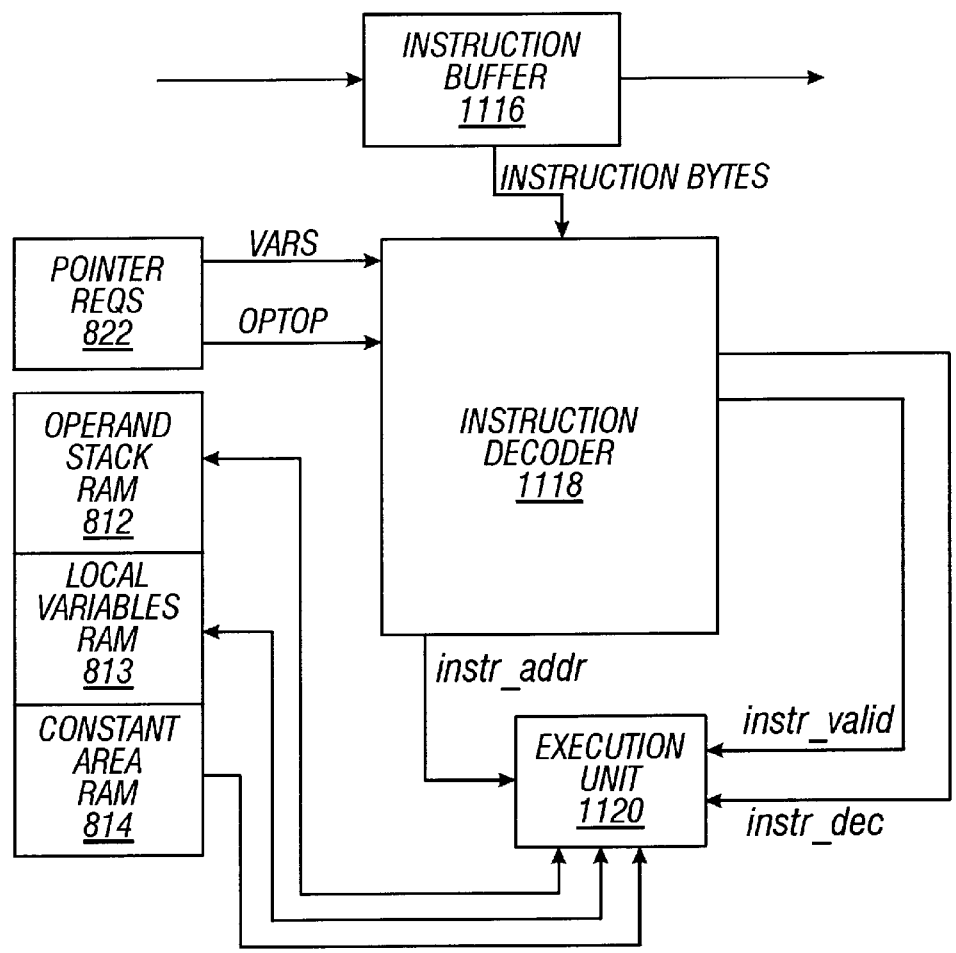
FIG. 12 is a functional block diagram depicting an instruction decoder in accordance with an exemplary embodiment of the present invention and coupled to supply an execution unit with a folded operation, with operand addresses into an operand stack, local variable storage or a constant pool, and with a destination address into the operand stack or local variable storage, wherein the single operation and addresses supplied are equivalent to a sequence of unfolded instructions.

Referring now to FIGS. 11 and 12, a sequence of JAVA virtual machine instructions is fetched from memory and loaded into instruction buffer 1116. Conceptually, instruction buffer 1116 is organized as a shift register for JAVA bytecodes. One or more bytecodes are decoded by instruction decoder 1118 during each cycle and operations are supplied to execution unit 1120 in the form of a decoded operation on instruction decode bus instr_dec and associated operand source and result destination addressing information on instruction address bus instr_addr. Instruction decoder 1118 also provides an instruction valid signal instr_valid to execution unit 1120. When asserted, signal instr_valid indicates that the information on instruction decode bus instr_dec specifies a valid operation.

One or more bytecodes are shifted out of instruction buffer 1116 to instruction decode unit 1118 each cycle in correspondence with the supply of decoded operations and operand addressing information to execution unit 1120, and subsequent undecoded bytecodes are shifted into instruction buffer 1116. For normal decode operations, a single instruction is shifted out of instruction buffer 1116 and decoded by instruction decode unit 1118, and a single corresponding operation is executed by execution unit 1120 during each instruction cycle.

In contrast, for folded decode operations, multiple instructions, e.g., a group of instructions, are shifted out of instruction buffer 1116 to instruction decode unit 1118. In response to the multiple instructions, instruction decode unit 1118 generates a single equivalent folded operation that in turn is executed by execution unit 1120 during each instruction cycle.

Referring illustratively to the instruction sequence described above with reference to FIGS. 9A–9D, instruction decoder 1118 selectively decodes bytecodes associated with four JAVA virtual machine instructions:

1. iload value1;
2. iload value2;
3. iadd; and
4. istore, that were described in the above description of FIGS. 9A–D. As now described, both instructions iload and the instruction istore are folded by instruction decoder 1118 into an add operation corresponding to instruction iadd. Although operation of instruction decoder 1118 is illustrated using a foldable sequence of four instructions, those of skill in the art will appreciate that the invention is not limited to four instructions. Foldable sequences of two, three, four, five, or more instructions are envisioned. For example, more than one instruction analogous to the instruction istore and more than two instructions analogous to the instructions iload may be included in foldable sequences.

Instruction decoder 1118 supplies decoded operation information over bus instr_dec and associated operand source and result destination addressing information over bus instr_addr specifying that execution unit 1120 is to add the contents of local variable storage 813 location 0, this is identified by pointer VARS, and local variable storage 813 location 2, that is identified by pointer VARS+2, and store the result in local variable storage 813 location 2, that is identified by pointer VARS+2. In this way, the two load instructions are folded into execution of an operation corresponding to instruction iadd. Two instruction cycles and the intermediate data state illustrated in FIG. 9B are eliminated. In addition, instruction istore is also folded into execution of the operation corresponding to instruction iadd, eliminating another instruction cycle, for a total of three, and the intermediate data state illustrated in FIG. 9C. In various alternative embodiments, instruction folding in accordance with the present invention may eliminate loads, stores, or both loads and stores.

Figure 13:
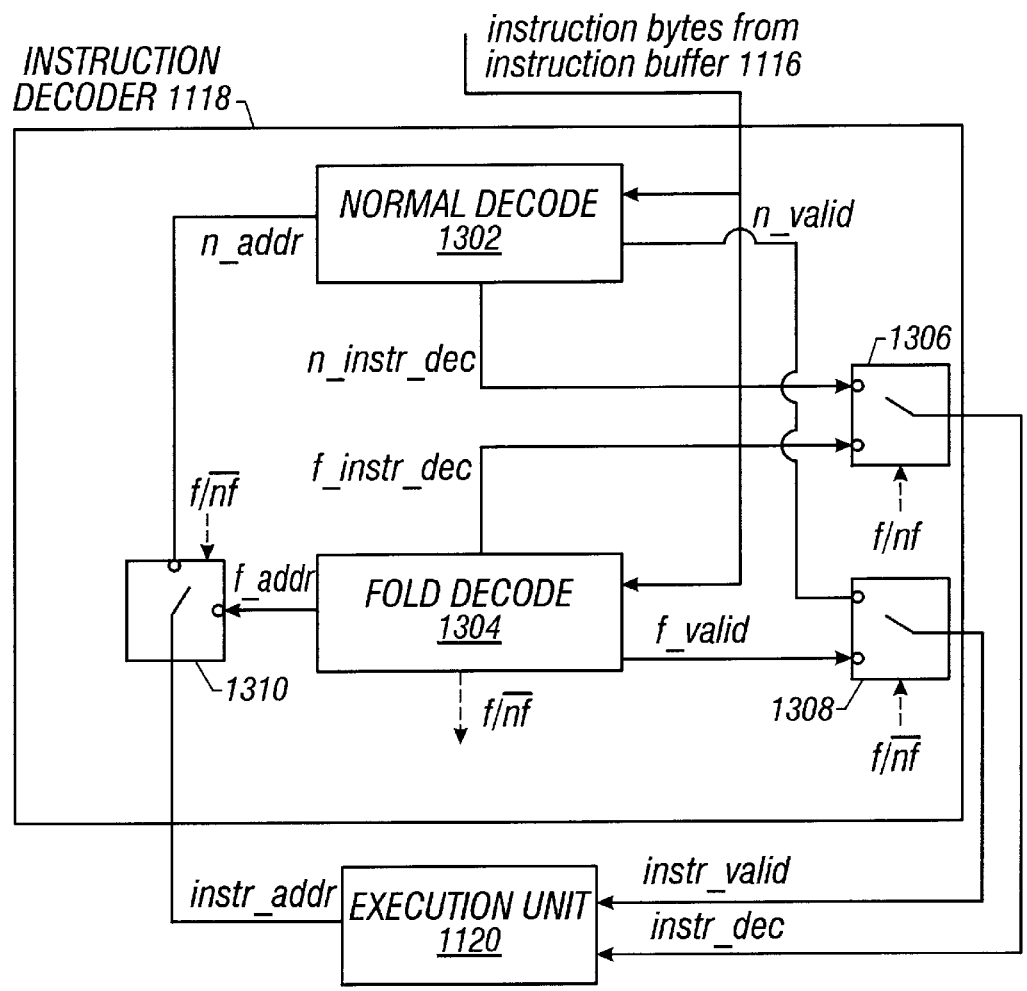
FIG. 13 is a functional block diagram of an instruction decoder supporting instruction folding in accordance with an exemplary embodiment of the present invention.

FIG. 13 depicts an exemplary embodiment of an instruction decoder 1118 providing both folded and unfolded decoding of bytecodes. Selection of a folded or unfolded operating mode for instruction decoder 1118 is based on the particular sequence of bytecodes fetched into instruction buffer 1116 and subsequently accessed by instruction decoder 1118. A normal decode portion 1302 and a fold decode portion 1304 of instruction decoder 1118 are configured in parallel to provide support for unfolded and folded execution, respectively.

In the embodiment of FIG. 13, fold decode portion 1304 detects opportunities for folding execution of bytecodes in the bytecode sequence fetched into instruction buffer 1116. A detection of such a foldable sequence triggers selection of the output of fold decode portion 1304, rather than normal decode portion 1302, for provision to execution unit 1120. Advantageously, selection of folded or unfolded decoding is transparent to execution unit 1120, which simply receives operation information over bus instr_dec and associated operand source and result destination addressing information over bus instr_addr, and which need not know whether the information corresponds to a single instruction or a folded instruction sequence.

Normal decode portion 1302 functions to inspect a single bytecode from instruction buffer 1116 during each instruction cycle, and generates the following indications in response thereto:

1. a normal instruction decode signal n_instr_dec, which specifies an operation, e.g., integer addition, corresponding to the decoded instruction, is provided to a first set of input terminals of switch 1306;
2. a normal address signal n_adr, which makes explicit the source and destination addresses, e.g., first operand address=OPTOP, second operand address=OPTOP-1, and destination address=OPTOP-1 for an instruction iadd, for the decoded instruction, is provided to a first bus input of switch 1310;
3. a net change in pointer OPTOP signal n_delta_optop, e.g., for the instruction iadd, net change=-1, which in the embodiment of FIG. 13 is encoded as a component of normal address signal n_adr; and
4. an instruction valid signal instr_valid, which indicates whether normal instruction decode signal n_instr_dec specifies a valid operation, is provided to a first input terminal of switch 1308.

In contrast with normal decode portion 802, and as discussed in greater detail below, fold decode portion 804 of instruction decoder 618 inspects sequences of bytecodes from the instruction buffer 616 and determines whether operations corresponding to these sequences (e.g., the sequence iload value1 from local variable 0, iload value2 from local variable 2, iadd, and istore sum to local variable 2) can be folded together to eliminate unnecessary temporary storage of instruction operands and/or results on the operand stack. When fold decode portion 804 determines that a sequence of bytecodes in instruction buffer 616 can be folded together, fold decode portion 804 generates the following indications:

1. a folded instruction decode signal f_instr_dec, which specifies an equivalent operation, e.g., integer addition corresponding to the folded instruction sequence, is provided to a second set of input terminals of switch 1306;
2. a folded address signal f_adr, which specifies source and destination addresses for the equivalent operation, e.g., first operand address=VARS, second operand address=VARS+2, and destination address=VARS+2, is provided to a second bus input of switch 1310;
3. a net change in pointer OPTOP signal f_delta_optop, e.g., for the above sequence net change=0, which in the embodiment of FIG. 13 is encoded as a component of normal address signal n_adr; and
4. a folded instruction valid signal f_Valid, which indicates whether folded instruction decode signal f_instr_dec specifies a valid operation, is provided to a second input terminal of switch 1308.

Fold decode portion 804 also generates a signal on fold line f/nf which indicates whether a sequence of bytecodes in instruction buffer 1116 can be folded together. The signal on fold line f/nf is provided to control inputs of switches 1306, 1310 and 1308. If a sequence of bytecodes in instruction buffer 1116 can be folded together, the signal on fold line f/nf causes switches 1306, 1310 and 1308 to select respective second inputs for provision to execution unit 1120, i.e., to source folded instruction decode signal f_instr_dec, folded address signal f_adr, and folded instruction valid signal f_valid from fold decode portion 804. If a sequence of bytecodes in instruction buffer 1116 cannot be folded together, the signal on fold line f/nf causes switches 1306, 1310 and 1308 to select respective first inputs for provision to execution unit 1120, i.e., to source normal instruction decode signal n_instr_dec, normal address signal n_adr, and normal instruction valid signal n_valid from fold decode portion 804.

In some embodiments in accordance with the present invention, the operation of fold decode portion 1304 is suppressed in response to an active suppress folding signal suppress_fold supplied from outside instruction decoder 1118. In response to an asserted suppress folding signal suppress_fold (see FIG. 14), the signal on fold line f/nf remains in a state selective for respective first inputs of switches 1306, 1310 and 1308 even if the particular bytecode sequence presented by instruction buffer 1116 would otherwise trigger folding. For example, in one such embodiment, suppress folding signal suppress_fold is asserted when the local variable storage 813 entry identified by pointer VARS is not cached, e.g., when entries in operand stack 812 have displaced local variable storage 813 from a stack cache 155. In accordance with the exemplary embodiment described therein. a stack cache and cache control mechanism representing at least a portion of operand stack 812 and local variable storage 813 may advantageously assert suppress folding signal suppress_fold if fold-relevant entries of local variable storage 813 or operand stack 812 are not represented in stack cache 155.

Figure 14:
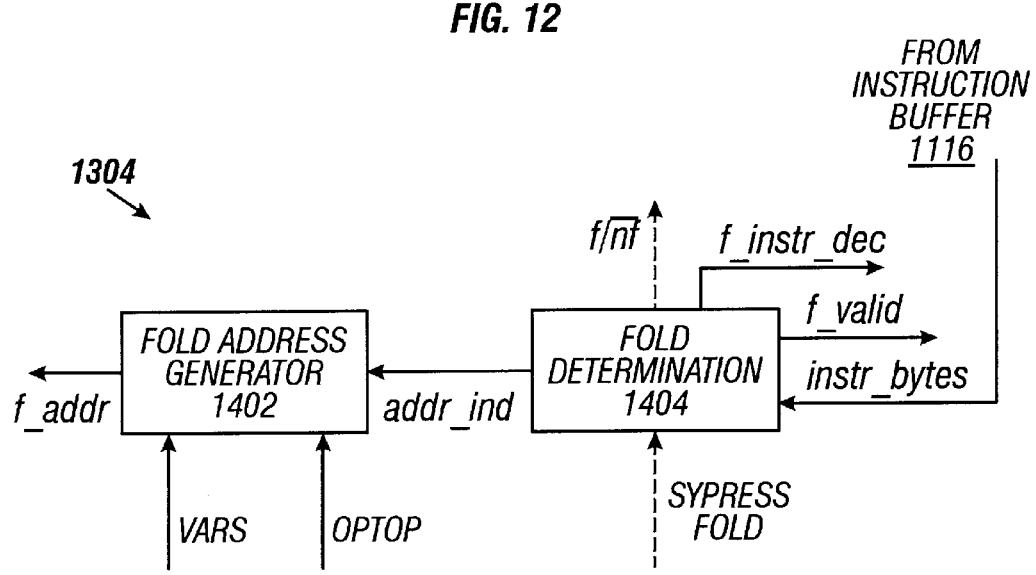
FIG. 14 is a functional block diagram of a fold decode portion of an instruction decoder supporting instruction folding in accordance with an exemplary embodiment of the present invention.

FIG. 14 illustrates fold decode portion 1304 of instruction decoder 1118 in greater detail. A fold determination portion 1404 selectively inspects the sequence of bytecodes in instruction buffer 1116. If the next bytecode and one or more subsequent bytecodes represent a foldable sequence of operations (as discussed below with respect to FIG. 15), then fold determination portion 1404 supplies a fold-indicating signal on fold line f/nf and a folded instruction decode signal f_instr_dec that specifies an equivalent folded operation. Folded instruction decode signal f_instr_dec is supplied to execution unit 1120 as the decoded instruction instr_dec. In an exemplary embodiment, a foldable sequence of operations includes those associated with 2, 3, or 4 bytecodes from instruction decoder 1118 (up to 2 bytecodes loading operands onto operand stack 812, a bytecode popping the operand(s), operating thereupon, and pushing a result onto operand stack 812, and a bytecode popping the result from operand stack 812 and storing the result. The equivalent folded operation, which is encoded by the folded instruction decode signal f_instr_dec, specifies an operation, that when combined with folded execution addressing information obviates the loads to, and stores from, operand stack 812.

Alternative embodiments may fold only two instructions, e.g., an instruction iload into an instruction iadd or an instruction istore back into an immediately prior instruction iadd. Other alternative embodiments may fold only instructions that push operands onto the operand stack, e.g., one or more instructions iload folded into an instruction iadd, or only instructions that pop results from the operand stack, e.g., an instruction istore back into an immediately prior instruction iadd. Further alternative embodiments may fold larger numbers of instructions that push operands onto the operand stack and/or instructions that pop results from the operand stack instructions in accordance with instructions of a particular virtual machine instruction set. In such alternative embodiments, the above described advantages over normal decoding and execution of instruction sequences are still obtained.

Fold determination portion 1404 generates a series of fold address index composite signal f_adr_ind including component first operand index signal first_adr_ind, second operand index signal second_adr_ind, and destination index signal dest_adr_ind, which are respectively selective for a first operand address, a second operand address, and a destination address for the equivalent folded operation. Fold determination portion 1404 provides the composite signal f_adr_ind to fold address generator 1402 for use in supplying operand and destination addresses for the equivalent folded operation. Fold determination portion 1404 asserts a fold-indicating signal on fold line f/nf to control the switches 1306, 1310 and 1308 (see FIG. 13) to provide the signals f_instr_dec, f_adr, and f_valid, as signals instr_dec, instr_adr, and instr_valid, respectively. Otherwise respective signals are provided to execution unit 1120 from normal decode portion 1302.

The operation of fold determination portion 1404 is now described with reference to the flowchart of FIG. 15. At start 1501, fold determination portion 1404 begins an instruction decode cycle and transfers processing to initialize index 1502. In initialize index 1502, an instruction index instr_index into instruction buffer 1116 is initialized to identify the next bytecode of a bytecode sequence in instruction buffer 1116. In an exemplary embodiment, instruction index instr_index is initialed to one (1) and the next bytecode is the first bytecode in instruction buffer 1116 since prior bytecodes have already been shifted out of instruction buffer 1116, although a variety of other indexing and instruction buffer management schemes would also be suitable. Upon completion, initialize index 1502 transfers processing to first instruction check 1504.

In first instruction check 1504, fold determination portion 1404 determines whether the instruction identified by index instr_index, i.e., the first bytecode, corresponds to an operation that pushes a value, e.g., an integer value, a floating point value, a reference value, etc., onto operand stack 812. Referring illustratively to a JAVA virtual machine embodiment, first instruction check 1504 determines whether the instruction identified by index instr_index is one that the JAVA virtual machine specification (see Section I) defines as for pushing a first data item onto the operand stack. If so, first operand index signal first_adr_ind is asserted (at first operand address setting 1506) to identify the source of the first operand value. In an exemplary embodiment, first operand index signal first_adr_ind is selective for one of OPTOP, OPTOP−1, OPTOP−2, VARS, VARS+1, VARS+2, and VARS+3, although alternative embodiments may encode larger, smaller, or different sets of source addresses, including for example, source addresses in constant area 814. Depending on the bytecodes which follow, this first bytecode may correspond to an operation which can be folded into the execution of a subsequent operation. However, if the first bytecode does not meet the criteria of first instruction check 1504, folding is not appropriate and fold determination portion 1404 supplies a nonfold-indicating signal on fold line f/nf, whereupon indications from normal decode portion 1302 provide the decoding.

Assuming the first bytecode meets the criteria of first instruction check 1504, index instr_index is incremented (at incrementing 1508) to point to the next bytecode in instruction buffer 1116. Then, at second instruction check 1510, fold determination portion 1404 determines whether instruction identified by index instr_index, i.e., the second bytecode, corresponds to an operation that pushes a value, e.g., an integer value, a floating point value, a reference value, etc., onto operand stack 812. Referring illustratively to a JAVA virtual machine embodiment, second instruction check 1510 determines whether the instruction identified by index instr_index is one that the JAVA virtual machine specification (see Section I) defines as for pushing a first data item onto the operand stack. If so, second operand index signal second_adr_ind is asserted (at second operand address setting 1512) to indicate the source of the second operand value and index instr_index is incremented (at incrementing 1514) to point to the next bytecode in instruction buffer 1116. As before, second operand index signal second_adr_ind is selective for one of OPTOP, OPTOP−1, OPTOP−2, VARS, VARS+1, VARS+2, and VARS+3, although alternative embodiments are also suitable. Fold determination portion 1404 continues at third instruction check 1516 with index instr_index pointing to either the second or third bytecode in instruction buffer 1116.

At third instruction check 1516, fold determination portion 1404 determines whether the instruction identified by index instr_index, i.e., either the second or third bytecode, corresponds to an operation that operates on an operand value or values, e.g., integer value(s), floating point value(s), reference value(s), etc., from the uppermost entries of operand stack 812, effectively popping such operand values from operand stack 812 and pushing a result value onto operand stack 812. Popping of operand values may be explicit or merely a net effect of writing the result value to an upper entry of operand stack 812 and updating pointer OPTOP to identify that entry as the top of operand stack 812. Referring illustratively to a JAVA virtual machine embodiment, third instruction check 1516 determines whether the instruction identified by index instr_index corresponds to an operation that the JAVA virtual machine specification (see Section I) defines as for popping a data item (or items) from the operand stack, for operating on the popped data item(s), and for pushing a result of the operation onto the operand stack. If so, index instr_index is incremented (at incrementing 1518) to point to the next bytecode in instruction buffer 1116. If not, folding is not appropriate and fold determination portion 1404 supplies a nonfold-indicating signal on fold line f/nf, whereupon normal decode portion 1302 provides decoding.

At fourth instruction check 1520, fold determination portion 1404 determines whether the instruction identified by index instr_index, i.e., either the third or fourth bytecode, corresponds to an operation that pops a value from operand stack 812 and stores the value in a data store such as local variable storage 813. Referring illustratively to a JAVA virtual machine embodiment, fourth instruction check 1520 determines whether the instruction identified by index instr_index corresponds to an operation that the JAVA virtual machine specification (see Section I) defines as for popping the result data item from the operand stack. If so, index signal dest_adr_ind is asserted (at destination address setting 1522) to identify the destination of the result value of the equivalent folded operation. Otherwise, if the bytecode at instruction buffer 1116 location identified by index instr_index does not match the criterion of fourth instruction check 1520, index signal dest_adr_ind is asserted (at destination address setting 1124) to identify the top of operand stack 812. Referring illustratively to a JAVA virtual machine embodiment, if the instruction identified by index instr_index does not match the criterion of fourth instruction check 1520, index signal dest_adr_ind is asserted (at destination address setting 1124) to identify the pointer OPTOP, Whether the top of operand stack 812 or a store operation destination is selected, the folded instruction valid signal f_valid is asserted (at valid fold asserting 1126) and a fold-indicating signal on line f/nf is supplied to select fold decode inputs of switches 1306, 1308, and 1310 for supply to execution unit 1120. Fold determination portion 1404 ends an instruction decode cycle at finish 1550.

As a simplification, an instruction decoder for hardware processor 100, e.g., instruction decoder 135, may limit fold decoding to instruction sequences of two instructions and/or to sequences of single bytecode instructions. Those of skill in the art will appreciate suitable simplifications to fold decode portion 1304 of instruction decoder 1118.

Figure 16:
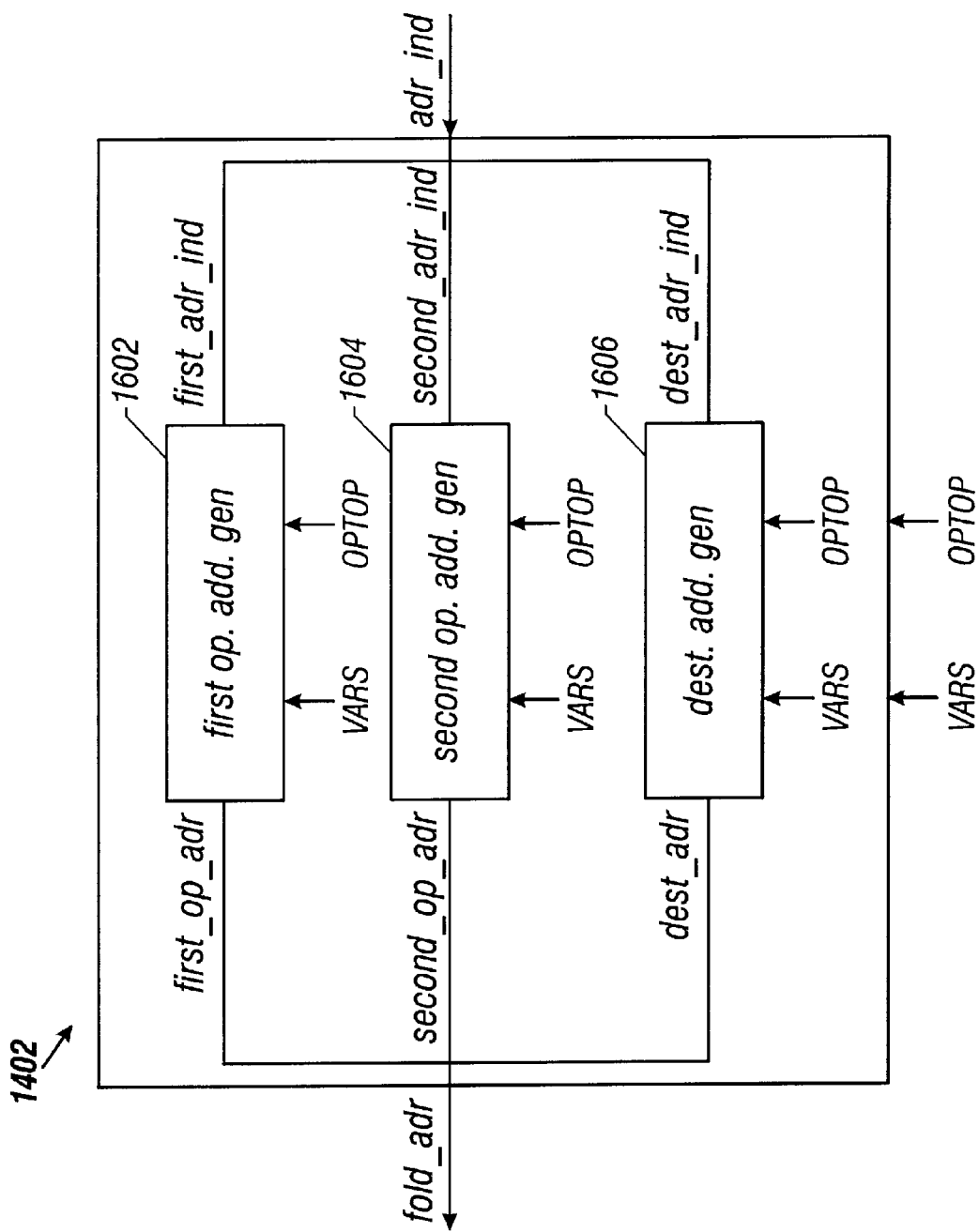
FIG. 16 is a functional block diagram depicting component operand and destination address generators of a fold address generator in accordance with an exemplary embodiment of the present invention.

FIG. 16 shows fold address generator 1402 including three component address generators, first operand address generator 1602, second operand address generator 1604, and destination address generator 1606, respectively supplying a corresponding first operand, second operand, and destination address based on indices supplied thereto and pointer VARS and pointer OPTOP values from pointer registers 822. In an exemplary embodiment, first operand address generator 1602, second operand address generator 1604, and destination address generator 1606 supply addresses in randomly-accessible storage 810 corresponding to a subset of operand stack 812 and local variable storage 813 entries. Alternative embodiments may supply identifiers selective for storage other than random access memory, e.g., physical registers, which in a particular JAVA virtual machine implementation provide underlying operand stack and local variable storage.

First operand address generator 1602 receives first operand index signal first_adr_ind from fold determination portion 1404 and, using pointer VARS and pointer OPTOP values from pointer registers 822, generates a first operand address signal first_op_adr for a first operand for the equivalent folded operation. The operation of second operand address generator 1604 and destination address generator 1606 is analogous. Second operand address generator 1604 receives first operand index signal first_adr_ind and generates a second operand address signal second_op_adr for a second operand (if any) for the equivalent folded operation. Destination address generator 1606 receives the destination index signal dest_ad_ind and generates the destination address signal dest_adr for the result of the equivalent folded operation. In the embodiment of FIGS. 13, 14, and 16, first operand address signal first_op_adr, second operand address signal second_op_adr, and destination address signal dest_adr are collectively supplied to switch 1310 as fold address signal f_adr for supply to execution unit 1120 as the first operand, second operand, and destination addresses for the equivalent folded operation.

Figure 17:
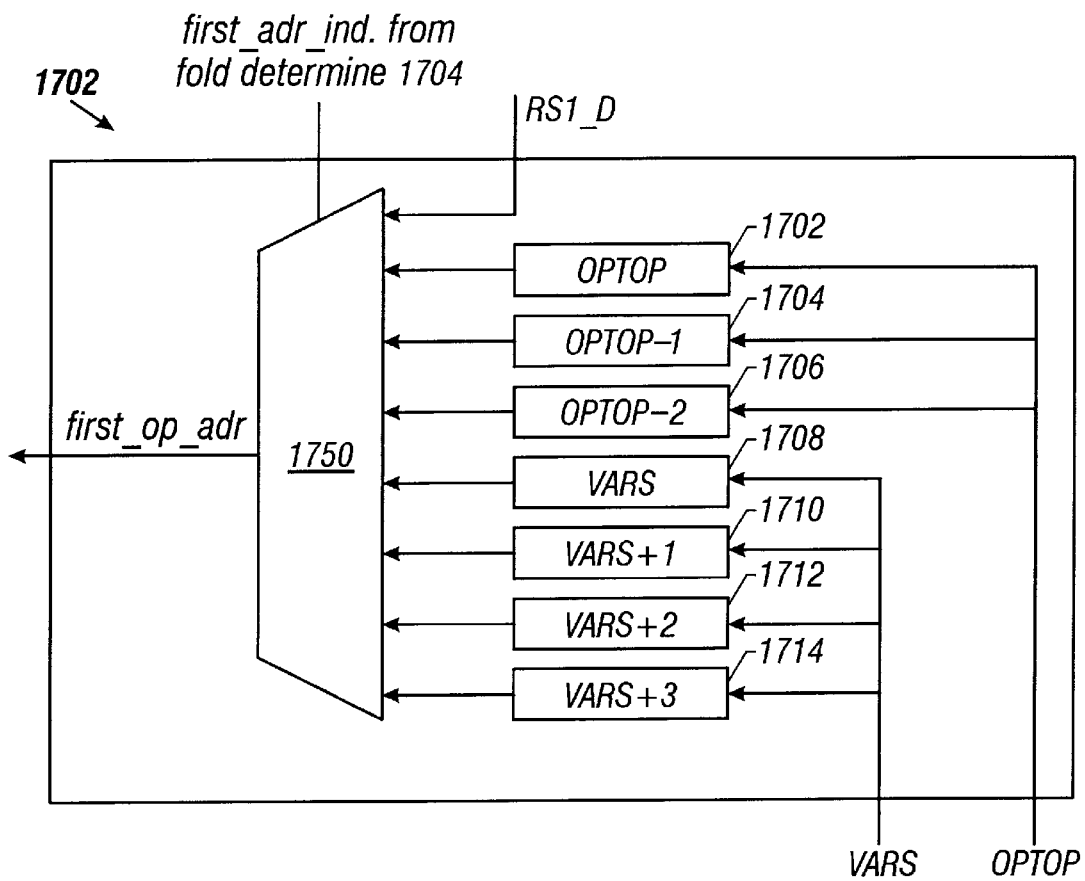
FIG. 17 is a functional block diagram depicting an exemplary structure for an operand address generator in accordance with an exemplary embodiment of the present invention.

FIG. 17 illustrates an exemplary embodiment of first operand address generator 1602. Second operand address generator 1604 and destination address generator 1606 are analogous. In the exemplary embodiment of FIG. 17, first operand address signal first_op_adr is selected from a subset of locations in local variable storage 813 and operand stack 812. Alternative embodiments may generate operand and destination addresses from a larger, smaller, or different subset of operand stack 812 and local variable storage 813 locations or from a wider range of locations in randomly-accessible storage 810. For example, alternative embodiments may generate addresses selective for location in constant area 814. Suitable modifications to the exemplary embodiment of FIG. 17 will be apparent to those of skill in the art. first operand address generator 1602, second operand address generator 1604, and destination address generator 1606 may advantageously define differing sets of locations. For example, whereas locations in constant area 814 and in the interior of operand stack 812 are valid as operand sources, they are not typically appropriate result targets. For this reason, the set of locations provided by an exemplary embodiment of destination address generator 1606 is restricted to local variable storage 813 entries and uppermost entries of operand stack 812, although alternative sets are also possible.

Referring to FIG. 17, pointer OPTOP is supplied to register 1702, which latches the value and provides the latched value to a first input of a data selector 1750. Similarly, pointer OPTOP is supplied to registers 1704 and 1706, which latch the value minus one and minus two, respectively, and provide the latched values to second and third inputs of data selector 1750. In this way, addresses identified by values OPTOP, OPTOP−1, and OPTOP−2 are available for selection by data selector 1750. Similarly, pointer VARS is supplied to a series of registers 1708, 1710, 1712 and 1714, which respectively latch the values VARS, VARS+1, VARS+2, and VARS+3 for provision to the fourth, fifth, sixth, and seventh inputs of data selector 1750. In this way, addresses identified by values VARS, VARS+1, VARS+2, and VARS+3 are available for selection by data selector 1750. In the exemplary embodiment described herein, offsets from pointer VARS are positive because local variable storage 813 is addressed from its base (identified by pointer VARS) while offsets to pointer OPTOP are negative because operand stack 812 is addressed from its top (identified by pointer OPTOP).

Data selector 1750 selects from among the latched addresses available at its inputs. In an embodiment of fold determination portion 1404 in accordance with the FIG. 17 embodiment of first operand address generator 1602, load source addresses in local variable storage 813 other than those addressed by values VARS, VARS+1, VARS+2, and VARS+3 are handled as unfoldable and decoded via normal decode portion 1302. However, suitable modifications for expanding the set of load addresses supported will be apparent to those of skill in the art. Second operand address generator 1604 and destination address generator 1606 are of analogous design, although destination address generator 1606 does not provide support for addressing into constant area 814.

In one embodiment in accordance with the present invention, signal RS1_D is supplied to the zeroth input of data selector 1750. In this embodiment, additional decode logic (not shown) allows for direct supply of register identifier information to support an alternate instruction set. Addition decode logic support for such an alternate instruction set is described in greater detail in a U.S. Pat. No. 5,925,123 entitled "A PROCESSOR FOR EXECUTING INSTRUCTION SETS RECEIVED FROM A NETWORK OR FROM A LOCAL MEMORY" naming Marc Tremblay and James Michael O'Connor as inventors, assigned to the assignee of this application, and filed on even date herewith with, the detailed description of which is incorporated herein by reference.

Referring back to FIG. 13, when fold determination portion 1404 of fold decode portion 1304 identifies a foldable bytecode sequence, fold determination portion 1404 asserts a fold-indicating signal on line f/nf, supplies an equivalent folded operation as folded instruction decode signal f_instr_dec, and supplies, based on load and store instructions from the foldable bytecode sequence, indices into latched addresses maintained by first operand address generator 1602, second operand address generator 1604, and destination address generator 1606. Fold decode portion 1304 supplies the addresses so indexed as folded address signal f_adr. Responsive to the signal on line tinf, switches 1306, 1308, 1310 supply decode information for the equivalent folded operation to execution unit 1120.

Although fold decode portion 804 has been described above in the context of an exemplary four instruction foldable sequence, it is not limited thereto. Based on the description herein, those of skill in the art will appreciate suitable extensions to support folding of additional instructions and longer foldable instruction sequences, e.g., sequences of five or more instructions. By way of example and not of limitation, support for additional operand address signals, e.g., a third operand address signal, and/or for additional destination address signals, e.g., a second destination address signal, could be provided.

Integer Execution Unit

Referring again to FIG. 1, integer execution unit IEU, that includes instruction decode unit 130, integer unit 142, and stack management unit 150, is responsible for the execution of all the virtual machine instructions except the floating point related instructions. The floating point related instructions are executed in floating point unit 143.

Integer execution unit IEU interacts at the front end with instructions cache unit 120 to fetch instructions, with floating point unit (FPU) 143 to execute floating point instructions, and finally with data cache unit (DCU) 160 to execute load and store related instructions. Integer execution unit IEU also contains microcode ROM 149 which contains instructions to execute certain virtual machine instructions associated with integer operations.

Integer execution unit IEU includes a cached portion of stack 400, i.e., stack cache 155. Stack cache 155 provides fast storage for operand stack and local variable entries associated with a current method, e.g., operand stack 423 and local variable storage 421 entries. Although, stack cache 155 may provide sufficient storage for all operand stack and local variable entries associated with a current method, depending on the number of operand stack and local variable entries, less than all of local variable entries or less than all of both local variable entries and operand stack entries may be represented in stack cache 155. Similarly, additional entries, e.g., operand stack and or local variable entries for a calling method, may be represented in stack cache 155 if space allows.

Stack cache 155 is a sixty-four entry thirty-two-bit wide array of registers that is physically implemented as a register file in one embodiment. Stack cache 155 has three read ports, two of which are dedicated to integer execution unit IEU and one to dribble manager unit 151. Stack cache 155 also has two write ports, one dedicated to integer execution unit IEU and one to dribble manager unit 151.

Integer unit 142 maintains the various pointers which are used to access variables, such as local variables, and operand stack values, in stack cache 155. Integer unit 142 also maintains pointers to detect whether a stack cache hit has taken place. Runtime exceptions are caught and dealt with by exception handlers that are implemented using information in microcode ROM 149 and circuit 170.

Integer unit 142 contains a 32-bit ALU to support arithmetic operations. The operations supported by the ALU include: add, subtract, shift, and, or, exclusive or, compare, greater than, less than, and bypass. The ALU is also used to determine the address of conditional branches while a separate comparator determines the outcome of the branch instruction.

The most common set of instructions which executes cleanly through the pipeline is the group of ALU instructions. The ALU instructions read the operands from the top of stack 400 in decode stage 302 and use the ALU in execution stage 303 to compute the result. The result is written back to stack 400 in write-back stage 305. There are two levels of bypass which may be needed if consecutive ALU operations are accessing stack cache 155.

Since the stack cache ports are 32-bits wide in this embodiment, double precision and long data operations take two cycles. A shifter is also present as part of the ALU. If the operands are not available for the instruction in decode stage 302, or at a maximum at the beginning of execution stage 303, an interlock holds the pipeline stages before execution stage 303.

The instruction cache unit interface of integer execution unit IEU is a valid/accept interface, where instruction cache unit 120 delivers instructions to integer decode unit 130 in fixed fields along with valid bits. Instruction decoder 135 responds by signaling how much byte aligner circuit 122 needs to shift, or how many bytes instruction decode unit 130 could consume in decode stage 302. The instruction cache unit interface also signals to instruction cache unit 120 the branch mis-predict condition, and the branch address in execution stage 303. Traps, when taken, are also similarly indicated to instruction cache unit 120. Instruction cache unit 120 can hold integer unit 142 by not asserting any of the valid bits to instruction decode unit 130. Instruction decode unit 130 can hold instruction cache unit 120 by not asserting the shift signal to byte aligner circuit 122.

The data cache interface of integer execution unit IEU also is a valid-accept interface, where integer unit 142 signals, in execution stage 303, a load or store operation along with its attributes, e.g., non-cached, special stores etc., to data cache controller 161 in data cache unit 160. Data cache unit 160 can return the data on a load, and control integer unit 142 using a data control unit hold signal. On a data cache hit, data cache unit 160 returns the requested data, and then releases the pipeline.

On store operations, integer unit 142 also supplies the data along with the address in execution stage 303. Data cache unit 165 can hold the pipeline in cache stage 304 if data cache unit 165 is busy, e.g., doing a line fill etc.

Floating point operations are dealt with specially by integer execution unit IEU. Instruction decoder 135 fetches and decodes floating point unit 143 related instructions. Instruction decoder 135 sends the floating point operation operands for execution to floating point unit 142 in decode state 302. While floating point unit 143 is busy executing the floating point operation, integer unit 142 halts the pipeline and waits until floating point unit 143 signals to integer unit 142 that the result is available.

A floating point ready signal from floating point unit 143 indicates that execution stage 303 of the floating point operation has concluded. In response to the floating point ready signal, the result is written back into stack cache 155 by integer unit 142. Floating point load and stores are entirely handled by integer execution unit IEU, since the operands for both floating point unit 143 and integer unit 142 are found in stack cache 155.

Stack Management Unit

A stack management unit 150 stores information, and provides operands to execution unit 140. Stack management unit 150 also takes care of overflow and underflow conditions of stack cache 155.

In one embodiment, stack management unit 150 includes stack cache 155 that, as described above, is a three read port, two write port register file in one embodiment; a stack control unit 152 which provides the necessary control signals for two read ports and one write port that are used to retrieve operands for execution unit 140 and for storing data back from a write-back register or data cache 165 into stack cache 155; and a dribble manager 151 which speculatively dribbles data in and out of stack cache 155 into memory whenever there is an overflow or underflow in stack cache 155. In the exemplary embodiment of FIG. 1, memory includes data cache 165 and any memory storage interfaced by memory interface unit 110. In general, memory includes any suitable memory hierarchy including caches, addressable read/write memory storage, secondary storage, etc. Dribble manager 151 also provides the necessary control signals for a single read port and a single write port of stack cache 155 which are used exclusively for background dribbling purposes.

In one embodiment, stack cache 155 is managed as a circular buffer which ensures that the stack grows and shrinks in a predictable manner to avoid overflows or overwrites. The saving and restoring of values to and from data cache 165 is controlled by dribbler manager 151 using high- and low-water marks, in one embodiment.

Stack management unit 150 provides execution unit 140 with two 32-bit operands in a given cycle. Stack management unit 150 can store a single 32-bit result in a given cycle.

Dribble manager 151 handles spills and fills of stack cache 155 by speculatively dribbling the data in and out of stack cache 155 from and to data cache 165. Dribble manager 151 generates a pipeline stall signal to stall the pipeline when a stack overflow or underflow condition is detected. Dribble manager 151 also keeps track of requests sent to data cache unit 160. A single request to data cache unit 160 is a 32-bit consecutive load or store request.

The hardware organization of stack cache 155 is such that, except for long operands (long integers and double precision floating-point numbers), implicit operand fetches for opcodes do not add latency to the execution of the opcodes. The number of entries in operand stack 423 (FIG. 4A) and local variable storage 422 that are maintained in stack cache 155 represents a hardware/performance tradeoff. At least a few operand stack 423 and local variable storage 422 entries are required to get good performance. In the exemplary embodiment of FIG. 1, at least the top three entries of operand stack 423 and the first four local variable storage 422 entries are preferably represented in stack cache 155.

One key function provided by stack cache 155 (FIG. 1) is to emulate a register file where access to the top two registers is always possible without extra cycles. A small hardware stack is sufficient if the proper intelligence is provided to load/store values from/to memory in the background, therefore preparing stack cache 155 for incoming virtual machine instructions.

As indicated above, all items on stack 400 (regardless of size) are placed into a 32-bit word. This tends to waste space if many small data items are used, but it also keeps things relatively simple and free of lots of tagging or muxing. An entry in stack 400 thus represents a value and not a number of bytes. Long integer and double precision floating-point numbers require two entries. To keep the number of read and write ports low, two cycles to read two long integers or two double precision floating point numbers are required.

The mechanism for filling and spilling the operand stack from stack cache 155 out to memory by dribble manager 151 can assume one of several alternative forms. One register at a time can be filled or spilled, or a block of several registers filled or spilled at once. A simple scoreboarded method is appropriate for stack management. In its simplest form, a single bit indicates if the register in stack cache 155 is currently valid. In addition, some embodiments of stack cache 155 use a single bit to indicate whether the data content of the register is saved to stack 400, i.e., whether the register is dirty. In one embodiment, a high-water mark/low-water mark heuristic determines when entries are saved to and restored from stack 400, respectively (FIG. 4A). Alternatively, when the top-of-the-stack becomes close to bottom 401 of stack cache 155 by a fixed, or alternatively, a programmable number of entries, the hardware starts loading registers from stack 400 into stack cache 155. For other embodiments of stack management unit 150 and dribble manager unit 151 see U.S. patent application Ser. No. 08/787,736, entitled "METHODS AND APPARATI FOR STACK CACHING" naming Marc Tremblay and James Michael O'Connor as inventors, assigned to the assignee of this application, and filed on even date herewith with, which is incorporated herein by reference in its entirety, and see also U.S. patent application Ser. No. 08/787,617, entitled "METHOD FRAME STORAGE USING MULTIPLE MEMORY CIRCUITS" naming Marc Tremblay and James Michael O'Connor as inventors, assigned to the assignee of this application, and filed on even date herewith with, which also is incorporated herein by reference in its entirety.

In one embodiment, stack management unit 150 also includes an optional local variable look-aside cache 153. Cache 153 is most important in applications where both the local variables and operand stack 423 (FIG. 4A) for a method are not located on stack cache 155. In such instances when cache 153 is not included in hardware processor 100, there is a miss on stack cache 155 when a local variable is accessed, and execution unit 140 accesses data cache unit 160, which in turn slows down execution. In contrast, with cache 153, the local variable is retrieved from cache 153 and there is no delay in execution.

Figure 4D:
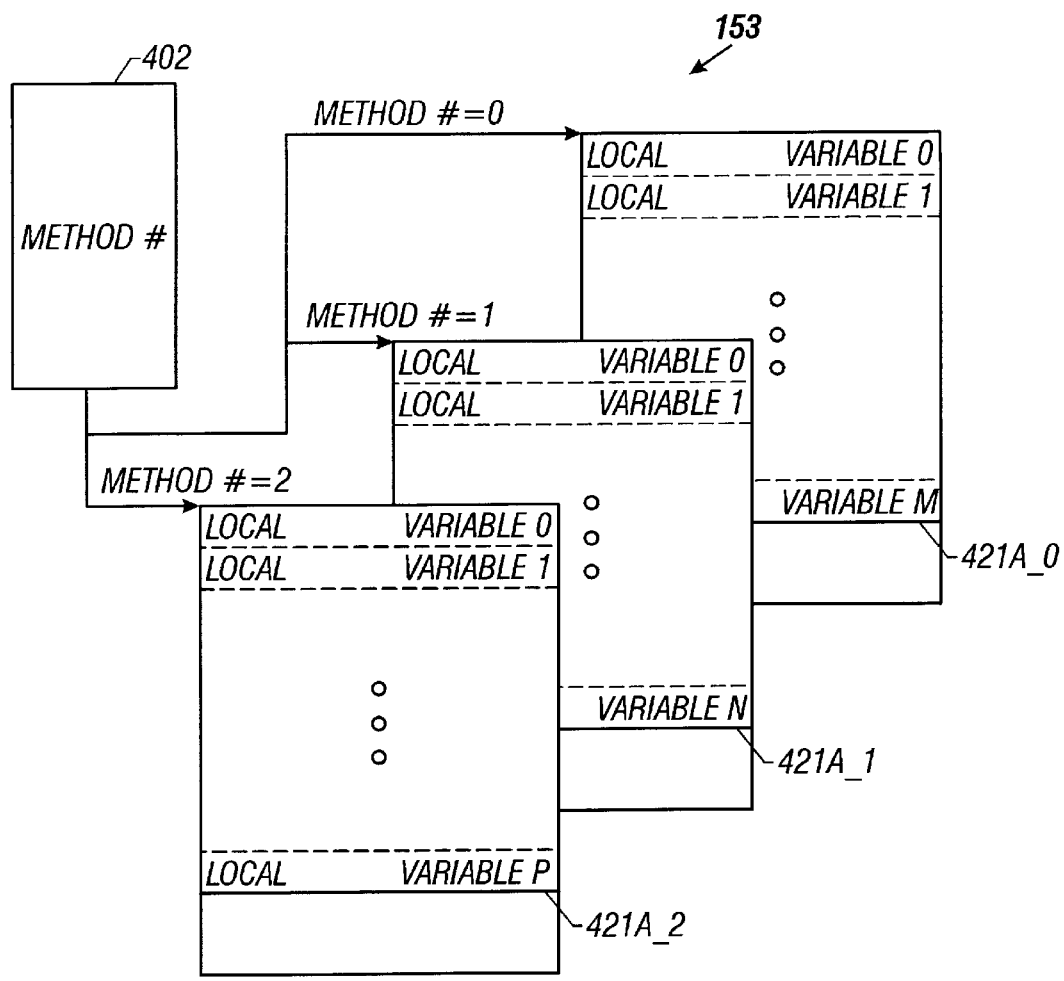
FIG. 4D is an illustration of one embodiment of the local variables look- aside cache in the stack management unit of FIG. 1.

One embodiment of local variable look-aside cache 153 is illustrated in FIG. 4D for method 0 to 2 on stack 400. Local variables zero to M, where M is an integer, for method 0 are stored in plane 421A_0 of cache 153 and plane 421A_0 is accessed when method number 402 is zero. Local variables zero to N, where N is an integer, for method 1 are stored in plane 421A_1 of cache 153 and plane 421A_1 is accessed when method number 402 is one. Local variables zero to P, where P is an integer, for method 1 are stored in plane 421A_2 of cache 153 and plane 421A_2 is accessed when method number 402 is two. Notice that the various planes of cache 153 may be different sizes, but typically each plane of the cache has a fixed size that is empirically determined.

When a new method is invoked, e.g., method 2, a new plane 421 A_2 in cache 153 is loaded with the local variables for that method, and method number register 402, which in one embodiment is a counter, is changed, e.g., incremented, to point to the plane of cache 153 containing the local variables for the new method. Notice that the local variables are ordered within a plane of cache 153 so that cache 153 is effectively a direct-mapped cache. Thus, when a local variable is needed for the current method, the variable is accessed directly from the most recent plane in cache 153, i.e., the plane identified by method number 402. When the current method returns, e.g., method 2, method number register 402 is changed, e.g., decremented, to point at previous plane 421A_1 of cache 153. Cache 153 can be made as wide and as deep as necessary.

Data Cache Unit

Data cache unit 160 (DCU) manages all requests for data in data cache 165. Data cache requests can come from dribbling manager 151 or execution unit 140. Data cache controller 161 arbitrates between these requests giving priority to the execution unit requests. In response to a request, data cache controller 161 generates address, data and control signals for the data and tags RAMs in data cache 165. For a data cache hit, data cache controller 161 reorders the data RAM output to provide the right data.

Data cache controller 161 also generates requests to I/O bus and memory interface unit 110 in case of data cache misses, and in case of non-cacheable loads and stores. Data cache controller 161 provides the data path and control logic for processing non-cacheable requests, and the data path and data path control functions for handling cache misses.

For data cache hits, data cache unit 160 returns data to execution unit 140 in one cycle for loads. Data cache unit 160 also takes one cycle for write hits. In case of a cache miss, data cache unit 160 stalls the pipeline until the requested data is available from the external memory. For both non-cacheable loads and stores, data cache 161 is bypassed and requests are sent to I/O bus and memory interface unit 110. Non-aligned loads and stores to data cache 165 trap in software.

Data cache 165 is a two-way set associative, write back, write allocate, 16-byte line cache. The cache size is configurable to 0, 1, 2, 4, 8, 16 Kbyte sizes. The default size is 8 Kbytes. Each line has a cache tag store entry associated with the line. On a cache miss, 16 bytes of data are written into cache 165 from external memory.

Each data cache tag contains a 20-bit address tag field, one valid bit, and one dirty bit. Each cache tag is also associated with a least recently used bit that is used for replacement policy. To support multiple cache sizes, the width of the tag fields also can be varied. If a cache enable bit in processor service register is not set, loads and stores are treated like non-cacheable instructions by data cache controller 161.

A single sixteen-byte write back buffer is provided for writing back dirty cache lines which need to be replaced. Data cache unit 160 can provide a maximum of four bytes on a read and a maximum of four bytes of data can be written into cache 161 in a single cycle. Diagnostic reads and writes can be done on the caches.

Memory Allocation Accelerator

In one embodiment, data cache unit 165 includes a memory allocation accelerator 166. Typically, when a new object is created, fields for the object are fetched from external memory, stored in data cache 165 and then the field is cleared to zero. This is a time consuming process that is eliminated by memory allocation accelerator 166. When a new object is created, no fields are retrieved from external memory. Rather, memory allocation accelerator 160 simply stores a line of zeros in data cache 165 and marks that line of data cache 165 as dirty. Memory allocation accelerator 166 is particularly advantageous with a write-back cache. Since memory allocation accelerator 166 eliminates the external memory access each time a new object is created, the performance of hardware processor 100 is enhanced.

Floating Point Unit

Floating point unit (FPU) 143 includes a microcode sequencer, input/output section with input/output registers, a floating point adder, i.e., an ALU, and a floating point multiply/divide unit. The microcode sequencer controls the microcode flow and microcode branches. The input/output section provides the control for input/output data transactions, and provides the input data loading and output data unloading registers. These registers also provide intermediate result storage.

The floating point adder-ALU includes the combinatorial logic used to perform the floating point adds, floating point subtracts, and conversion operations. The floating point multiply/divide unit contains the hardware for performing multiply/divide and remainder.

Floating point unit 143 is organized as a microcoded engine with a 32-bit data path. This data path is often reused many times during the computation of the result. Double precision operations require approximately two to four times the number of cycles as single precision operations. The floating point ready signal is asserted one-cycle prior to the completion of a given floating point operation. This allows integer unit 142 to read the floating point unit output registers without any wasted interface cycles. Thus, output data is available for reading one cycle after the floating point ready signal is asserted.

Execution Unit Accelerators

Since the JAVA Virtual Machine Specification of Section I is hardware independent, the virtual machine instructions are not optimized for a particular general type of processor, e.g., a complex instruction set computer (CISC) processor, or a reduced instruction set computer (RISC) processor. In fact, some virtual machine instructions have a CISC nature and others a RISC nature. This dual nature complicates the operation and optimization of hardware processor 100.

For example, the JAVA virtual machine specification defines opcode 171 for an instruction lookupswitch, which is a traditional switch statement. The data stream to instruction cache unit 120 includes an opcode 171, identifying the N-way switch statement, that is followed zero to three bytes of padding. The number of bytes of padding is selected so that first operand byte begins at an address that is a multiple of four. Herein, datastream is used generically to indicate information that is provided to a particular element, block, component, or unit.

Following the padding bytes in the datastream are a series of pairs of signed four-byte quantities. The first pair is special. A first operand in the first pair is the default offset for the switch statement that is used when the argument, referred to as an integer key, or alternatively, a current match value, of the switch statement is not equal to any of the values of the matches in the switch statement. The second operand in the first pair defines the number of pairs that follow in the datastream.

Each subsequent operand pair in the datastream has a first operand that is a match value, and a second operand that is an offset. If the integer key is equal to one of the match values, the offset in the pair is added to the address of the switch statement to define the address to which execution branches. Conversely, if the integer key is unequal to any of the match values, the default offset in the first pair is added to the address of the switch statement to define the address to which execution branches. Direct execution of this virtual machine instruction requires many cycles.

To enhance the performance of hardware processor 100, a look-up switch accelerator 145 is included in hardware processor 100. Look-up switch accelerator 145 includes an associative memory which stores information associated with one or more lookup switch statements. For each lookup switch statement, i.e., each instruction lookupswitch, this information includes a lookup switch identifier value, i.e., the program counter value associated with the lookup switch statement, a plurality of match values and a corresponding plurality of jump offset values.

Lookup switch accelerator 145 determines whether a current instruction received by hardware processor 100 corresponds to a lookup switch statement stored in the associative memory. Lookup switch accelerator 145 further determines whether a current match value associated with the current instruction corresponds with one of the match values stored in the associative memory. Lookup switch accelerator 145 accesses a jump offset value from the associative memory when the current instruction corresponds to a lookup switch statement stored in the memory and the current match value corresponds with one of the match values stored in the memory wherein the accessed jump offset value corresponds with the current match value.

Lookup switch accelerator 145 further includes circuitry for retrieving match and jump offset values associated with a current lookup switch statement when the associative memory does not already contain the match and jump offset values associated with the current lookup switch statement. Lookup switch accelerator 145 is described in more detail in U.S. patent application Ser. No. 08/788,811, entitled "LOOK-UP SWITCH ACCELERATOR AND METHOD OF OPERATING SAME" naming Marc Tremblay and James Michael O'Connor as inventors, assigned to the assignee of this application, and filed on even date herewith with, which is incorporated herein by reference in its entirety.

In the process of initiating execution of a method of an object, execution unit 140 accesses a method vector to retrieve one of the method pointers in the method vector, i.e., one level of indirection. Execution unit 140 then uses the accessed method pointer to access a corresponding method, i.e., a second level of indirection.

To reduce the levels of indirection within execution unit 140, each object is provided with a dedicated copy of each of the methods to be accessed by the object. Execution unit 140 then accesses the methods using a single level of indirection. That is, each method is directly accessed by a pointer which is derived from the object. This eliminates a level of indirection which was previously introduced by the method pointers. By reducing the levels of indirection, the operation of execution unit 140 can be accelerated. The acceleration of execution unit 140 by reducing the levels of indirection experienced by execution unit 140 is described in more detail in U.S. patent application Ser. No. 08/787,846, entitled "REPLICATING CODE TO ELIMINATE A LEVEL OF INDIRECTION DURING EXECUTION OF AN OBJECT ORIENTED COMPUTER PROGRAM" naming Marc Tremblay and James Michael O'Connor as inventors, assigned to the assignee of this application, and filed on even date herewith with, which is incorporated herein by reference in its entirety.

Getfield-putfield Accelerator

Other specific functional units and various translation lookaside buffer (TLB) types of structures may optionally be included in hardware processor 100 to accelerate accesses to the constant pool. For example, the JAVA virtual machine specification defines an instruction putfield, opcode 181, that upon execution sets a field in an object and an instruction getfield, opcode 180, that upon execution fetches a field from an object. In both of these instructions, the opcode is followed by an index byte one and an index byte two. Operand stack 423 contains a reference to an object followed by a value for instruction putfield, but only a reference to an object for instruction getfield.

Index bytes one and two are used to generate an index into the constant pool of the current class. The item in the constant pool at that index is a field reference to a class name and a field name. The item is resolved to a field block pointer which has both the field width, in bytes, and the field offset, in bytes.

An optional getfield- putfield accelerator 146 in execution unit 140 stores the field block pointer for instruction getfield or instruction putfield in a cache, for use after the first invocation of the instruction, along with the index used to identify the item in the constant pool that was resolved into the field block pointer as a tag. Subsequently, execution unit 140 uses index bytes one and two to generate the index and supplies the index to getfield-putfield accelerator 146. If the index matches one of the indexes stored as a tag, i.e., there is a hit, the field block pointer associated with that tag is retrieved and used by execution unit 140. Conversely, if a match is not found, execution unit 140 performs the operations described above. Getfield-putfield accelerator 146 is implemented without using self-modifying code that was used in one embodiment of the quick instruction translation described above.

In one embodiment, getfield-putfield accelerator 146 includes an associative memory that has a first section that holds the indices that function as tags, and a second section that holds the field block pointers. When an index is applied through an input section to the first section of the associative memory, and there is a match with one of the stored indices, the field block pointer associated with the stored index that matched in input index is output from the second section of the associative memory.

Bounds Check Unit

Bounds check unit 147 (FIG. 1) in execution unit 140 is an optional hardware circuit that checks each access to an element of an array to determine whether the access is to a location within the array. When the access is to a location outside the array, bounds check unit 147 issues an active array bound exception signal to execution unit 140. In response to the active array bound exception signal, execution unit 140 initiates execution of an exception handler stored in microcode ROM 141 that in handles the out of bounds array access.

In one embodiment, bounds check unit 147 includes an associative memory element in which is stored a array identifier for an array, e.g., a program counter value, and a maximum value and a minimum value for the array. When an array is accessed, i.e., the array identifier for that array is applied to the associative memory element, and assuming the array is represented in the associative memory element, the stored minimum value is as a first input signal to a first comparator element, sometimes called a comparison element, and the stored maximum value is a first input signal to a second comparator element, sometimes called a comparison element. A second input signal to the first and second comparator elements is the value associated with the access of the array's element.

If the value associated with the access of the array's element is less than or equal to the stored maximum value and greater than or equal to the stored minimum value, neither comparator element generates an output signal. However, if either of these conditions is false, the appropriate comparator element generates the active array bound exception signal. A more detailed description of one embodiment of bounds check unit 147 is provided in U.S. patent application Ser. No. 08/642,248, now abandoned entitled "PROCESSOR WITH ACCELERATED ARRAY ACCESS BOUNDS CHECKING" naming Marc Tremblay, James Michael O'Connor, and William N. Joy as inventors, assigned to the assignee of this application, and filed on even date herewith with which is incorporated herein by reference in its entirety.

The JAVA Virtual Machine Specification defines that certain instructions can cause certain exceptions. The checks for these exception conditions are implemented, and a hardware/software mechanism for dealing with them is provided in hardware processor 100 by information in microcode ROM 149 and program counter and trap control logic 170. The alternatives include having a trap vector style or a single trap target and pushing the trap type on the stack so that the dedicated trap handler routine determines the appropriate action.

No external cache is required for the architecture of hardware processor 100. No translation lookaside buffers need be supported.

Figure 5:
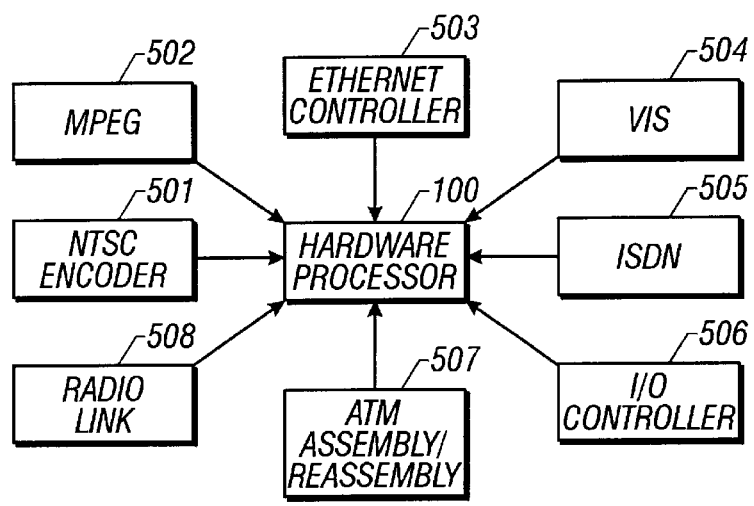
FIG. 5 illustrates several possible add-ons to the hardware processor of FIG. 1.

FIG. 5 illustrates several possible add-ons to hardware processor 100 to create a unique system. Circuits supporting any of the eight fuinctions shown, i.e., NTSC encoder 501, MPEG 502, Ethernet controller 503, VIS 504, ISDN 505, I/O controller 506, ATM assembly/reassembly 507, and radio link 508 can be integrated into the same chip as hardware processor 100 of this invention.

While the invention has been described with reference to various embodiments, it will be understood that these embodiments are illustrative and that the scope of the invention is not limited to them. Claim terms such as first instruction, second instruction, third instruction, etc. are for identification only and should not be construed to require a particular ordering of instructions. Many variations, modifications, additions, and improvements of the embodiments described are possible. For example, although the present invention has been herein described with reference to exemplary embodiments relating to the JAVA programming language and JAVA virtual machine, it is not limited to them and, instead, encompasses systems, articles, methods, and apparati for a wide variety of stack machine environments (both virtual and physical). In addition, although certain exemplary embodiments have been described in terms of hardware, suitable virtual machine implementations (JAVA related or otherwise) incorporating instruction folding in accordance with the above description include software providing a instruction folding bytecode interpreter, a just-in-time (JIT) compiler producing folded operations in object code native to a particular machine architecture, and instruction folding hardware implementing the virtual machine. These and other variations, modifications, additions, and improvements may fall within the scope of the invention as defined by the claims which follow.

SECTION I

The JAVA Virtual Machine Specification
©1993, 1994, 1995 Sun Microsystems, Inc.
2550 Garcia Avenue, Mountain View, Calif. 94043-1100 U.S.A.

All rights reserved. This BETA quality release and related documentation are protected by copyright and distributed under licenses restricting its use, copying, distribution, and decompilation. No part of this release or related documentation may be reproduced in any form by any means without prior written authorization of Sun and its licensors, if any.

Portions of this product may be derived from the UNIX® and Berkeley 4.3 BSD systems, licensed from UNIX System Laboratories, Inc. and the University of California, respectively. Third-party font software in this release is protected by copyright and licensed from Sun's Font Suppliers.

RESTRICTED RIGHTS LEGEND: Use, duplication, or disclosure by the United States Government is subject to the restrictions set forth in DFARS 252.227-7013 (c) (1) (ii) and FAR 52.227-19.

The release described in this manual may be protected by one or more U.S. patents, foreign patents, or pending applications.

TRADEMARKS

Sun, Sun Microsystems, Sun Microsystems Computer Corporation, the Sun logo, the Sun Microsystems Computer Corporation logo, WebRunner, JAVA, FirstPerson and the FirstPerson logo and agent are trademarks or registered trademarks of Sun Microsystems, Inc. The "Duke" character is a trademark of Sun Microsystems, Inc. and Copyright (c) 1992–1995 Sun Microsystems, Inc. All Rights Reserved. UNIX® is a registered trademark in the United States and other countries, exclusively licensed through X/Open Company, Ltd. OPEN LOOK is a registered trademark of Novell, Inc. All other product names mentioned herein are the trademarks of their respective owners.

All SPARC trademarks, including the SCD Compliant Logo, are trademarks or registered trademarks of SPARC International, Inc. SPARCstation, SPARCserver, SPARCengine, SPARCworks, and SPARCompiler are licensed exclusively to Sun Microsystems, Inc. Products bearing SPARC trademarks are based upon an architecture developed by Sun Microsystems, Inc.

The OPEN LOOK® and SunÔ Graphical User Interfaces were developed by Sun Microsystems, Inc. for its users and licensees. Sun acknowledges the pioneering efforts of Xerox in researching and developing the concept of visual or graphical user interfaces for the computer industry. Sun holds a non-exclusive license from Xerox to the Xerox Graphical User Interface, which license also covers Sun's licensees who implement OPEN LOOK GUIs and otherwise comply with Sun's written license agreements.

X Window System is a trademark and product of the Massachusetts Institute of Technology.

THIS PUBLICATION IS PROVIDED "AS IS" WITHOUT WARRANTY OF ANY KIND, EITHER EXPRESS OR IMPLIED, INCLUDING, BUT NOT LIMITED TO, THE IMPLIED WARRANTIES OF MERCHANTABILITY, FITNESS FOR A PARTICULAR PURPOSE, OR NON-INFRINGEMENT.

THIS PUBLICATION COULD INCLUDE TECHNICAL INACCURACIES OR TYPOGRAPHICAL ERRORS. CHANGES ARE PERIODICALLY ADDED TO THE INFORMATION HEREIN; THESE CHANGES WILL BE INCORPORATED IN NEW EDITIONS OF THE PUBLICATION. SUN MICROSYSTEMS, INC. MAY MAKE IMPROVEMENTS AND/OR CHANGES IN THE PRODUCT(S) AND/OR THE PROGRAM(S) DESCRIBED IN THIS PUBLICATION AT ANY TIME.

Preface

This document describes version 1.0 of the JAVA Virtual Machine and its instruction set. We have written this document to act as a specification for both compiler writers, who wish to target the machine, and as a specification for others who may wish to implement a compliant JAVA Virtual Machine.

The JAVA Virtual Machine is an imaginary machine that is implemented by emulating it in software on a real machine. Code for the JAVA Virtual Machine is stored in .class files, each of which contains the code for at most one public class.

Simple and efficient emulations of the JAVA Virtual Machine are possible because the machine's format is compact and efficient bytecodes. Implementations whose native code speed approximates that of compiled C are also possible, by translating the bytecodes to machine code, although Sun has not released such implementations at this time.

The rest of this document is structured as follows:

Chapter 1 describes the architecture of the JAVA Virtual Machine;

Chapter 2 describes the class file format;

Chapter 3 describes the bytecodes; and

Section A contains some instructions generatedinternally by Sun's implementation of the JAVA Virtual Machine. While not strictly part of the specification we describe these here so that this specification can serve as a reference for our implementation. As more implementations of the JAVA Virtual Machine become available, we may remove Section A from future releases.

Sun will license the JAVA Virtual Machine trademark and logo for use with compliant implementations of this specification. If you are considering constructing your own implementation of the JAVA Virtual Machine please contact us, at the email address below, so that we can work together to insure 100% compatibility of your implementation.

Send comments on this specification or questions about implementing the JAVA Virtual Machine to our electronic mail address: JAVA@JAVA.sun.com.

1. JAVA Virtual Machine Architecture

1.1 Supported Data Types

The virtual machine data types include the basic data types of the JAVA language:

|         |                                         |
|---------|-----------------------------------------|
| byte    | // 1-byte signed 2's complement integer |
| short   | // 2-byte signed 2's complement integer |
| int     | // 4-byte signed 2's complement integer |
| long    | // 8-byte signed 2's complement integer |
| float   | // 4-byte IEEE 754 single-precision float |
| double  | // 8-byte IEEE 754 double-precision float |
| char    | // 2-byte unsigned Unicode character    |

Nearly all JAVA type checking is done at compile time. Data of the primitive types shown above need not be tagged by the hardware to allow execution of JAVA. Instead, the bytecodes that operate on primitive values indicate the types of the operands so that, for example, the iadd, ladd, fadd, and dadd instructions each add two numbers, whose types are int, long, float, and double, respectively.

The virtual machine doesn't have separate instructions for boolean types. Instead, integer instructions, including integer returns, are used to operate on boolean values; byte arrays are used for arrays of boolean.

The virtual machine specifies that floating point be done in IEEE 754 format, with support for gradual underflow. Older computer architectures that do not have support for IEEE format may run JAVA numeric programs very slowly.

Other virtual machine data types include:

|               |                                  |
|---------------|----------------------------------|
| object        | // 4-byte reference to a JAVA object |
| returnAddress | // 4 bytes, used with jsr/ret/jsr_w/ret_w instructions |

Note: JAVA arrays are treated as objects.

This specification does not require any particular internal structure for objects. In our implementation an object reference is to a handle, which is a pair of pointers: one to a method table for the object, and the other to the data allocated for the object. Other implementations may use inline caching, rather than method table dispatch; such methods are likely to be faster on hardware that is emerging between now and the year 2000.

Programs represented by JAVA Virtual Machine bytecodes are expected to maintain proper type discipline and an implementation may refuse to execute a bytecode program that appears to violate such type discipline.

While the JAVA Virtual Machines would appear to be limited by the bytecode de6nition to running on a 32-bit address space machine, it is possible to build a version of the JAVA Virtual Machine that automatically translates the bytecodes into a 64-bit form. A description of this transformation is beyond the scope of the JAVA Virtual Machine Specification.

1.2 Registers

At any point the virtual machine is executing the code of a single method, and the pc register contains the address of the next bytecode to be executed.

Each method has memory space allocated for it to hold:

a set of local variables, referenced by a vars register;

an operand stack, referenced by an optop register; and a execution environment structure, referenced by a frame register.

All of this space can be allocated at once, since the size of the local variables and operand stack are known at compile time, and the size of the execution environment structure is well-known to the interpreter.

All of these registers are 32 bits wide.

1.3 Local Variables

Each JAVA method uses a fixed-sized set of local variables. They are addressed as word offsets from the vars register. Local variables are all 32 bits wide.

Long integers and double precision floats are considered to take up two local variables but are addressed by the index of the first local variable. (For example, a local variable with index containing a double precision float actually occupies storage at indices n and n+1.) The virtual machine specification does not require 64-bit values in local variables to be 64-bit aligned. Implementors are free to decide the appropriate way to divide long integers and double precision floats into two words.

Instructions are provided to load the values of local variables onto the operand stack and store values from the operand stack into local variables.

1.4 The Operand Stack

The machine instructions all take operands from an operand stack, operate on them, and return results to the stack. We chose a stack organization so that it would be easy to emulate the machine efficiently on machines with few or irregular registers such as the Intel 486 microprocessor.

The operand stack is 32 bits wide. It is used to pass parameters to methods and receive method results, as well as to supply parameters for operations and save operation results.

For example, execution of instruction iadd adds two integers together. It expects that the two integers are the top two words on the operand stack, and were pushed there by previous instructions. Both integers are popped from the stack, added, and their sum pushed back onto the operand stack. Subcomputations may be nested on the operand stack, and result in a single operand that can be used by the nesting computation.

Each primitive data type has specialized instructions that know how to operate on operands of that type. Each operand requires a single location on the stack, except for long and double operands, which require two locations.

Operands must be operated on by operators appropriate to their type. It is illegal, for example, to push two integers and then treat them as a long. This restriction is enforced, in the Sun implementation, by the bytecode verifier. However, a small number of operations (the dup opcodes and swap) operate on runtime data areas as raw values of a given width without regard to type.

In our description of the virtual machine instructions below, the effect of an instruction's execution on the operand stack is represented textually, with the stack growing from left to right, and each 32-bit word separately represented. Thus:

Stack: . . . , value1, value2 ▶ . . . , value3 shows an operation that begins by having value2 on top of the stack with value1 just beneath it. As a result of the execution of the instruction, value1 and value2 are popped from the stack and replaced by value3, which has been calculated by the instruction. The remainder of the stack, represented by an ellipsis, is unaffected by the instruction's execution.

The types long and double take two 32-bit words on the operand stack:

Stack: . . . ▶ . . . value-word1, value-word2

This specification does not say how the two words are selected from the 64-bit long or double value; it is only necessary that a particular implementation be internally consistent.

1.5 Execution Environment

The information contained in the execution environment is used to do dynamic linking, normal method returns, and exception propagation.

1.5.1 Dynamic Linking

The execution environment contains references to the interpreter symbol table for the current method and current class, in support of dynamic linking of the method code. The class file code for a method refers to methods to be called and variables to be accessed symbolically. Dynamic linking translates these symbolic method calls into actual method calls, loading classes as necessary to resolve as-yet-undefined symbols, and translates variable accesses into appropriate offsets in storage structures associated with the runtime location of these variables.

This late binding of the methods and variables makes changes in other classes that a method uses less likely to break this code.

1.5.2 Normal Method Returns

If execution of the current method completes normally, then a value is returned to the calling method. This occurs when the calling method executes a return instruction appropriate to the return type.

The execution environment is used in this case to restore the registers of the caller, with the program counter of the caller appropriately incremented to skip the method call instruction. Execution then continues in the calling method's execution environment.

1.5.3 Exception and Error Propagation

An exceptional condition, known in JAVA as an Error or Exception, which are subclasses of Throwable, may arise in a program because of:

a dynamic linkage failure, such as a failure to find a needed class file;

a run-time error, such as a reference through a null pointer;

an asynchronous event, such as is thrown by Thread.stop, from another thread; and the program using a throw statement.

When an exception occurs:

A list of catch clauses associated with the current method is examined. Each catch clause describes the instruction range for which it is active, describes the type of exception that it is to handle, and has the address of the code to handle it.

An exception matches a catch clause if the instruction that caused the exception is in the appropriate instruction range, and the exception type is a subtype of the type of exception that the catch clause handles. If a matching catch clause is found, the system branches to the specified handler. If no handler is found, the process is repeated until all the nested catch clauses of the current method have been exhausted.

The order of the catch clauses in the list is important. The virtual machine execution continues at the first matching catch clause. Because JAVA code is structured, it is always possible to sort all the exception handlers for one method into a single list that, for any possible program counter value, can be searched in linear order to find the proper (innermost containing applicable) exception handler for an exception occuring at that program counter value.

If there is no matching catch clause then the current method is said to have as its outcome the uncaught exception. The execution state of the method that called this method is restored from the execution environment, and the propagation of the exception continues, as though the exception had just occurred in this caller.

1.5.4 Additional Information

The execution environment may be extended with additional implementation-specified information, such as debugging information.

1.6 Garbage Collected Heap

The JAVA heap is the runtime data area from which class instances (objects) are allocated. The JAVA language is designed to be garbage collected—it does not give the programmer the ability to deallocate objects explicitly. The JAVA language does not presuppose any particular kind of garbage collection; various algorithms may be used depending on system requirements.

1.7 Method Area

The method area is analogous to the store for compiled code in conventional languages or the text segment in a UNIX process. It stores method code (compiled JAVA code) and symbol tables. In the current JAVA implementation, method code is not part of the garbage-collected heap, although this is planned for a future release.

1.8 The JAVA Instruction Set

An instruction in the JAVA instruction set consists of a one-byte opcode specifying the operation to be performed, and zero or more operands supplying parameters or data that will be used by the operation. Many instructions have no operands and consist only of an opcode.

The inner loop of the virtual machine execution is effectively:

```
do {
    fetch an opcode byte
    execute an action depending on the value of the
        opcode
} while (there is more to do);
```

The number and size of the additional operands is determined by the opcode. If an additional operand is more than one byte in size, then it is stored in big-endian order—high order byte first. For example, a 16-bit parameter is stored as two bytes whose value is:

first_byte*256+second byte

The bytecode instruction stream is only byte-aligned, with the exception being the tableswitch and lookupswitch instructions, which force alignment to a 4-byte boundary within their instructions.

These decisions keep the virtual machine code for a compiled JAVA program compact and reflect a conscious bias in favor of compactness at some possible cost in performance.

1.9 Limitations

The per-class constant pool has a maximum of 65535 entries. This acts as an internal limit on the total complexity of a single class.

The amount of code per method is limited to 65535 bytes by the sizes of the indices in the code in the exception table, the line number table, and the local variable table.

Besides this limit, the only other limitation of note is that the number of words of arguments in a method call is limited to 255.

2. Class File Format

This chapter documents the JAVA class (.class) file format.

Each class file contains the compiled version of either a JAVA class or a JAVA interface. Compliant JAVA interpreters must be capable of dealing with all class files that conform to the following specification.

A JAVA class file consists of a stream of 8-bit bytes. All 16-bit and 32-bit quantities are constructed by reading in two or four 8-bit bytes, respectively. The bytes are joined together in network (big-endian) order, where the high bytes come first. This format is supported by the JAVA JAVA.io.DataInput and JAVA.io.DataOutput interfaces, and classes such as JAVA.io.DataInputStream and JAVA.io.DataOutputStream.

The class file format is described here using a structure notation. Successive fields in the structure appear in the external representation without padding or alignment. Variable size arrays, often of variable sized elements, are called tables and are commonplace in these structures.

The types u1, u2, and u4 mean an unsigned one-, two-, or four-byte quantity, respectively, which are read by method such as readUnsignedByte, readUnsignedShort and readInt of the JAVA.io.DataInput interface.

2.1 Format

The following pseudo-structure gives a top-level description of the format of a class file:

```
ClassFile {
    u4 magic;
    u2 minor_version;
    u2 major_version;
    u2 constant_pool_count;
    cp_info constant_pool [constant_pool_count - 1];
    u2 access_flags;
    u2 this_class;
    u2 super_class;
    u2 interfaces_count;
    u2 interfaces [interfaces_count]
    u2 fields_count;
    field_info fields [fields_count]
    u2 methods_count;
    method_info methods [methods_count];
    u2 attributes_count;
    attribute info attributes [attribute_count];
}
``` magic

This field must have the value 0xCAFEBABE.

minor_version, major_version

These fields contain the version number of the JAVA compiler that produced this class file. An implementation of the virtual machine will normally support some range of minor version numbers 0–n of a particular major version number. If the minor version number is incremented the new code won't run on the old virtual machines, but it is possible to make a new virtual machine which can run versions up to n+1.

A change of the major version number indicates a major incompatible change, one that requires a different virtual machine that may not support the old major version in any way.

The current major version number is 45; the current minor version number is 3.

constant_pool_count

This field indicates the number of entries in the constant pool in the class file.

constant_pool

The constant pool is a table of values. These values are the various string constants, class names, field names, and others that are referred to by the class structure or by the code.

constant_pool[0] is always unused by the compiler, and may be used by an implementation for any purpose.

Each of the constant_pool entries 1 through constant_pool_count-1 is a variable-length entry, whose format is given by the first "tag" byte, as described in section 2.3.

access_flags

This contains a mask of up to sixteen modifiers used with class, method, and field declarations. The same encoding is used on similar fields in field_info and method_info as described below. Here is the encoding:

| Flag Name | Value | Meaning | Used By |
|---|---|---|---|
| ACC_PUBLIC | 0x0001 | Visible to everyone | Class, Method, Variable |
| ACC_PRIVATE | 0x0002 | Visible only to the defining class | Method, Variable |
| ACC_PROTECTED | 0x0004 | Visible to subclasses | Method, Variable |
| ACC_STATIC | 0x0008 | Variable or method is static | Method, Variable |
| ACC_FINAL | 0x0010 | No further subclassing, overriding, or assignment after initialization | Class, Method, Variable |
| ACC_SYNCHRONIZED | 0x0020 | Wrap use in monitor lock | Method |
| ACC_VOLATILE | 0x0040 | Can't cache | Variable |
| ACC TRANSIENT | 0x0080 | Not to be written or read by a persistent object manager | Variable |
| ACC_NATIVE | 0x0100 | Implemented in a language other than JAVA | Method |

-continued

| Flag Name | Value | Meaning | Used By |
|---|---|---|---|
| ACC_INTERFACE | 0x0200 | Is an interface | Class |
| ACC_ABSTRACT | 0x0400 | No body provided | Class, Method | this_class

This field is an index into the constant pool; constant_pool [this_class] must be a CONSTANT_class.

super_class

This field is an index into the constant pool. If the value of super_class is nonzero, then constant_pool [super_class] must be a class, and gives the index of this class's superclass in the constant pool.

If the value of super_class is zero, then the class being defined must be JAVA.lang.Object, and it has no superclass.

interfaces_count

This field gives the number of interfaces that this class implements.

interfaces

Each value in this table is an index into the constant pool. If a table value is nonzero (interfaces[i] !=0, where 0<=i <interfaces_count), then constant_pool [interfaces[i]] must be an interface that this class implements.

fields_count

This field gives the number of instance variables, both static and dynamic, defined by this class. The fields table includes only those variables that are defined explicitly by this class. It does not include those instance variables that are accessible from this class but are inherited from superclasses.

fields

Each value in this table is a more complete description of a field in the class. See section 2.4 for more information on the field_info structure.

methods_count

This field indicates the number of methods, both static and dynamic, defined by this class. This table only includes those methods that are explicitly defined by this class. It does not include inherited methods.

methods

Each value in this table is a more complete description of a method in the class. See section 2.5 for more information on the method_info structure.

attributes_count

This field indicates the number of additional attributes about this class.

attributes

A class can have any number of optional attributes associated with it. Currently, the only class attribute recognized is the "SourceFile" attribute, which indicates the name of the source file from which this class file was compiled. See section 2.6 for more information on the attribute_info structure.

2.2 Signatures

A signature is a string representing a type of a method, field or array.

The field signature represents the value of an argument to a function or the value of a variable. It is a series of bytes generated by the following grammar:

```
<field_signature> ::= <field_type>
<field_type>      ::=<base_type>|<object_type>|
                     <array_type>
<base_type>       ::= B|C|D|F|I|J|S|Z
<object_type>     ::= L<fullclassname>;
<array_type>      ::= [<optional_size><field_type>
<optional_size>   ::= [0–9]
```

The meaning of the base types is as follows:

| B | byte | signed byte |
|---|---|---|
| C | char | character |
| D | double | double precision IEEE float |
| F | float | single precision IEEE float |
| I | int | integer |
| J | long | long integer |
| L<fullclassname>; | ... | an object of the given class |
| S | short | signed short |
| Z | boolean | true or false |
| [<field sig> | ... | array |

A return-type signature represents the return value from a method. It is a series of bytes in the following grammar:

```
<return_signature> ::= <field_type> | V
```

The character V indicates that the method returns no value. Otherwise, the signature indicates the type of the return value.

An argument signature represents an argument passed to a method:

```
<argument_signature> ::= <field_type>
```

A method signature represents the arguments that the method expects, and the value that it returns.

```
<method_signature>    ::= (<arguments_signature>)
                          <return_signature>
<arguments_signature> ::= <argument_signature>*
```

2.3 Constant Pool

Each item in the constant pool begins with a 1-byte tag:. The table below lists the valid tags and their values.

| Constant Type | Value |
|---|---|
| CONSTANT_Class | 7 |
| CONSTANT_Fieldref | 9 |
| CONSTANT_Methodref | 10 |
| CONSTANT_InterfaceMethodref | 11 |
| CONSTANT_String | 8 |
| CONSTANT_Integer | 3 |
| CONSTANT_Float | 4 |
| CONSTANT_Long | 5 |
| CONSTANT_Double | 6 |
| CONSTANT_NameAndType | 12 |
| CONSTANT_Utf8 | 1 |
| CONSTANT_Unicode | 2 |

Each tag byte is then followed by one or more bytes giving more information about the specific constant.

2.3.1 CONSTANT_Class

CONSTANT_Class is used to represent a class or an interface.

```
CONSTANT_Class_info {
    u1 tag;
    u2 name_index;
}
tag
```

The tag will have the value CONSTANT_Class name_index constant_pool[name_index] is a CONSTANT_Utf8 giving the string name of the class.

Because arrays are objects, the opcodes anewarray and multianewarray can reference array "classes" via CONSTANT_Class items in the constant pool. In this case, the name of the class is its signature. For example, the class name for int[ ] [ ] is

[[I

The class name for

Thread[ ] is

"[LJAVA.lang.Thread;"

2.3.2 CONSTANT_{Fieldref,Methodref, InterfaceMethodref}

Fields, methods, and interface methods are represented by similar structures.

```
CONSTANT_Fieldref_info {
    u1 tag;
    u2 class_index;
    u2 name_and_type_index;
}
CONSTANT_Methodref_info {
    u1 tag;
    u2 class_index;
    u2 name_and_type_index;
}
CONSTANT_InterfaceMethodref_info {
    u1 tag;
    u2 class_index;
    u2 name_and_type_index;
}
``` tag

The tag will have the value CONSTANT_Fieldref, CONSTANT_Methodref, or CONSTANT_InterfaceMethodref.

class_index constant_pool[class_index] will be an entry of type CONSTANT_Class giving the name of the class or interface containing the field or method.

For CONSTANT_Fieldref and CONSTANT_Methodref, the CONSTANT_Class item must be an actual class. For CONSTANT_InterfaceMethodref, the item must be an interface which purports to implement the given method.

name_and_type_index constant_pool [name_and_type_index] will be an entry of type CONSTANT_NameAndType. This constant pool entry indicates the name and signature of the field or method.

2.3.3 CONSTANT_String

CONSTANT_String is used to represent constant objects of the built-in type String.

```
CONSTANT_String_info {
    u1 tag;
    u2 string_index;
}
``` tag

The tag will have the value CONSTANT_String string_index constant_pool [string_index] is a CONSTANT_Utf8 string giving the value to which the String object is initialized.

2.3.4 CONSTANT_Integer and CONSTANT_Float

CONSTANT_Integer andCONSTANT_Float represent four-byte constants.

```
CONSTANT_Integer_info {
    u1 tag;
    u4 bytes;
}
CONSTANT_Float_info {
    u1 tag;
    u4 bytes;
}
``` tag

The tag will have the value CONSTANT_Integer or CONSTANT_Float bytes

For integers, the four bytes are the integer value. For floats, they are the IEEE 754 standard representation of the floating point value. These bytes are in network (high byte first) order.

2.3.5 CONSTANT_Long and CONSTANT_Double

CONSTANT_Long andCONSTANT_Double represent eight-byte constants.

```
CONSTANT_Long_info {
    u1 tag;
    u4 high_bytes;
    u4 low_bytes;
}
CONSTANT_Double_info {
    u1 tag;
    u4 high_bytes;
    u4 low_bytes;
}
```

All eight-byte constants take up two spots in the constant pool. If this is the $n^{th}$ item in the constant pool, then the next item will be numbered n+2.

tag

The tag will have the value CONSTANT_Long or CONSTANT_Double.

high_bytes, low_bytes

For CONSTANT_Long, the 64-bit value is (high_bytes << 32) +low_bytes.

For CONSTANT_Double, the 64-bit value, high_bytes and low_bytes together represent the standard IEEE 754 representation of the double-precision floating point number.

2.3.6 CONSTANT_NameAndType

CONSTANT_NameAndType is used to represent a field or method, without indicating which class it belongs to.

```
CONSTANT_NameAndType_info {
    u1 tag;
    u2 name_index;
    u2 signature_index;
}
``` tag

The tag will have the valueCONSTANT_NameAndType.

name_index constant_pool [name_index] is a CONSTANT_Utf8 string giving the name of the field or method.

signature_index constant_pool [signature_index] is a CONSTANT_Utf8 string giving the signature of the field or method.

2.3.7 CONSTANT_Utf8 and CONSTANT_Unicode

CONSTANT_Utf8 andCONSTANT_Unicode are used to represent constant string values.

CONSTANT_Utf8 strings are "encoded" so that strings containing only non-null ASCII characters, can be represented using only one byte per character, but characters of up to 16 bits can be represented:

All characters in the range 0x0001 to 0x007F are represented by a single byte:

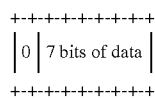

The null character (0x0000) and characters in the range 0x0080 to 0x07FF are represented by a pair of two bytes:

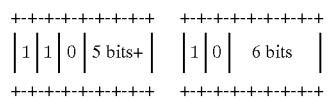

Characters in the range 0x0800 to 0xFFFF are represented by three bytes:

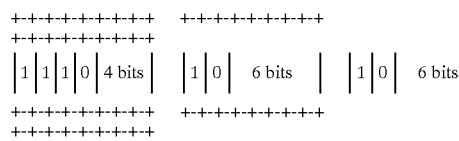

There are two differences between this format and the "standard" UTF-8 format. First, the null byte (0x00) is encoded in two-byte format rather than one-byte, so that our strings never have embedded nulls. Second, only the one-byte, two-byte, and three-byte formats are used. We do not recognize the longer formats.

```
CONSTANT_Utf8_info {
    u1 tag;
    u2 length;
    u1 bytes [length];
}
```

```
CONSTANT_Unicode_info {
    u1 tag;
    u2 length;
    u2 bytes [length];
}
``` tag

The tag will have the value CONSTANT_Utf8 or CONSTANT_Unicode.

length

The number of bytes in the string. These strings are not null terminated.

bytes

The actual bytes of the string.

2.4 Fields

The information for each field immediately follows the field_count field in the class file. Each field is described by a variable length field_info structure. The format of this structure is as follows:

```
field_info {
    u2 access_flags;
    u2 name_index;
    u2 signature_index;
    u2 attributes_count;
    attribute_info attributes[attribute_count];
}
``` access-flags

This is a set of sixteen flags used by classes, methods, and fields to describe various properties and how they many be accessed by methods in other classes. See the table "Access Flags" which indicates the meaning of the bits in this field.

The possible fields that can be set for a field are ACC_PUBLIC, ACC_PRIVATE, ACC_PROTECTED, ACC_STATIC, ACC_FINAL, ACC_VOLATILE, and ACC_TRANSIENT.

At most one of ACC_PUBLIC, ACC_PROTECTED, and ACC_PRIVATE can be set for any method.

name_index constant_pool [name_index] is a CONSTANT_Utf8 string which is the name of the field.

signature_index constant_pool [signature_index] is a CONSTANT_Utf8 string which is the signature of the field. See the section "Signatures" for more information on signatures.

attributes_count

This value indicates the number of additional attributes about this field.

attributes

A field can have any number of optional attributes associated with it. Currently, the only field attribute recognized is the "ConstantValue" attribute, which indicates that this field is a static numeric constant, and indicates the constant value of that field.

Any other attributes are skipped.

2.5 Methods

The information for each method immediately follows the method_count field in the class file. Each method is described by a variable length method_info structure. The structure has the following format:

```
method_info {
    u2 access_flags;
    u2 name_index;
    u2 signature_index;
    u2 attributes_count;
    attribute_info attributes [attribute_count];
}
``` access flags

This is a set of sixteen flags used by classes, methods, and fields to describe various properties and how they many be accessed by methods in other classes. See the table "Access Flags" which gives the various bits in this field.

The possible fields that can be set for a method are ACC_PUBLIC, ACC_PRIVATE, ACC_PROTECTED, ACC_STATIC, ACC_FINAL, ACC_SYNCHRONIZED, ACC_NATIVE, and ACC_ABSTRACT.

At most one of ACC_PUBLIC, ACC_PROTECTED, and ACC_PRIVATE can be set for any method.

name_index constant_pool[name_index] is a CONSTANT_Utf8 string giving the name of the method.

signature_index constant_pool[signature_index] is a CONSTANT_Utf8 string giving the signature of the field. See the section "Signatures" for more information on signatures.

attributes_count

This value indicates the number of additional attributes about this field.

attributes

A field can have any number of optional attributes associated with it. Each attribute has a name, and other additional information. Currently, the only field attributes recognized are the "Code" and "Exceptions" attributes, which describe the bytecodes that are executed to perform this method, and the JAVA Exceptions which are declared to result from the execution of the method, respectively.

Any other attributes are skipped.

2.6 Attributes

Attributes are used at several different places in the class format. All attributes have the following format:

```
GenericAttribute_info {
    u2 attribute_name;
    u4 attribute_length;
    u1 info [attribute_length];
}
```

The attribute_name is a 16-bit index into the class's constant pool; the value of constant_pool [attribute_name] is a CONSTANT_Utf8 string giving the name of the attribute. The field attribute_length indicates the length of the subsequent information in bytes. This length does not include the six bytes of the attribute_name and attribute_length.

In the following text, whenever we allow attributes, we give the name of the attributes that are currently understood. In the future, more attributes will be added. Class file readers are expected to skip over and ignore the information in any attribute they do not understand.

2.6.1 SourceFile

The "SourceFile" attribute has the following format:

```
SourceFile_attribute {
    u2 attribute_name_index;
    u4 attribute_length;
    u2 sourcefile_index;
}
``` attribute_name index
    constant_pool [attribute_name_index] is the CONSTANT_Utf8 string "SourceFile".
attribute_length
    The length of a SourceFile_attribute must be 2.
sourcefile_index
    constant_pool [sourcefile_index] is a CONSTANT_Utf8 string giving the source file from which this class file was compiled.

2.6.2 ConstantValue

The "ConstantValue" attribute has the following format:

```
ConstantValue_attribute {
    u2 attribute_name_index;
    u4 attribute_length;
    u2 constantvalue_index;
}
``` attribute_name index
    constant_pool [attribute_name_index] is the CONSTANT_Utf8 string "ConstantValue".
attribute_length
    The length of a ConstantValue_attribute must be 2.
constantvalue_index
    constant_pool [constantvalue_index] gives the constant value for this field.

The constant pool entry must be of a type appropriate to the field, as shown by the following table:

| | |
|---|---|
| long | CONSTANT_Long |
| float | CONSTANT_Float |
| double | CONSTANT_Double |
| int, short, char, byte, boolean | CONSTANT_Integer |

2.6.3 Code

The "Code" attribute has the following format:

```
Code_attribute {
    u2 attribute_name_index;
    u4 attribute_length;
    u2 max_stack;
    u2 max_locals;
    u4 code_length;
    u1 code[code_length];
    u2 exception_table_length;
    {   u2  start_pc;
        u2  end_pc;
        u2  handler_pc;
        u2  catch_type;
    } exception_table[exception_table_length];
    u2 attributes_count;
    attribute_info attributes [attribute_count];
}
``` attribute_name_index
    constant_pool [attribute_name_index] is the CONSTANT_Utf8 string "Code".

attribute_length

This field indicates the total length of the "Code" attribute, excluding the initial six bytes.

max stack

Maximum number of entries on the operand stack that will be used during execution of this method. See the other chapters in this spec for more information on the operand stack.

max_locals

Number of local variable slots used by this method. See the other chapters in this spec for more information on the local variables.

code_length

The number of bytes in the virtual machine code for this method.

code

These are the actual bytes of the virtual machine code that implement the method. When read into memory, if the first byte of code is aligned onto a multiple-of-four boundary the tableswitch and tablelookup opcode entries will be aligned; see their description for more information on alignment requirements.

exception_table_length

The number of entries in the following exception table.

exception table

Each entry in the exception table describes one exception handler in the code.

start_pc, end_pc

The two fieldsstart_pc and end_pc indicate the ranges in the code at which the exception handler is active. The values of both fields are offsets from the start of the code.start_pc is inclusive.end_pc is exclusive.

handler_pc

This field indicates the starting address of the exception handler. The value of the field is an offset from the start of the code.

catch_type

If catch_type is nonzero, then constant_pool [catch_type] will be the class of exceptions that this exception handler is designated to catch. This exception handler should only be called if the thrown exception is an instance of the given class.

If catch_type is zero, this exception handler should be called for all exceptions.

attributes_count

This field indicates the number of additional attributes about code. The "Code" attribute can itself have attributes.

attributes

A "Code" attribute can have any number of optional attributes associated with it. Each attribute has a name, and other additional information. Currently, the only code attributes defined are the "LineNumberTable" and "LocalVariableTable," both of which contain debugging information.

2.6.4 Exceptions Table

This table is used by compilers which indicate which Exceptions a method is declared to throw:

```
Exceptions_attribute {
    u2 attribute_name_index;
    u4 attribute_length;
    u2 number_of_exceptions;
```

-continued

```
    u2 exception_index_table [number_of_exceptions];
}
``` attribute_name_index constant_pool [attribute_name_index] will be the CONSTANT_Utf8 string "Exceptions".

attribute_length

This field indicates the total length of the Exceptions_attribute, excluding the initial six bytes.

number_of_exceptions

This field indicates the number of entries in the following exception index table.

exception_index_table

Each value in this table is an index into the constant pool. For each table element (exception_index_table [i] !=0, where 0<=i <number_of_exceptions), then constant_pool [exception_index+table [i]] is a Exception that this class is declared to throw.

2.6.5 LineNumberTable

This attribute is used by debuggers and the exception handler to determine which part of the virtual machine code corresponds to a given location in the source. The LineNumberTable_attribute has the following format:

```
LineNumberTable_attribute {
    u2      attribute_name_index;
    u4      attribute_length;
    u2      line_number_table_length;
    { u2    start_pc;
      u2         line_number;
    }          line_number_table[line_
               number_table_length];
}
``` attribute_name_index constant_pool [attribute_name_index] will be the CONSTANT_Utf8 string "LineNumberTable".

attribute_length

This field indicates the total length of the LineNumberTable_attribute, excluding the initial six bytes.

line_number_table_length

This field indicates the number of entries in the following line number table.

line_number_table

Each entry in the line number table indicates that the line number in the source file changes at a given point in the code.

start_Pc

This field indicates the place in the code at which the code for a new line in the source begins. source_pc <<SHOULD THAT BEstart_pc?>> is an offset from the beginning of the code.

line_number

The line number that begins at the given location in the file.

2.6.6 LocalVariableTable

This attribute is used by debuggers to determine the value of a given local variable during the dynamic execution of a method. The format of the LocalVariableTable_attribute is as follows:

```
LocalVariableTable_attribute {
    u2 attribute_name_index;
    u4 attribute_length;
    u2 local_variable_table_length;
    { u2 start_pc;
      u2 length;
      u2 name_index;
      u2 signature_index;
      u2 slot;
    } local_variable_table[local_
      variable_table_length];
}
``` attribute_name_index constant_pool [attribute_name_index] will be the CONSTANT_Utf8 string "LocalVariableTable".

attribute_length

This field indicates the total length of the LineNumberTable_attribute, excluding the initial six bytes.

local_variable_table_length

This field indicates the number of entries in the following local variable table.

local_variable_table

Each entry in the local variable table indicates a code range during which a local variable has a value. It also indicates where on the stack the value of that variable can be found.

start_Pc, length

The given local variable will have a value at the code between start_pc andstart_pc + length. The two values are both offsets from the beginning of the code.

name_index, signature_index constant_pool[name_index] and constant_pool[signature_index] are CONSTANT_UtfB strings giving the name and signature of the local variable.

slot

The given variable will be the slot$^{th}$ local variable in the method's frame.

3. The Virtual Machine Instruction Set 3.1 Format for the Instructions

JAVA Virtual Machine instructions are represented in this document by an entry of the following form.

instruction name

Short description of the instruction

Syntax:

| opcode = number |
|---|
| operand1 |
| operand2 |
| ... |

Stack: . . . , value1, value2 ᴘ . . . , value3

A longer description that explains the functions of the instruction and indicates any exceptions that might be thrown during execution.

Each line in the syntax table represents a single 8-bit byte.

Operations of the JAVA Virtual Machine most often take their operands from the stack and put their results back on the stack. As a convention, the descriptions do not usually mention when the stack is the source or destination of an operation, but will always mention when it is not. For instance, instruction iload has the short description "Load integer from local variable." Implicitly, the integer is loaded onto the stack. Instruction iadd is described as "Integer add"; both its source and destination are the stack.

Instructions that do not affect the control flow of a computation may be assumed to always advance the virtual machine program counter to the opcode of the following instruction. Only instructions that do affect control flow will explicitly mention the effect they have on the program counter.

3.2 Pushing Constants onto the Stack bipush

Push one-byte signed integer

Syntax:

| bipush = 16 |
|---|
| byte1 |

Stack: . . . => . . . , value byte1 is interpreted as a signed 8-bitvalue. This value is expanded to an integer and pushed onto the operand stack.

sipush

Push two-byte signed integer

Syntax:

| sipush = 17 |
|---|
| byte1 |
| byte2 |

Stack: . . . => . . . , item byte1 and byte2 are assembled into a signed 16-bit value. This value is expanded to an integer and pushed onto the operand stack.

ldc1

Push item from constant pool

Syntax:

| 1dc1 = 18 |
|---|
| indexbyte1 |

Stack: . . . => . . . , item indexbyte1 is used as an unsigned 8-bit index into the constant pool of the current class. The item at that index is resolved and pushed onto the stack. If a String is being pushed and there isn't enough memory to allocate space for it then an OutOfMemoryError is thrown.

Note: A String push results in a reference to an object.

ldc2

Push item from constant pool

Syntax:

| 1dc2 = 19 |
|---|
| indexbyte1 |
| indexbyte2 |

Stack: . . . => . . . , item indexbyte1 and indexbyte2 are used to construct an unsigned 16-bit index into the constant pool of the current class. The item at that index is resolved and pushed onto the stack. If a String is being pushed and there isn't enough memory to allocate space for it then an OutOfMemoryError is thrown.

Note: A String push results in a reference to an object.

ldc2w

Push long or double from constant pool

Syntax:

```
ldc2w = 20
indexbyte1
indexbyte2
```

Stack: . . . => . . . , constant_word1, constant_word2 indexbyte1 and indexbyte2 are used to construct an unsigned 16-bit index into the constant pool of the current class. The two-word constant that index is resolved and pushed onto the stack.

aconst_null

Push null object reference

Syntax:

```
aconst_null = 1
```

Stack: . . . => . . . , null

Push the null object reference onto the stack.

iconst_m1

Push integer constant −1

Syntax:

```
iconst_m1 = 2
```

Stack: . . . => . . . , 1

Push the integer −1 onto the stack.

iconst_<n>

Push integer constant

Syntax:

```
iconst_<n>
```

Stack: . . . => . . . , <n>

Forms: iconst_0=3, iconst_1=4, iconst_2=5, iconst_3=6, iconst_4=7, iconst_5=8

Push the integer <n> onto the stack.

lconst_<l>

Push long integer constant

Syntax:

```
lconst_<l>
```

Stack: . . . => . . . , <l>-word1, <l>-word2

Forms: lconst_0=9, lconst_1=10

Push the long integer <l> onto the stack.

fconst

<f>

Push single float

Syntax:

```
fconst_<f>
```

Stack: . . . => . . . , <f>

Forms: fconst_0=11, fconst_1=12, fconst_2=13

Push the single-precision floating point number <f> onto the stack.

dconst_<d>

Push double float

Syntax:

```
dconst_<d>
```

Stack: . . . => . . . , <d>-word1, <d>-word2

Forms: dconst_0=14, dconst_1=15

Push the double-precision floating point number <d> onto the stack.

3.3 Loading Local Variables Onto the Stack iload

Load integer from local variable

Syntax:

```
iload = 21
vindex
```

Stack: . . . => . . . , value

The value of the local variable at vindex in the current JAVA frame is pushed onto the operand stack.

iload_<n>

Load integer from local variable

Syntax:

```
iload_<n>
```

Stack: . . . => . . . , value

Forms: iload_0=26, iload_1=27, iload_2=28, iload_3=29

The value of the local variable at <n> in the current JAVA frame is pushed onto the operand stack.

This instruction is the same as iload with a vindex of <n>, except that the operand <n> is implicit.

lload

Load long integer from local variable

Syntax:

```
lload = 22
vindex
```

Stack: . . . => . . . , value-word1, value-work2

The value of the local variables at vindex and vindex+1 in the current JAVA frame is pushed onto the operand stack.

lload_<n>

Load long integer from local variable

Syntax:

```
lload_<n>
```

Stack: . . . => . . . , value-word1, value-word2

Forms: lload_0=30, lload-1=31, lload-2=32, lload_3=33

The value of the local variables at <n> and <n>+1 in the current JAVA frame is pushed onto the operand stack.

This instruction is the same as hoad with a vindex of <n>, except that the operand <n> is implicit.
fload
Load single float from local variable
Syntax:

```
fload = 23
vindex
```

Stack: . . . => . . . , value
The value of the local variable at vindex in the current JAVA frame is pushed onto the opera and stack.
fload_<n>
Load single float from local variable
Syntax:

```
fload_<n>
```

Stack: . . . => . . . , value
Forms: fload_0=34, fload_1=35, fload_2=36, fload_3=37
The value of the local variable at <n> in the current JAVA frame is pushed onto the operand stack.
This instruction is the same as fload with a vindex of <n>, except that the operand <n> is implicit.
dload
Load double float from local variable
Syntax:

```
dload = 24
vindex
```

Stack: . . . => . . . , value-word1, value-word2
The value of the local variables at vindex and vindex+1 in the current JAVA frame is pushed onto the operand stack.
dload_<n>
Load double float from local variable
Syntax:

```
dload_<n>
```

Stack: . . . => . . . , value-word1, value-word2
Forms: dload_0=38, dload_1=39, dload_2=40, dload_3=41
The value of the local variables at <n> and <n>+1 in the current JAVA frame is pushed onto the operand stack.
This instruction is the same as dload with a vindex of <n>, except that the operand <n> is implicit.
aload
Load object reference from local variable
Syntax:

```
aload = 25
vindex
```

Stack: . . . => . . . , value
The value of the local variable at vindex in the current JAVA frame is pushed onto the operand stack.

aload_<n>
Load object reference from local variable
Syntax:

```
aload_<n>
```

Stack: . . . => . . . , value
Forms: aload_0=42, aload_1=43, aload_2=44, aload_3=45
The value of the local variable at <n> in the current JAVA frame is pushed onto the operand stack.
This instruction is the same as aload with a vindex of <n>, except that the operand <n> is implicit.
3.4 Storing Stack Values into Local Variables
istore
Store integer into local variable
Syntax:

```
istore = 54
vindex
```

Stack: . . . , value=> . . .
value must be an integer. Local variable vindex in the current JAVA frame is set to value.
istore_<n>
Store integer into local variable
Syntax:

```
istore_<n>
```

Stack: . . . , value=> . . .
Forms: istore_0=59, istore_1=60, istore_2=61, istore_3=62
value must be an integer. Local variable <n> in the current JAVA frame is set to value.
This instruction is the same as istore with a vindex of <n>, except that the operand <n> is implicit.
lstore
Store long integer into local variable
Syntax:

```
lstore = 55
vindex
```

Stack: . . . , value-word1, value-word2=> . . .
value must be a long integer. Local variables vindex+1 in the current JAVA frame are set to value.
lstore_<n>
Store long integer into local variable
Syntax:

```
lstore_<n>
```

Stack: . . . , value-word1, value-word2=>
Forms: lstore_0=63, lstore_1=64, lstore_2=65, lstore_3=66
value must be a long integer. Local variables <n> and <n>+1 in the current JAVA frame are set to value.
This instruction is the same as lstore with a vindex of <n>, except that the operand <n> is implicit.

fstore
   Store single float into local variable
   Syntax:

| fstore = 56 |
   | vindex |

Stack: . . . , value=> . . .
   value must be a single-precision floating point number. Local variable vindex in the current JAVA frame is set to value.

fstore_<n>
   Store single float into local variable
   Syntax:

| fstore_<n> |

Stack: . . . , value=> . . .
   Forms: fstore_0=67, fstore_1=68, fstore_2=69, fstore_3=70
   value must be a single-precision floating point number. Local variable <n> in the current JAVA frame is set to value.
   This instruction is the same as fstore with a vindex of <n>, except that the operand <n> is implicit.

dstore
   Store double float into local variable
   Syntax:

| dstore = 57 |
   | vindex |

Stack: . . . , value-word1, value-word2=> . . .
   value must be a double-precision floating point number. Local variables vindex and vindex+1 in the current JAVA frame are set to value.

dstore_<n>
   Store double float into local variable
   Syntax:

| dstore_<n> |

Stack: . . . , value-word1, value-word2=> . . .
   Forms: dstore_0=71, dstore_1=72, dstore_2=73, dstore_3=74
   value must be a double-precision floating point number. Local variables <n> and <n>+1 in the current JAVA frame are set to value.
   This instruction is the same as dstore with a vindex of <n>, except that the operand <n> is implicit.

astore
   Store object reference into local variable
   Syntax:

| astore = 58 |
   | vindex |

Stack: . . . , value=> . . .
   value must be a return address or a reference to an object. Local variable vindex in the current JAVA frame is set to value.

astore_<n>
   Store object reference into local variable
   Syntax:

| astore_<n> |

Stack: . . . , value=> . . .
   Forms: astore_0=75, astore_1=76, astore_2=77, astore_3=78
   value must be a return address or a reference to an object. Local variable <n> in the current JAVA frame is set to value.
   This instruction is the same as astore with a vindex of <n>, except that the operand <n> is implicit.

iinc
   Increment local variable by constant
   Syntax:

| iinc = 132 |
   | vindex |
   | const |

Stack: no change
   Local variable vindex in the current JAVA frame must contain an integer. Its value is incremented by the value const, where const is treated as a signed 8-bit quantity.

3.5 Wider index for Loading, Storing and Incrementing wide
   Wider index for accessing local variables in load, store and increment.
   Syntax:

| wide = 196 |
   | vindex2 |

Stack: no change
   This bytecode must precede one of the following bytecodes: iload, lload, fload, dload, aload, istore, lstore, fstore, dstore, astore, iinc. The vindex of the following bytecode and vindex2 from this bytecode are assembled into an unsigned 16-bit index to a local variable in the current JAVA frame. The following bytecode operates as normal except for the use of this wider index.

3.6 Managing Arrays newarray
   Allocate new array
   Syntax:

| newarray = 188 |
   | atype |

Stack: . . . , size=>result
   size must be an integer. It represents the number of elements in the new array.
   atype is an internal code that indicates the type of array to allocate. Possible values for atype are as follows:

| | |
|---|---|
| T_BOOLEAN | 4 |
| T_CHAR | 5 |
| T_FLOAT | 6 |
| T_DOUBLE | 7 |
| T_BYTE | 8 |
| T_SHORT | 9 |
| T_INT | 10 |
| T_LONG | 11 |

A new array of atype, capable of holding size elements, is allocated, and result is a reference to this new object. Allocation of an array large enough to contain size items of atype is attempted. All elements of the array are initialized to zero.

If size is less than zero, a NegativeArraySizeException is thrown. If there is not enough memory to allocate the array, anOutOfMemoryError is thrown.

anewarray

Allocate new array of references to objects

Syntax:

| anewarray = 189 |
|---|
| indexbyte1 |
| indexbyte$_2$ |

Stack: . . . , size=>result size must be an integer. It represents the number of elements in the new array.

indexbyte1 and indexbyte2 are used to construct an index into the constant pool of the current class. The item at that index is resolved. The resulting entry must be a class.

A new array of the indicated class type and capable of holding size elements is allocated, and result is a reference to this new object. Allocation of an array large enough to contain size items of the given class type is attempted. All elements of the array are initialized to null.

If size is less than zero, a
NegativeArraySizeException is thrown. If there is not enough memory to allocate the array, an OutOfMemoryError is thrown.

anewarray is used to create a single dimension of an array
       of object references. For example, to create
       new Thread[7]
    the following code is used:
       bipush 7
       anewarray <Class "JAVA.lang.Thread">
    anewarray can also be used to create the first dimension
       of a multi-dimensional array. For example, the following array declaration:
       new int[6] [ ]
    is created with the following code:
       bipush 6
       anewarray <Class "[I">

See CONSTANT_Class in the "Class File Format" chapter for information on array class names.

multianewarray

Allocate new multi-dimensional array

Syntax:

| multianewarray = 197 |
|---|
| indexbyte1 |
| indexbyte2 |
| dimensions |

Stack: . . . , size1 size2 . . . sizen=>result

Each size must be an integer. Each represents the number of elements in a dimension of the array.

indexbyte1 and indexbyte2 are used to construct an index into the constant pool of the current class. The item at that index is resolved. The resulting entry must be an array class of one or more dimensions.

dimensions has the following aspects:
    It must be an integer $^3$1.
    It represents the number of dimensions being created. It must be £ the number of dimensions of the array class.
    It represents the number of elements that are popped off the stack. All must be integers greater than or equal to zero. These are used as the sizes of the dimension. For example, to create
    new int[6] [3] [ ]
    the following code is used:
    bipush 6
    bipush 3
    multianewarray <Class "[[[I">2

If any of the size arguments on the stack is less than zero, a NegativeArraySizeException is thrown. If there is not enough memory to allocate the array, an OutOfMemoryError is thrown.

The result is a reference to the new array object.

Note: It is more efficient to use newarray or anewarray when creating a single dimension.

See CONSTANT_Class in the "Class File Format" chapter for information on array class names.

arraylength

Get length of array

Syntax:

| arraylength = 190 |
|---|

Stack: . . . , objectref=> . . . , length objectref must be a reference to an array object. The length of the array is determined and replaces objectref on the top of the stack.

If the objectref is null, a NullPointerException is thrown.

iaload

Load integer from array

Syntax:

| iaload = 46 |
|---|

Stack: . . . , arrayref, index=> . . . , value arrayref must be a reference to an array of integers.index must be an integer. The integer value at position number index in the array is retrieved and pushed onto the top of the stack.

If arrayref is null a NullPointerException is thrown. If index is not within the bounds of the array an ArrayIndexOutOfBoundsException is thrown.

laload
   Load long integer from array
   Syntax:

```
   laoad = 47
   ```

Stack: . . . , arrayref, index=> . . . , value-word1, value-word2 arrayref must be a reference to an array of long integers. index must be an integer. The long integer value at position number index in the array is retrieved and pushed onto the top of the stack.

If arrayref is null a NullPointerException is thrown. If index is not within the bounds of the array an ArrayIndexOutOfBoundsException is thrown.

faload
   Load single float from array
   Syntax:

```
   faload = 48
   ```

Stack: . . . , arrayref, index=> . . . , value arrayref must be a reference to an array of single-precision floating point numbers. index must be an integer. The single-precision floating point number value at position number index in the array is retrieved and pushed onto the top of the stack.

If arrayref is null a NullPointerException is thrown. If index is not within the bounds of the array an ArrayIndexOutOfBoundsException is thrown.

daload
   Load double float from array
   Syntax:

```
   daload = 49
   ```

Stack: . . . , arrayref, index=> . . . , value-word1, value-word2 arrayref must be a reference to an array of double-precision floating point numbers. index must be an integer. The double-precision floating point number value at position number index in the array is retrieved and pushed onto the top of the stack.

If arrayref is null a NullPointerException is thrown. If index is not within the bounds of the array an ArrayIndexOutOfBoundsException is thrown.

aaload
   Load object reference from array
   Syntax:

```
   aaload = 50
   ```

Stack: . . . , arrayref, index=> . . . , value arrayref must be a reference to an array of references to objects. index must be an integer. The object reference at position number index in the array is retrieved and pushed onto the top of the stack.

If arrayref is null a NullPointerException is thrown. If index is not within the bounds of the array an ArrayIndexOutOfBoundsException is thrown.

baload
   Load signed byte from array.
   Syntax:

```
   baload = 51
   ```

Stack: . . . , arrayref, index=> . . . , value arrayref must be a reference to an array of signed bytes. index must be an integer. The signed byte value at position number index in the array is retrieved, expanded to an integer, and pushed onto the top of the stack.

If arrayref is null a NullPointerException is thrown. If index is not within the bounds of the array an ArrayIndexOutOfBoundsException is thrown.

caload
   Load character from array
   Syntax:

```
   caload = 52
   ```

Stack: . . . , arrayref, index=> . . . , value arrayref must be a reference to an array of characters. index must be an integer. The character value at position number index in the array is retrieved, zero-extended to an integer, and pushed onto the top of the stack.

If arrayref is null a NullPointerException is thrown. If index is not within the bounds of the array an ArrayIndexOutOfBoundsException is thrown.

saload
   Load short from array
   Syntax:

```
   saload = 53
   ```

Stack: . . . , arrayref, index=> . . . , value arrayref must be a reference to an array of short integers. index must be an integer. The ;signed short integer value at position number index in the array is retrieved, expanded to an integer, and pushed onto the top of the stack.

If arrayref is null, a NullPointerException is thrown. If index is not within the bounds of the array an ArrayIndexOutOfBoundsException is thrown.

iastore
   Store into integer array
   Syntax:

```
   iastore = 79
   ```

Stack: . . . , arrayref, index, value=> . . .

arrayref must be a reference to an array of integers, index must be an integer, and value an integer. The integer value is stored at position index in the array.

If arrayref is null, a NullPointerException is thrown. If index is not within the bounds of the array an ArrayIndexOutOfBoundsException is thrown.

lastore
   Store into long integer array
   Syntax:

```
   lastore = 80
   ```

Stack: . . . , arrayref, index, value-word1, value-word2=> . . .

arrayref must be a reference to an array of long integers, index must be an integer, and value a long integer. The long integer value is stored at position index in the array.

If arrayref is null, a NullPointerException is thrown. If index is not within the bounds of the array, an ArrayIndexOutOfBoundsException is thrown.

fastore
   Store into single float array
   Syntax:

| fastore = 81 |

Stack: . . . , arrayref, index, value=> . . .

arrayref must be an array of single-precision floating point numbers, index must be an integer, and value a single-precision floating point number. The single float value is stored at position index in the array.

If arrayref is null, a NullPointerException is thrown. If index is not within the bounds of the array an ArrayIndexOutOfBoundsException is thrown.

dastore
   Store into double float array
   Syntax:

| dastore = 82 |

Stack: . . . , arrayref, index, value-word1, value-word2=> . . .

arrayref must be a reference to an array of double-precision floating point numbers, index must be an integer, and value a double-precision floating point number. The double float value is stored at position index in the array.

If arrayref is null, a NullPointerException is thrown. If index is not within the bounds of the array an ArrayIndexOutOfBoundsException is thrown.

aastore
   Store into object reference array
   Syntax:

| aastore = 83 |

Stack: . . . , arrayref, index, value=> . . .

arrayref must be a reference to an array of references to objects, index must be an integer, and value a reference to an object. The object reference value is stored at position index in the array.

If arrayref is null, a NullPointerException is thrown. If index is not within the bounds of the array, an ArrayIndexOutOfBoundsException is thrown.

The actual type of value must be conformable with the actual type of the elements of the array. For example, it is legal to store an instance of class Thread in an array of class Object, but not vice versa. An ArrayStoreException is thrown if an attempt is made to store an incompatible object reference.

bastore
   Store into signed byte array
   Syntax:

| bastore = 84 |

Stack: . . . , arrayref, index, value=> . . .

arrayref must be a reference to an array of signed bytes, index must be an integer, and value an integer. The integer value is stored at position index in the array. If value is too large to be a signed byte, it is truncated.

If arrayref is null, a NullPointerException is thrown. If index is not within the bounds of the array an ArrayIndexcutOfBoundsException is thrown.

castore
   Store into character array
   Syntax:

| castore = 85 |

Stack: . . . , arrayref, index, value=> . . .

arrayref must be an array of characters, index must be an integer, and value an integer. The integer value is stored at position index in the array. If value is too large to be a character, it is truncated.

If arrayref is null, a NullPointerException is thrown. If index is not within the bounds of [the array an ArrayIndexOutOfBoundsException is thrown.

sastore
   Store into short array
   Syntax:

| sastore = 86 |

Stack: . . . , array, index, value=> . . .

arrayref must be an array of shorts, index must be an integer, and value an integer. The integer value is stored at position index in the array. If value is too large to be an short, it is truncated.

If arrayref is null, a NullPointerException is thrown. If index is not within the bounds of the array an ArrayIndexOutOfBoundsException is thrown.

3.7 Stack Instructions nop
   Do nothing
   Syntax:

| nop = 0 |

Stack: no change
Do nothing.

pop
   Pop top stack word
   Syntax:

| pop = 87 |

Stack: . . . , any=> . . .
Pop the top word from the stack.

pop2
   Pop top two stack words
   Syntax:

| pop2 = 89 |

Stack: . . . , any2, any1=> . . .
Pop the top two words from the stack.

dup
   Duplicate top stack word

Syntax:

> dup = 89

Stack: . . . , any=> . . . , any, any
Duplicate the top word on the stack.
dup2
  Duplicate top two stack words
  Syntax:

> dup2 = 92

Stack: . . . , any2, any1=> . . . , any2, any1, any2, any1
Duplicate the top two words on the stack.
dup_x1
  Duplicate top stack word and put two down
  Syntax:

> dup_x1 = 90

Stack: . . . , any2, any1=> . . . , any1, any2, any1
Duplicate the top word on the stack and insert the copy two words down in the stack.
dup2_x1
  Duplicate top two stack words and put two down
  syntax:

> dup_x1 = 93

Stack: . . . , any3, any2, any1=> . . . , any2, any1, any3, any2, any1
Duplicate the top two words on the stack and insert the copies two words down in the stack.
dup_x2
  Duplicate top stack word and put three down
  Syntax:

> dup_x2 = 91

Stack: . . . , any3, any2, any1=> . . . , any1, any3, any2, any1
Duplicate the top word on the stack and insert the copy three words down in the stack.
dup2_x2
  Duplicate top two stack words and put three down
  Syntax:

> dup2_x2 = 94

Stack: . . . , any4, any3, any2, any1=> . . . , any2, any1, any4, any3, any2, any1
Duplicate the top two words on the stack and insert the copies three words down in the stack.
swap
  Swap top two stack words Syntax:

> swap = 95

Stack: . . . , any2, any1=> . . . , any2, any1
Swap the top two elements on the stack.
3.8 Arithmetic Instructions
iadd
  Integer add
  Syntax:

> iadd = 96

Stack: . . . , value1, value2=> . . . , result
  value1 and value 2 must be integers. The values are added and are replaced on the stack by their integer sum.
ladd
  Long integer add
  Syntax:

> ladd = 97

Stack: . . . , value1-word1, value1-word2, value2-word1, value2-word2=> . . . , result-word1, result-word2
  value1 and value 2 must be long integers. The values are added and are replaced on the stack by their long integer sum.
fadd
  Single floats add
  Syntax:

> fadd = 98

Stack: . . . , value1, value2=> . . . , result
  value1 and value 2 must be single-precision floating point numbers. The values are added and are replaced on the stack by their single-precision floating point sum.
dadd
  Double floats add
  Syntax:

> dadd = 99

Stack: . . . , value1-word1, value1-word2, value2-word1, value2-word2=> . . . , result-word1, result-word2
  value1 and value 2 must be double-precision floating point numbers. The values are added and are replaced on the stack by their double-precision floating point sum.
isub
  Integer subtract
  Syntax:

> isub = 100

Stack: . . . , value1, value2=> . . . , result
  value1 and value 2 must be integers. value2 is subtracted from value1, and both values are replaced on the stack by their integer difference.
lsub
  Long integer subtract Syntax:

```
lsub = 101
```

Stack: ..., value1-word1, value1-word2, value2-word1, value2-word2=> ..., result-word1, result-word2 value1 and value 2 must be long integers. value2 is subtracted from value1, and both values are replaced on the stack by their long integer difference.

fsub
   Single float subtract
   Syntax:

```
fsub = 102
```

Stack: ..., value1, value2=> ..., result value1 and value 2 must be single-precision floating point numbers. value2 is subtracted from value1, and both values are replaced on the stack by their single-precision floating point difference.

dsub
   Double float subtract
   Syntax:

```
dsub = 103
```

Stack: ..., value1-word1, value1-word2, value2-word1, value2-word2=> ..., result-word1, result-word2 value1 and value 2 must be double-precision floating point numbers. value2 is subtracted from value1, and both values are replaced on the stack by their double-precision floating point difference.

imul
   Integer multiply
   Syntax:

```
imul = 104
```

Stack: ..., value1, value2=> ..., result value1 and value 2 must be integers. Both values are replaced on the stack by their integer product.

lmul
   Long integer multiply
   Syntax:

```
imul = 105
```

Stack: ..., value1-word1, value1-word2, value2-word1, value2-word2=> ..., result-word1, result-word2 value1 and value 2 must be long integers. Both values are replaced on the stack by their long integer product.

fmul
   Single float multiply
   Syntax:

```
fmul = 106
```

Stack: ..., value1, value2=> ..., result value1 and value 2 must be single-precision floating point numbers. Both values are replaced on the stack by their single-precision floating point product.

dmul
   Double float multiply
   Syntax:

```
dmul = 107
```

Stack: ..., value1-word1, value1-word2, value2-word1, value2-word2=> ..., result-word1, result -word2 value1 and value 2 must be double-precision floating point numbers. Both values are replaced on the stack by their double-precision floating point product.

idiv
   Integer divide
   Syntax:

```
idiv = 108
```

Stack: ..., value1, value2=> ..., result value1 and value 2 must be integers. value1 is divided by value2, and both values are replaced on the stack by their integer quotient.

The result is truncated to the nearest integer that is between it and 0. An attempt to divide by zero results in a "/ by zero" ArithmeticException being thrown.

ldiv
   Long integer divide
   Syntax:

```
ldiv = 109
```

Stack: ..., , value1-word1, value1-word2, value2-word1value2-word2=> ..., result-word1, result-word2 value1 and value 2 must be long integers. value1 is divided by value2, and both values are replaced on the stack by their long integer quotient.

The result is truncated to the nearest integer that is between it and 0. An attempt to divide by zero results in a "/ by zero" ArithmeticException being thrown.

fdiv
   Single float divide
   Syntax:

```
fdiv = 110
```

Stack: ..., value1, value2=> ..., result value1 and value 2 must be single-precision floating point numbers. value1 is divided by value2, and both values are replaced on the stack by their single-precision floating point quotient.

Divide by zero results in the quotient being NaN.

ddiv
   Double float divide
   Syntax:

```
ddiv = 111
```

Stack: ..., value1-word1, value1-word2, value2-word1, value2-word2=> ..., result-word1, result-word2 value1 and value 2 must be double-precision floating point numbers. value1 is divided by value2, and both values are replaced on the stack by their double-precision floating point quotient.

Divide by zero results in the quotient being NaN.

irem
  Integer remainder
  Syntax:

[irem = 112]

Stack: ..., value1, value2 => ..., result
  value1 and value 2 must both be integers. value1 is divided by value2, and both values are replaced on the stack by their integer remainder.
  An attempt to divide by zero results in a "/ by zero" ArithmeticException being thrown.

lrem
  Long integer remainder
  Syntax:

[lrem = 113]

Stack: ..., value1-word1, value1-word2, value2-word1, value2-word2 => ..., result-word1, result-word2
  value1 and value 2 must both be long integers. value1 is divided by value2, and both values are replaced on the stack by their long integer remainder.
  An attempt to divide by zero results in a "/ by zero" ArithmeticException being thrown.

frem
  Single float remainder
  Syntax:

[frem = 114]

Stack: ..., value1, value2 => ..., result
  value1 and value 2 must both be single-precision floating point numbers. value1 is divided by value2, and the quotient is truncated to an integer, and then multiplied by value2. The product is subtracted from value1. The result, as a single-precision floating point number, replaces both values on the stack. result=value1−(integral_part(value1/value2)*value2), where integral_part( ) rounds to the nearest integer, with a tie going to the even number.
  An attempt to divide by zero results in NaN.

drem
  Double float remainder
  Syntax:

[drem = 115]

Stack: ..., value1-word1, value1-word2, value2-word1, value2-word2 => ..., result-word1, result -word2
  value1 and value 2 must both be double-precision floating point numbers. value1 is divided by value2, and the quotient is truncated to an integer, and then multiplied by value2. The product is subtracted from value1. The result, as a double-precision floating point number, replaces both values on the stack. result=value1−(integral_part(value1/value2)*value2), where integral_part ( ) rounds to the nearest integer, with a tie going to the even number.
  An attempt to divide by zero results in NaN.

ineg
  Integer negate
  Syntax:

[ineg = 116]

Stack: ..., value => ..., result
  value must be an integer. It is replaced on the stack by its arithmetic negation.

lneg
  Long integer negate
  Syntax:

[lneg = 117]

Stack: ..., value-word1, value-word2 => ..., result-word1, result-word2
  value must be a long integer. It is replaced on the stack by its arithmetic negation.

fneg
  Single float negate
  Syntax:

[fneg = 118]

Stack: ..., value => ..., result
  value must be a single-precision floating point number. It is replaced on the stack by its arithmetic negation.

dneg
  Double float negate
  Syntax:

[dneg = 119]

Stack: ..., value-word1, value-word2 => ..., result-word1, result-word2
  value must be a double-precision floating point number. It is replaced on the stack by its arithmetic negation.

3.9 Logical Instructions ishl
  Integer shift left
  Syntax:

[ishl = 120]

Stack: ..., value1, value2 => ..., result
  value1 and value 2 must be integers. value1 is shifted left by the amount indicated by the low five bits of value2. The integer result replaces both values on the stack.

ishr
  Integer arithmetic shift right
  Syntax:

[ishr = 122]

Stack: ..., value1, value2 => ..., result
  value1 and value 2 must be integers. value1 is shifted right arithmetically (with sign extension) by the amount indicated by the low five bits of value2. The integer result replaces both values on the stack.

iushr
  Integer logical shift right

Syntax:

```
iushr = 124
```

Stack: . . . , value1, value2=> . . . , result value1 and value 2 must be integers. value1 is shifted right logically (with no sign extension) by the amount indicated by the low five bits of value2. The integer result replaces both values on the stack.

lshl

Long integer shift left

Syntax:

```
lshl = 121
```

Stack: . . . , value1-word1, value1-word2, value2=> . . . , result-word1, result-word2 value1 must be a long integer and value 2 must be an integer. value1 is shifted left by the amount indicated by the low six bits of value2. The long integer result replaces both values on the stack.

lshr

Long integer arithmetic shift right

Syntax:

```
lshr = 123
```

Stack: . . . , value1-word1, value1-word2, value2=> . . . , result-word1, result-word2 value1 must be a long integer and value 2 must be an integer. value1 is shifted right arithmetically (with sign extension) by the amount indicated by the low six bits of value2. The long integer result replaces both values on the stack.

lushr

Long integer logical shift right

Syntax:

```
lushr = 125
```

Stack: . . . , value1-word1, value1-word2, value2-word1, value2-word2=> . . . , result-word1, result-word2 value1 must be a long integer and value 2 must be an integer. value1 is shifted right logically (with no sign extension) by the amount indicated by the low six bits of value2. The long integer result replaces both values on the stack.

iand

Integer boolean AND

Syntax:

```
iand = 126
```

Stack: . . . , value1, value2=> . . . , result value1 and value 2 must both be integers. They are replaced on the stack by their bitwise logical and (conjunction).

land

Long integer boolean AND

Syntax:

```
land = 127
```

Stack: . . . , value1-word1, value1-word2, value2-word1, value2-word2=> . . . , result-word1, result-word2 value1 and value 2 must both be long integers. They are replaced on the stack by their bitwise logical and (conjunction).

ior

Integer boolean OR

Syntax:

```
ior = 128
```

Stack: . . . , value1, value2=> . . . , result value1 and value 2 must both be integers. They are replaced on the stack by their bitwise logical or (disjunction).

lor

Long integer boolean OR

Syntax:

```
lor = 129
```

Stack: . . . , value1-word1, value1-word2, value2-word1, value2-word2=> . . . , result-word1, result-word2 value1 and value 2 must both be long integers. They are replaced on the stack by their bitwise logical or (disjunction).

ixor

Integer boolean XOR

Syntax:

```
ixor = 130
``` value1 and value 2 must both be integers. They are replaced on the stack by their bitwise exclusive or (exclusive disjunction).

lxor

Long integer boolean XOR

Syntax:

```
lxor = 131
```

Stack: . . . , value1-word1, value1-word2, value2-word1, value2-word2=> . . . , result-word1, result-word2 value1 and value 2 must both be long integers. They are replaced on the stack by their bitwise exclusive or (exclusive disjunction).

3.10 Conversion Operations i2l

Integer to long integer conversion

Syntax:

```
i2l = 133
```

Stack: . . . , value=> . . . , result-word1, result-word2 value must be an integer. It is converted to a long integer. The result replaces value on the stack.

i2f
  Integer to single float
  Syntax:

i2f = 134

Stack: . . . , value => . . . , result
value must be an integer. It is converted to a single-precision floating point number. The result replaces value on the stack.
i2d
  Integer to double float
  Syntax:

i2d = 135

Stack: . . . , value=> . . . , result-word1, result-word2
value must be an integer. It is converted to a double-precision floating point number. The result replaces value on the stack.
l2i
  Long integer to integer
  Syntax:

l2i = 136

Stack: . . . , value-word1, value-word2=> . . . , result
value must be a long integer. It is converted to an integer by taking the low-order 32 bits. The result replaces value on the stack.
l2f
  Long integer to single float
  Syntax:

l2f = 137

Stack: . . . , value-word1, value-word2=> . . . , result
value must be a long integer. It is converted to a single-precision floating point number. The result replaces value on the stack.
l2d
  Long integer to double float
  Syntax:

l2d = 138

Stack: . . . , value-word1, value-word2=> . . . , result-word1, result-word2
value must be a long integer. It is converted to a double-precision floating point number. The result replaces value on the stack.
f2i
  Single float to integer
  Syntax:

f2i = 139

Stack: . . . , value=> . . . , result
value must be a single-precision floating point number. It is converted to an integer. The result replaces value on the stack.

f2l
  Single float to long integer
  Syntax:

f2l = 140

Stack: . . . , value=> . . . , result-word1, result-word2
value must be a single-precision floating point number. It is converted to a long integer. The result replaces value on the stack.
f2d
  Single float to double float
  Syntax:

f2d = 141

Stack: . . . , value=> . . . , result-word1, result-word2
value must be a single-precision floating point number. It is converted to a double-precision floating point number. The result replaces value on the stack.
d2i
  Double float to integer
  Syntax:

2di = 142

Stack: . . . , value-word1, value-word2=> . . . , result
value must be a double-precision floating point number. It is converted to an integer. The result replaces value on the stack.
d2l
  Double float to long integer
  Syntax:

d2l = 143

Stack: . . . , value-word1, value-word2=> . . . , result-word1, result-word2
value must be a double-precision floating point number. It is converted to a long integer. The result replaces value on the stack.
d2f
  Double float to single float
  Syntax:

2df = 144

Stack: . . . , value-word1, value-word2=> . . . , result
value must be a double-precision floating point number. It is converted to a single-precision floating point number. If overflow occurs, the result must be infinity with the same sign as value. The result replaces value on the stack.
int2byte
  Integer to signed byte
  Syntax:

int2byte = 157

Stack: . . . , value=> . . . , result value must be an integer. It is truncated to a signed 8-bit result, then sign extended to an integer. The result replaces value on the stack.
int2char
Integer to char
Syntax:

| int2char = 146 |

Stack: . . . , value=> . . . , result
value must be an integer. It is truncated to an unsigned 16-bit result, then zero extended to an integer. The result replaces value on the stack.
int2short
Integer to short
Syntax:

| int2short = 147 |

Stack: . . . , value=> . . . , result
value must be an integer. It is truncated to a signed 16-bit result, then sign extended to an integer. The result replaces value on the stack.

3.11 Control Transfer Instructions
ifeq
Branch if equal to 0
Syntax:

| ifeq = 153 |
| branchbyte1 |
| branchbyte2 |

Stack: . . . , value=> . . .
value must be an integer. It is popped from the stack. If value is zero, branchbyte1 and branchbyte2 are used to construct a signed 16-bit offset. Execution proceeds at that offset from the address of this instruction. Otherwise execution proceeds at the instruction following the ifeq.
ifnull
Branch if null
Syntax:

| ifnull = 198 |
| branchbyte1 |
| branchbyte2 |

Stack: . . . , value=> . . .
value must be a reference to an object. It is popped from the stack. If value is null, branchbyte1 and branchbyte2 are used to construct a signed 16-bit offset. Execution proceeds at that offset from the address of this instruction. Otherwise execution proceeds at the instruction following the ifnull.
iflt
Branch if less than 0
Syntax:

| iflt = 155 |
| branchbyte1 |
| branchbyte2 |

Stack: . . . , , value=> . . .
value must be an integer. It is popped from the stack. If value is less than zero, branchbyte1 and branchbyte2 are used to construct a signed 16-bit offset. Execution proceeds at that offset from the address of this instruction. Otherwise execution proceeds at the instruction following the iflt.
ifle
Branch if less than or equal to 0
Syntax:

| ifle=158 |
| branchbyte1 |
| branchbyte2 |

Stack: . . . , value=> . . .
value must be an integer. It is popped from the stack. If value is less than or equal to zero, branchbyte1 and branchbyte2 are used to construct a signed 16-bit offset. Execution proceeds at that offset from the address of this instruction. Otherwise execution proceeds at the instruction following the ifle.
ifne
Branch if not equal to 0
Syntax:

| ifne=154 |
| branchbyte1 |
| branchbyte2 |

Stack: . . . , value=> . . .
value must be an integer. It is popped from the stack. If value is not equal to zero, branchbyte1 and branchbyte2 are used to construct a signed 16-bit offset. Execution proceeds at that offset from the address of this instruction. Otherwise execution proceeds at the instruction following the ifne.
ifnonnull
Branch if not null
Syntax:

| ifnonnull=199 |
| branchbyte1 |
| branchbyte2 |

Stack: . . . , value=> . . .
value must be a reference to an object. It is popped from the stack. If value is notnull, branchbyte1 and branchbyte2 are used to construct a signed 16-bit offset. Execution proceeds at that offset from the address of this instruction. Otherwise execution proceeds at the instruction following the ifnonnull.
ifgt Branch if greater than 0
Syntax:

```
ifft=157
branchbyte1
branchbyte2
```

Stack: . . . , value=> . . .

value must be an integer. It is popped from the stack. If value is greater than zero, branchbyte1 and branchbyte2 are used to construct a signed 16-bit offset. Execution proceeds at that offset from the address of this instruction. Otherwise execution proceeds at the instruction following the ifgt.

ifge

Branch if greater than or equal to 0
Syntax:

```
ifge=156
branchbyte1
branchbyte2
```

Stack: . . . , value=> . . .

value must be an integer It is popped from the stack. If value is greater than or equal to zero, branchbyte1 and branchbyte2 are used to construct a signed 16-bit offset. Execution proceeds at that offset from the address of this instruction. Otherwise execution proceeds at the instruction following instruction ifge.

if_icmpeq

Branch if integers equal
Syntax:

```
if_icmpeg=159
branchbyte1
branchbyte2
```

Stack: . . . , value1, value2=> . . .

value1 and value2 must be integers. They are both popped from the stack. If value1 is equal to value2, branchbyte1 and branchbyte2 are used to construct a signed 16-bit offset. Execution proceeds at that offset from the address of this instruction. Otherwise execution proceeds at the instruction following instruction if_icmpeq.

if_icmpne

Branch if integers not equal
Syntax:

```
if_icmpne=160
branchbyte1
branchbyte2
```

Stack: . . . , value1, value2=> . . .

value1 and value2 must be integers. They are both popped from the stack. If value1 is not equal to value2, branchbyte1 and branchbyte2 are used to construct a signed 16-bit offset. Execution proceeds at that offset from the address of this instruction. Otherwise execution proceeds at the instruction following instruction if_icmpne.

if_icmplt

Branch if integer less than
Syntax:

```
if_icmplt=161
branchbyte1
branchbyte2
```

Stack: . . . , value1, value2=> . . .

value1 and value2 must be integers. They are both popped from the stack. If value1 is less than value2, branchbyte1 and branchbyte2 are used to construct a signed 16-bit offset. Execution proceeds at that offset from the address of this instruction. Otherwise execution proceeds at the instruction following instruction if_icmplt.

if_icmpgt

Branch if integer greater than
Syntax:

```
if_icmpgt=163
branchbyte1
branchbyte2
```

Stack: . . . , value1, value2=> . . .

value1 and value2 must be integers. They are both popped from the stack. If value1 is greater than value2, branchbyte1 and branchbyte2 are used to construct a signed 16-bit offset. Execution proceeds at that offset from the address of this instruction. Otherwise execution proceeds at the instruction following instruction if_icmpgt.

if_icmple

Branch if integer less than or equal to
Syntax:

```
if_icmple=164
branchbyte1
branchbyte2
```

Stack: . . . , value1, value2=> . . .

value1 and value2 must be integers. They are both popped from the stack. If value1 is less than or equal to value2, branchbyte1 and branchbyte2 are used to construct a signed 16-bit offset. Execution proceeds at that offset from the address of this instruction. Otherwise execution proceeds at the instruction following instruction if_icmple.

if_icmpge

Branch if integer greater than or equal to
Syntax:

```
if_icmpge=162
branchbyte1
branchbyte2
```

Stack: . . . , value1, value2=> . . .

value1 and value2 must be integers. They are both popped from the stack. If value1 is greater than or equal to value2, branchbyte1 and branchbyte2 are used to construct a signed 16-bit offset. Execution proceeds at that offset from the address of this instruction. Otherwise execution proceeds at the instruction following instruction if_icmpge.

lcmp

Long integer compare

Syntax:

```
lcmp=148
```

Stack: . . . , value1-word1, value1-word2, value2-word1, value2-word1 => . . . , result value1 and value2 must be long integers. They are both popped from the stack and compared. If value1 is greater than value2, the integer value1 is pushed onto the stack. If value1 is equal to value2, the value 0 is pushed onto the stack. If value1 is less than value2, the value −1 is pushed onto the stack.

fcmpl

Single float compare (1 on NaN)

Syntax:

```
fcmpl=149
```

Stack: . . . , value1, value2 => . . . , result value1 and value2 must be single-precision floating point numbers. They are both popped from the stack and compared. If value1 is greater than value2, the integer value 1 is pushed onto the stack. If value1 is equal to value2, the value 0 is pushed onto the stack. If value1 is less than value2, the value −1 is pushed onto the stack.

If either value1 or value2 is NaN, the value −1 is pushed onto the stack.

fcmpg

Single float compare (1 on NaN)

Syntax:

```
fcmpg=150
```

Stack: . . . , value1, value2 => . . . , result value1 and value2 must be single-precision floating point numbers. They are both popped from the stack and compared. If value1 is greater than value2, the integer value 1 is pushed onto the stack. If value1 is equal to value2, the value 0 is pushed onto the stack. If value1 is less than value2, the value −1 is pushed onto the stack.

If either value1 or value2 is NaN, the value 1 is pushed onto the stack.

dcmpl

Double float compare (−1 on NaN)

Syntax:

```
dcmpl=151
```

Stack: . . . , value1-word1, value1-word2, value2-word1, value2-word1 => . . . , result value1 and value2 must be double-precision floating point numbers. They are both popped from the stack and compared. If value1 is greater than value2, the integer value 1 is pushed onto the stack. If value1 is equal to value2, the value 0 is pushed onto the stack. If value1 is less than value2, the value 1 is pushed onto the stack.

If either value1 or value2 is NaN, the value 1 is pushed onto the stack.

dcmpg

Double float compare (1 on NaN)

Syntax:

```
dcmpg=152
```

Stack: . . . , value1-word1, value1-word2, value2-word1, value2-word1 => . . . , result value1 and value2 must be double-precision floating point numbers. They are both popped from the stack and compared. If value1 is greater than value2, the integer value 1 is pushed onto the stack. If value1 is equal to value2, the value 0 is pushed onto the stack. If value1 is less than value2, the value −1 is pushed onto the stack.

If either value1 or value2 is NaN, the value 1 is pushed onto the stack.

if_acmpeq

Branch if object references are equal

Syntax:

```
if_acmpeq=165
branchbyte1
branchbyte2
```

Stack: . . . , value1, value2 => . . .

value1 and value2 must be references to objects. They are both popped from the stack. If the objects referenced are not the same, branchbyte1 and branchbyte2 are used to construct a signed 16-bit offset.

Execution proceeds at that offset from the Address of this instruction. Otherwise execution proceeds at the instruction following the if_acmpeq.

if_acmpne

Branch if object references not equal

Syntax:

```
if_acmpne=166
branchbyte1
branchbyte2
```

Stack: . . . , value1, value2 => . . .

value1 and value2 must be references to objects. They are both popped from the stack. If the objects referenced are not the same, branchbyte1 and branchbyte2 are used to construct a signed 16-bit offset.

Execution proceeds at that offset from the address of this instruction. Otherwise execution proceeds at the instruction following instruction if_acmpne.

goto

Branch always

Syntax:

| goto=167 |
|---|
| branchbyte1 |
| branchbyte2 |

Stack: no change branchbyte1 and branchbyte2 are used to construct a signed 16-bit offset. Execution proceeds at that offset from the address of this instruction.

goto_w
  Branch always (wide index)
  Syntax:

| goto_w=200 |
|---|
| branchbyte1 |
| branchbyte2 |
| branchbyte3 |
| branchbyte4 |

Stack: no change branchbyte1, branchbyte2, branchbyte3, and branchbyte4 are used to construct a signed 32-bit offset.

Execution proceeds at that offset from the address of this instruction.

jsr
  Jump subroutine
  Syntax:

| jsr=168 |
|---|
| branchbyte1 |
| branchbyte2 |

Stack: . . . , return-address branchbyte1 and branchbyte2 are used to construct a signed 16-bit offset. The address of the instruction immediately following the jsr is pushed onto the stack. Execution proceeds at the offset from the address of this instruction.

jsr_w
  Jump subroutine (wide index)
  Syntax:

| jsr_w=201 |
|---|
| branchbyte1 |
| branchbyte2 |
| branchbyte3 |
| branchbyte4 |

Stack: . . . => . . . , return-address branchbyte1, branchbyte2, branchbyte3, and branchbyte4 are used to construct a signed 32-bit offset. The address of the instruction immediately following the jsr_w is pushed onto the stack. Execution proceeds at the offset from the address of this instruction.

ret
  Return from subroutine

Syntax:

| ret=169 |
|---|
| vindex |

Stack: no change

Local variable vindex in the current JAVA frame must contain a return address. The contents of the local variable are written into the pc.

Note that jsr pushes the address onto the stack, and ret gets it out of a local variable. This asymmetry is intentional.

ret_w
  Return from subroutine (wide index)
  Syntax:

| ret_w=209 |
|---|
| vindexbyte1 |
| vindexbyte2 |

Stack: no change vindexbyte1 and vindexbyte2 are assembled into an unsigned 16-bit index to a local variable in the current JAVA frame. That local variable must contain a return address. The contents of the local variable are written into the pc. See the ret instruction for more information.

3.12 Function Return ireturn
  Return integer from function
  Syntax:

| ireturn=172 |
|---|

Stack: . . . , value=>[empty]

value must be an integer. The value value is pushed onto the stack of the previous execution environment. Any other values on the operand stack are discarded. The interpreter then returns control to its caller.

lreturn
  Return long integer from function
  Syntax:

| lreturn=173 |
|---|

Stack: . . . , value-word1, value-word2=>[empty]

value must be a long integer. The value value is pushed onto the stack of the previous execution environment. Any other values on the operand stack are discarded. The interpreter then returns control to its caller.

freturn
  Return single float from function
  Syntax:

| freturn=174 |
|---|

Stack: . . . , value=>[empty]

value must be a single-precision floating point number. The value value is pushed onto the stack of the previous execution environment. Any other values on the operand stack are discarded. The interpreter then returns control to its caller.

dreturn

Return double float from function

Syntax:

| dreturn=175 |
|---|

Stack: . . . , value-word1, value-word2=>[empty]

value must be a double-precision floating point number. The value value is pushed onto the stack of the previous execution environment. Any other values on the operand stack are discarded. The interpreter then returns control to its caller.

areturn

Return object reference from function

Syntax:

| areturn=176 |
|---|

Stack: . . . , value=>[empty]

value must be a reference to an object. The value value is pushed onto the stack of the previous execution environment. Any other values on the operand stack are discarded. The interpreter then returns control to its caller.

return

Return (void) from procedure

Syntax:

| return=177 |
|---|

Stack: . . . =>[empty]

All values on the operand stack are discarded. The interpreter then returns control to its caller.

breakpoint

Stop and pass control to breakpoint handler

Syntax:

| breakpoint=202 |
|---|

Stack: no change 3.13 Table Jumping tableswitch

Access jump table by index and jump

Syntax:

| tableswitch=170 |
|---|
| ...0 - 3 byte pad... |
| default - offset1 |
| default - offset2 |
| default - offset3 |
| default - offset4 |
| low1 |
| low2 |
| low3 |
| low4 |
| high1 |
| high2 |
| high3 |
| high4 |
| ...jump offsets... |

Stack: . . . , index=> . . .

tableswitch is a variable length instruction. Immediately after the tableswitch opcode, between zero and three 0's are inserted as padding so that the next byte begins at an address that is a multiple of four. After the padding follow a series of signed 4-byte quantities: default-offset, low, high, and then high-low+1 further signed 4-byte offsets. The high-low+1 signed 4-byte offsets are treated as a 0-based jump table.

The index must be an integer. If index is less than low or index is greater than high, then default-offset is added to the address of this instruction. Otherwise, low is subtracted from index, and the index-low'th element of the jump table is extracted, and added to the address of this instruction.

lookupswitch

Access jump table by key match and jump

Syntax:

| lookupswitch=170 |
|---|
| ...0 - 3 byte pad... |
| default - offset1 |
| default - offset2 |
| default - offset3 |
| default - offset4 |
| npairs1 |
| npairs2 |
| npairs3 |
| npairs4 |
| ...match-offset pairs... |

Stack: . . . , key=> . . .

lookupswitch is a variable length instruction. Immediately after the lookupswitch opcode, between zero and three 0's are inserted as padding so that the next byte begins at an address that is a multiple of four.

Immediately after the padding are a series of pairs of signed 4-byte quantities. The first pair is special. The first item of that pair is the default offset, and the second item of that pair gives the number of pairs that follow. Each subsequent pair consists of a match and an offset.

The key must be an integer. The integer key on the stack is compared against each of the matches. If it is equal to one of them, the offset is added to the address of this instruction. If the key does not match any of the matches, the default offset is added to the address of this instruction.

3.14 Manipulating Object Fields putfield

Set field in object

Syntax:

```
putfield=181
indexbyte1
indexbyte2
```

Stack: . . . , objectref, value=> . . .
OR
Stack: . . . , objectref, value-word1, value-word2=> . . .

indexbyte1 and indexbyte2 are used to construct an index into the constant pool of the current class. The constant pool item will be a field reference to a class name and a field name. The item is resolved to a field block pointer which has both the field width (in bytes) and the field offset (in bytes).

The field at that offset from the start of the object referenced by object refwill be set to the value on the top of the stack.

This instruction deals with both 32-bit and 64-bit wide fields.

If object ref is null, aNullPointerException is generated.

If the specified field is a static field, anIncompatibleClass-ChangeError is thrown.

getfield
Fetch field from object
Syntax:

```
getfield=180
indexbyte1
indexbyte2
```

Stack: . . . , objectref=> . . . , value
OR
Stack: . . . , objectref=> . . . , value-word1, value-word2 indexbyte1 and indexbyte2 are used to construct an index into the constant pool of the current class. The constant pool item will be a field reference to a class name and a field name. The item is resolved to a field block pointer which has both the field width (in bytes) and the field offset (in bytes).

objectref must be a reference to an object. The value at offset into the object referenced by objectref replaces objectref on the top of the stack.

This instruction deals with both 32-bit and 64-bit wide fields.

If objectref is null, a NullPointerException is generated.

If the specified field is a static field, an Incompatible-ClassChangeError is thrown.

putstatic
Set static field in class
Syntax:

```
putstatic-179
indexbyte1
indexbyte2
```

Stack: . . . , value=> . . .
OR
Stack: . . . , value-word1, value-word2=> . . .

indexbyte1 and indexbyte2 are used to construct an index into the constant pool of the current class. The constant pool item will be a field reference to a static field of a class. That field will be set to have the value on the top of the stack.

This instruction works for both 32-bit and 64-bit wide fields.

If the specified field is a dynamic field, an Incompatible-ClassChangeError is thrown.

getstatic
Get static field from class
Syntax:

```
getstatic=178
indexbyte1
indexbyte2
```

Stack: . . . , => . . . , value
OR
Stack: . . . , => . . . , value-word1, value-word2 indexbyte1 and indexbyte2 are used to construct an index into the constant pool of the current class. The constant pool item will be a field reference to a static field of a class.

This instruction deals with both 32-bit and 64-bit wide fields.

If the specified field is a dynamic field, an Incompatible-ClassChangeError is generated.

3.15 Method Invocation

There are four instructions that implement method invocation.

| | |
|---|---|
| invokevirtual | Invoke an instance method of an object, dispatching based on the runtime (virtual) type of the object. This is the normal method dispatch in JAVA. |
| invokenonvirtual | Invoke an instance method of an object, dispatching based on the compile-time (non-virtual) type of the object. This is used, for example, when the keywordsuper or the name of a superclass is used as a method qualifier. |
| invokestatic | Invoke a class (static) method in a named class. |
| invokeinterface | Invoke a method which is implemented by an interface, searching the methods implemented by the particular run-time object to find the appropriate method. | invokevirtual
Invoke instance method, dispatch based on run-time type
Syntax:

```
invokevirtual=182
indexbyte1
indexbyte2
```

Stack: . . . , objectref, [arg1, [arg2 . . . ]], . . . => . . .

The operand stack must contain a reference to an object and some number of arguments.indexbyte1 and indexbyte2 are used to construct an index into the constant pool of the current class. The item at that index in the constant pool contains the complete method signature. A pointer to the object's method table is retrieved from the object reference. The method signature is looked up in the method table. The method signature is guaranteed to exactly match one of the method signatures in the table.

The result of the lookup is an index into the method table of the named class, which is used with the object's dynamic type to look in the method table of that type, where a pointer to the method block for the matched method is found. The method block indicates the type of method (native, synchronized, and so on) and the number of arguments expected on the operand stack.

If the method is marked synchronized the monitor associated with objectref is entered.

The objectref and arguments are popped off this method's stack and become the initial values of the local variables of the new method. Execution continues with the first instruction of the new method.

If the object reference on the operand stack is null, a NullPointerException is thrown. If during the method invocation a stack overflow is detected, a StackOverflowError is thrown.

invokenonvirtual

Invoke instance method, dispatching based on compile-time type

Syntax:

| invokenonvirtual=183 |
| --- |
| indexbyte1 |
| indexbyte2 |

Stack: . . . , objectref, [arg1, [arg2 . . . ]], . . . => . . .

The operand stack must contain a reference to an object and some number of arguments. indexbyte1 and indexbyte2 are used to construct an index into the constant pool of the current class. The item at that index in the constant pool contains a complete method signature and class. The method signature is looked up in the method table of the class indicated. The method signature is guaranteed to exactly match one of the method signatures in the table.

The result of the lookup is a method block. The method block indicates the type of method (native, synchronized, and so on) and the number of arguments (nargs) expected on the operand stack.

If the method is marked synchronized the monitor associated with objectref is entered.

The objectref and arguments are popped off this method's stack and become the initial values of the local variables of the new method. Execution continues with the first instruction of the new method.

If the object reference on the operand stack is null, a NullPointerException is thrown. If during the method invocation a stack overflow is detected, a StackOverflowError is thrown.

invokestatic

Invoke a class (static) method

Syntax:

| invokestatis = 184 |
| --- |
| indexbyte1 |
| indexbyte2 |

Stack: . . . , [arg1, [arg2 . . . ]], . . . => . . .

The operand stack must contain some number of arguments. indexbyte1 and indexbyte2 are used to construct an index into the constant pool of the current class. The item at that index in the constant pool contains the complete method signature and class. The method signature is looked up in the method table of the class indicated. The method signature is guaranteed to exactly match one of the method signatures in the class's method table.

The result of the lookup is a method block. The method block indicates the type of method (native, synchronized, and so on) and the number of arguments (nargs) expected on the operand stack.

If the method is marked synchronized the monitor associated with the class is entered.

The arguments are popped off this method's stack and become the initial values of the local variables of the new method. Execution continues with the first instruction of the new method.

If during the method invocation a stack overflow is detected, a StackOverflowError is thrown.

invokeinterface

Invoke interface method

Syntax:

| invokeinterface = 185 |
| --- |
| indexbyte1 |
| indexbyte2 |
| nargs |
| reserved |

Stack: . . . , objectref, [arg1, [arg2 . . . ]], . . . => . . .

The operand stack must contain a reference to an object and nargs-1 arguments. indexbyte1 and indexbyte2 are used to construct an index into the constant pool of the current class. The item at that index in the constant pool contains the complete method signature. A pointer to the object's method table is retrieved from the object reference. The method signature is looked up in the method table. The method signature is guaranteed to exactly match one of the method signatures in the table.

The result of the lookup is a method block. The method block indicates the type of method (native, synchronized, and so on) but unlike invokevirtual and invokenonvirtual, the number of available arguments (nargs) is taken from the bytecode.

If the method is markedsynchronized the monitor associated with objectref is entered.

The objectref and arguments are popped off this method's stack and become the initial values of the local variables of the new method. Execution continues with the first instruction of the new method.

If the objectref on the operand stack is null, a NullPointerException is thrown. If during the method invocation a stack overflow is detected, a StackOverflowError is thrown.

3.16 Exception Handling athrow

Throw exception or error

Syntax:

| athrow = 191 |
| --- |

Stack: . . . , objectref=>[undefined]

objectref must be a reference to an object which is a subclass of Throwable, which is thrown. The current JAVA stack frame is searched for the most recent catch clause that catches this class or a superclass of this class. If a matching catch list entry is found, the pc is reset to the address indicated by the catch-list entry, and execution continues there.

If no appropriate catch clause is found in the current stack frame, that frame is popped and the object is rethrown. If one is found, it contains the location of the code for this exception. The pc is reset to that location and execution continues. If no appropriate catch is found in the current stack frame, that frame is popped and the objectref is rethrown.

If objectref is null, then a NullPointerException is thrown instead.

3.17 Miscellaneous Object Operations new

Create new object

Syntax:

```
new = 187
indexbyte1
indexbyte2
```

Stack: . . . => . . . , objectref indexbyte1 and indexbyte2 are used to construct an index into the constant pool of the current class. The item at that index must be a class name that can be resolved to a class pointer, class. A new instance of that class is then created and a reference to the object is pushed on the stack.

checkcast

Make sure object is of given type

Syntax:

```
checkcast = 192
  indexbyte1
  indexbyte2
```

Stack: . . . , objectref=> . . . , objectref indexbyte1 and indexbyte2 are used to construct an index into the constant pool of the current class. The string at that index of the constant pool is presumed to be a class name which can be resolved to a class pointer, class. objectref must be a reference to an object.

checkcast determines whether objectref can be cast to be a reference to an object of class class. A null objectref can be cast to any class. Otherwise the referenced object must be an instance of class or one of its superclasses. If objectref can be cast to class execution proceeds at the next instruction, and the objectref remains on the stack.

If objectref cannot be cast to class, a ClassCastException is thrown.

instanceof

Determine if an object is of given type

Syntax:

```
instanceof = 193
  indexbyte1
  indexbyte2
```

Stack: . . . , objectref=> . . . , result indexbyte1 and indexbyte2 are used to construct an index into the constant pool of the current class. The string at that index of the constant pool is presumed to be a class name which can be resolved to a class pointer, class. objectref must be a reference to an object.

instanceof determines whether objectref can be cast to be a reference to an object of the class class. This instruction will overwrite objectref with 1 if objectref is an instance of class or one of its superclasses. Otherwise, objectref is overwritten by 0. If objectref is null, it's overwritten by 0.

3.18 Monitors monitorenter

Enter monitored region of code

Syntax:

```
monitorenter = 194
```

Stack: . . . , objectref=> . . .

objectref must be a reference to an object.

The interpreter attempts to obtain exclusive access via a lock mechanism to objectref. If another thread already has objectref locked, than the current thread waits until the object is unlocked. If the current thread already has the object locked, then continue execution. If the object is not locked, then obtain an exclusive lock.

If objectref is null, then a NullPointerException is thrown instead.

monitorexit

Exit monitored region of code

Syntax:

```
monitorexit = 195
```

Stack: . . . , objectref=> . . .

objectref must be a reference to an object. The lock on the object released. If this is the last lock that this thread has on that object (one thread is allowed to have multiple locks on a single object), then other threads that are waiting for the object to be available are allowed to proceed.

If objectref is null, then a NullPointerException is thrown instead.

Section A: An Optimization

The following set of pseudo-instructions suffixed by _quick are variants of JAVA virtual machine instructions. They are used to improve the speed of interpreting byte-codes. They are not part of the virtual machine specification or instruction set, and are invisible outside of an JAVA virtual machine implementation. However, inside a virtual machine implementation they have proven to be an effective optimization.

A compiler from JAVA source code to the JAVA virtual machine instruction set emits only non-_quick instructions. If the _quick pseudo-instructions are used, each instance of a non-_quick instruction with a _quick variant is overwritten on execution by its_quick variant. Subsequent execution of that instruction instance will be of the_quick variant.

In all cases, if an instruction has an alternative version with the suffix_quick, the instruction references the constant pool. If the_quick optimization is used, each non-_quick instruction with a_quick variant performs the following:

Resolves the specified item in the constant pool;

Signals an error if the item in the constant pool could not be resolved for some reason;

Turns itself into the _quick version of the instruction. The instructions putstatic, getstatic, putfield, and getfield each have two _quick versions; and Performs its intended operation.

This is identical to the action of the instruction without the _quick optimization, except for the additional step in which the instruction overwrites itself with its _quick variant.

The _quick variant of an instruction assumes that the item in the constant pool has already been resolved, and that this resolution did not generate any errors. It simply performs the intended operation on the resolved item.

Note: some of the invoke methods only support a single-byte offset into the method table of the object; for objects with 256 or more methods some invocations cannot be "quicked" with only these bytecodes.

This Section doesn't give the opcode values of the pseudo-instructions, since they are invisible and subject to change.

A.1 Constant Pool Resolution

When the class is read in, an array constant_pool [ ] of size n constants is created and assigned to a field in the class.constant_pool [0] is set to point to a dynamically allocated array which indicates which fields in the constant_pool have already been resolved.constant_pool [1] through constant_pool [nconstants–1] are set to point at the "type" field that corresponds to this constant item.

When an instruction is executed that references the constant pool, an index is generated, and constant_pool[0] is checked to see if the index has already been resolved. If so, the value of constant_pool [index] is returned. If not, the value of constant_pool [index] is resolved to be the actual pointer or data, and overwrites whatever value was already in constant_pool [index].

A.2 Pushing Constants onto the Stack (_quick variants)

ldc1_quick

Push item from constant pool onto stack

Syntax:

| ldc1_quick |
| indexbyte1 |

Stack: . . . => . . . , item indexbyte1 is used as an unsigned 8-bit index into the constant pool of the current class. The item at that index is pushed onto the stack.

ldc2_quick

Push item from constant pool onto stack

Syntax:

| ldc2_quick |
| indexbyte1 |
| indexbyte2 |

Stack: . . . => . . . , item indexbyte1 and indexbyte2 are used to construct an index into the constant pool of the current class. The constant at that index is resolved and the item at that index is pushed onto the stack.

ldc2w_quick

Push long integer or double float from constant pool onto stack

Syntax:

| ldc2w_quick |
| indexbyte1 |
| indexbyte2 |

Stack: . . . => . . . , constant_word1, constant_word2 indexbyte1 and indexbyte2 are used to construct an index into the constant pool of the current class. The constant at that index is pushed onto the stack.

A.3 Managing Arrays (_quick variants)

anewarray_quick

Allocate new array of references to objects

Syntax:

| anewarray_quick |
| indexbyte1 |
| indexbyte2 |

Stack: . . . , size=>result size must be an integer. It represents the number of elements in the new array.

indexbyte1 and indexbyte2 are used to construct an index into the constant pool of the current class. The entry must be a class.

A new array of the indicated class type and capable of holding size elements is allocated, and result is a reference to this new array. Allocation of an array large enough to contain size items of the given class type is attempted. All elements of the array are initialized to zero.

If size is less than zero, a NegativeArraySizeException is thrown. If there is not enough memory to allocate the array, an OutOfMemoryError is thrown.

multianewarray_quick

Allocate new multi-dimensional array

Syntax:

| multianewarray_quick |
| indexbyte1 |
| indexbyte2 |
| dimensions |

Stack: . . . , size1, size2, . . . sizen=>result

Each size must be an integer. Each represents the number of elements in a dimension of the array.

indexbyte1 and indexbyte2 are used to construct an index into the constant pool of the current class. The resulting entry must be a class.

dimensions has the following aspects:

It must be an integer $^3 1$.

It represents the number of dimensions being created. It must be £ the number of dimensions of the array class.

It represents the number of elements that are popped off the stack. All must be integers greater than or equal to zero. These are used as the sizes of the dimension.

If any of the size arguments on the stack is less than zero, a NegativeArraySizeException is thrown. If there is not enough memory to allocate the array, an OutOfMemoryError is thrown.

The result is a reference to the new array object.

A.4 Manipulating Object Fields (_quick variants)

putfield_quick

Set field in object

Syntax:

| putfield2_quick |
| offset |
| unused |

Stack: . . . , objectref, value=> . . .

objectref must be a reference to an object. value must be a value of a type appropriate for the specified field. offset is the offset for the field in that object. value is written at offset into the object. Both objectref and value are popped from the stack.

If objectref is null, a NullPointerException is generated.

putfield2_quick

Set long integer or double float field in object

Syntax:

```
putfield2_quick
offset
unused
```

Stack: ..., objectref, value-word1, value-word2=> ...

objectref must be a reference to an object. value must be a value of a type appropriate for the specified field. offset is the offset for the field in that object. value is written at offset into the object. Both objectref and value are popped from the stack.

If objectref is null, a NullPointerException is generated.

getfield_quick

Fetch field from object

Syntax:

```
getfield2_quick
offset
unused
```

Stack: ..., objectref=> ..., value objectref must be a handle to an object. The value at offset into the object referenced by objectref replaces objectref on the top of the stack.

If objectref is null, a NullPointerException is generated.

getfield2_quick

Fetch field from object

Syntax:

```
getfield2_quick
offset
unused
```

Stack: ..., objectref=> ..., value-word1, value-word2 objectref must be a handle to an object. The value at offset into the object referenced by objectref replaces objectref on the top of the stack.

If objectref is null, a NullPointerException is generated.

putstatic_quick

Set static field in class

Syntax:

```
putstatic_quick
indexbyte1
indexbyte2
```

Stack: ..., value=> ...

indexbyte1 and indexbyte2 are used to construct an index into the constant pool of the current class. The constant pool item will be a field reference to a static field of a class.value must be the type appropriate to that field. That field will be set to have the value value.

putstatic2_quick

Set static field in class

Syntax:

```
putstatic2_quick
indexbyte1
indexbyte2
```

Stack: ..., value-word1, value-word2=> ...

indexbyte1 and indexbyte2 are used to construct an index into the constant pool of the current class. The constant pool item will be a field reference to a static field of a class. That field must either be a long integer or a double precision floating point number. value must be the type appropriate to that field. That field will be set to have the value value.

getstatic_quick

Get static field from class

Syntax:

```
getstatic_quick
indexbyte1
indexbyte2
```

Stack: ..., => ..., value indexbyte1 and indexbyte2 are used to construct an index into the constant pool of the current class. The constant pool item will be a field reference to a static field of a class. The value of that field will replace handle on the stack.

getstatic2_quick

Get static field from class

Syntax:

```
getstatic2_quick
indexbyte1
indexbyte2
```

Stack: ..., => ..., value-word1, value-word2 indexbyte1 and indexbyte2 are used to construct an index into the constant pool of the current class. The constant pool item will be a field reference to a static field of a class. The field must be a long integer or a double precision floating point number. The value of that field will replace handle on the stack A.5 Method Invocation (_quick variants)

invokevirtual_quick

Invoke instance method, dispatching based on run-time type

Syntax:

```
invokevirtual_quick
offset
nargs
```

Stack: ..., objectref, [arg1, [arg2 ... ]]=> ...

The operand stack must contain objectref, a reference to an object and nargs-1 arguments. The method block at offset in the object's method table, as determined by the object's dynamic type, is retrieved. The method block indicates the type of method (native, synchronized, etc.).

If the method is marked synchronized the monitor associated with the object is entered.

The base of the local variables array for the new JAVA stack frame is set to point to objectref on the stack, making objectref and the supplied arguments (arg1,arg2, ... ) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

invokevirtualobject_quick
Invoke instance method of class JAVA.lang.Object, specifically for benefit of arrays
Syntax:

| invokevirtualobject_quick |
| offset |
| nargs |

Stack: . . . , objectref, [arg1, [arg2 . . . ]]=> . . .

The operand stack must contain objectref, a reference to an object or to an array and nargs-1 arguments. The method block at offset in JAVA.lang.Object's method table is retrieved. The method block indicates the type of method (native, synchronized, etc.).

If the method is marked synchronized the monitor associated with handle is entered.

The base of the local variables array for the new JAVA stack frame is set to point to objectref on the stack, making objectref and the supplied arguments (arg1,arg2, . . . ) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

invokenonvirtual_quick

Invoke instance method, dispatching based on compile-time type
Syntax:

| invokenonvirtual_quick |
| indexbyte1 |
| indexbyte2 |

Stack: . . . , objectref, [arg1, [arg2 . . . ]]=> . . .

The operand stack must contain objectref, a reference to an object and some number of arguments. indexbyte1 and indexbyte2 are used to construct an index into the constant pool of the current class. The item at that index in the constant pool contains a method slot index and a pointer to a class. The method block at the method slot index in the indicated class is retrieved. The method block indicates the type of method (native, synchronized, etc.) and the number of arguments (nargs) expected on the operand stack.

If the method is marked synchronized the monitor associated with the object is entered.

The base of the local variables array for the new JAVA stack frame is set to point to objectref on the stack, making objectref and the supplied arguments (arg1, arg2, . . . ) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

invokestatic_quick

Invoke a class (static) method
Syntax:

| invokestatic_quick |
| indexbyte1 |
| indexbyte2 |

Stack: . . . , [arg1, [arg2 . . . ]]=> . . .

The operand stack must contain some number of arguments. indexbyte1 and indexbyte2 are used to construct an index into the constant pool of the current class. The item at that index in the constant pool contains a method slot index and a pointer to a class. The method block at the method slot index in the indicated class is retrieved. The method block indicates the type of method (native, synchronized, etc.) and the number of arguments (nargs) expected on the operand stack.

If the method is marked synchronized the monitor associated with the method's class is entered.

The base of the local variables array for the new JAVA stack frame is set to point to the first argument on the stack, making the supplied arguments (arg1,arg2, . . . ) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If the object handle on the operand stack is null, a NullPointerException is thrown. If during the method invocation a stack overflow is detected, a StackOverflowError is thrown.

invokeinterface_quick

Invoke interface method
Syntax:

| invokeinterface_quick |
| idbyte1 |
| idbyte2 |
| nargs |
| guess |

Stack: . . . , objectref, [arg1, [arg2 . . . ]]=> . . .

The operand stack must contain objectref, a reference to an object, and nargs-1 arguments. idbyte1 and idbyte2 are used to construct an index into the constant pool of the current class. The item at that index in the constant pool contains the complete method signature. A pointer to the object's method table is retrieved from the object handle.

The method signature is searched for in the object's method table. As a short-cut, the method signature at slot guess is searched first. If that fails, a complete search of the method table is performed. The method signature is guaranteed to exactly match one of the method signatures in the table.

The result of the lookup is a method block. The method block indicates the type of method (native, synchronized, etc.) but the number of available arguments (nargs) is taken from the bytecode.

If the method is marked synchronized the monitor associated with handle is entered.

The base of the local variables array for the new JAVA stack frame is set to point to handle on the stack, making handle and the supplied arguments (arg1,arg2, . . . ) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

guess is the last guess. Each time through, guess is set to the method offset that was used.

A.6 Miscellaneous Object Operations (_quick variants)

new_quick
  Create new object
  Syntax:

| new_quick |
| indexbyte1 |
| indexbyte2 |

Stack: . . . => . . . , objectref indexbyte1 and indexbyte2 are used to construct an index into the constant pool of the current class. The item at that index must be a class. A new instance of that class is then created and objectref, a reference to that object is pushed on the stack.

checkcast_quick
  Make sure object is of given type
  Syntax:

| checkcast_quick |
| indexbyte1 |
| indexbyte2 |

Stack: . . . , objectref=> . . . , objectref objectref must be a reference to an object. indexbyte1 and indexbyte2 are used to construct an index into the constant pool of the current class. The object at that index of the constant pool must have already been resolved. checkcast then determines whether objectref can be cast to a reference to an object of class class. A null reference can be cast to any class, and otherwise the superclasses of objectref's type are searched for class. If class is determined to be a superclass of objectref's type, or if objectref is null, it can be cast to objectref cannot be cast to class, a ClassCastException is thrown.

instanceof_quick
  Determine if object is of given type
  Syntax:

| instanceof_quick |
| indexbyte1 |
| indexbyte2 |

Stack: . . . , objectref=> . . . , result objectref must be a reference to an object. indexbyte1 and indexbyte2 are used to construct an index into the constant pool of the current class. The item of class class at that index of the constant pool must have already been resolved.

Instance of determines whether objectref can be cast to an object of the class class. A null objectref can be cast to any class, and otherwise the superclasses of objectref's type are searched for class. If class is determined to be a superclass of objectref's type, result is 1 (true). Otherwise, result is 0 (false). If handle is null, result is 0 (false).

What is claimed is:

1. A virtual machine instruction processor apparatus comprising:
    a virtual machine instrution store;
    an operand stack;
    a data store wherein the data store includes local variable storage;
    an execution unit; and
    a virtual machine instruction decoder coupled to the virtual machine instruction store to identify a foldable sequence of virtual machine instructions represented therein, the foldable sequence including first and second virtual machine instructions, the first virtual machine instruction for pushing a first operand value onto the operand stack from the data store merely as a first source operand for a second instruction, the virtual machine instruction decoder coupled to supply the execution unit with a single folded operation equivalent to the foldable sequence and including a first operand address identifier selective for the first operand value in the data store, thereby obviating an explicit operation corresponding to the first virtual machine instruction.

2. An apparatus, as recited in claim 1, wherein the data store includes constant storage.

3. An apparatus, as recited in claim 1, wherein the operand stack and the data store are represented in a storage hierarchy including a stack cache, and wherein the stack cache caches at least a portion of entries in the operand stack and the data store.

4. An apparatus, as recited in claim 3,
    wherein the virtual machine instruction decoder selectively disables supply of the equivalent folded operation if the first operand value is not represented in the stack cache portion of the storage hierarchy, and instead supplies the execution unit with an operation identifier and operand address identifier corresponding to the first virtual machine instruction only.

5. An apparatus, as recited in claim 1, wherein if the sequence of virtual machine instructions represented in the instruction buffer is not a foldable sequence, the virtual machine instruction decoder supplies the execution unit with an operation identifier and operand address identifier corresponding to the first virtual machine instruction only.

6. An apparatus, as recited in claim 1,
    wherein the virtual machine instruction decoder further identifies a third virtual machine instruction in the foldable sequence, the third virtual machine instruction being for pushing a second operand value onto the operand stack from the data store merely as a second source operand for the second virtual machine instruction; and
    wherein the single folded operation equivalent to the foldable sequence includes a second operand address identifier selective for the second operand value in the data store, thereby obviating an explicit operation corresponding to the third virtual machine instruction.

7. An apparatus, as recited in claim 1,
    wherein the virtual machine instruction decoder further identifies a fourth virtual machine instruction in the foldable sequence, the fourth virtual machine instruction being for popping a result of the second virtual machine instruction from the operand stack and storing the result in a result location of the data store; and
    wherein the single folded operation equivalent to the foldable sequence includes a destination address identifier selective for the result location in the data store, thereby obviating an explicit operation corresponding to the fourth virtual machine instruction.

8. An apparatus, as recited in claim 1,
wherein the virtual machine instruction decoder further identifies third and fifth virtual machine instructions in the foldable sequence, the third and fifth virtual machine instructions respectively being for pushing second and third operand values onto the operand stack from the data store merely as a respective second and third source operands for the second virtual machine instruction; and wherein the single folded operation equivalent to the foldable sequence includes second and third operand address identifiers respectively selective for the second and third operand value in the data store, thereby obviating explicit operations corresponding to the third and fifth virtual machine instructions.

9. An apparatus, as recited in claim 1,
wherein the instruction decoder further identifies fourth and sixth virtual machine instructions in the foldable sequence, the fourth and sixth virtual machine instructions respectively being for popping first and second results of the second virtual machine instruction from the operand stack and storing the first and second results in respective first and second result locations of the data store; and wherein the single folded operation equivalent to the foldable sequence includes first and second destination address identifiers respectively selective for the first and second result locations in the data store, thereby obviating explicit operations corresponding to the fourth and sixth virtual machine instructions.

10. An apparatus, as recited in claim 1, wherein the foldable sequence comprises two or more virtual machine instructions.

11. An apparatus, as recited in claim 1, wherein the foldable sequence comprises four virtual machine instructions.

12. An apparatus, as recited in claim 1, wherein the foldable sequence comprises five virtual machine instructions.

13. An apparatus, as recited in claim 1, wherein the foldable sequence comprises more than five virtual machine instructions.

14. An apparatus, as recited in claim 1, wherein the virtual machine instruction decoder further comprises:
normal and folded decode paths; and
switching means responsive to the folded decode path for selecting operation, operand, and destination identifiers from the folded decode path in response to a fold indication therefrom, and for otherwise selecting operation, operand, and destination identifiers from the normal decode path.

15. An apparatus, as recited in claim 1, wherein the virtual machine instruction processor is a hardware virtual machine instruction processor and the virtual machine instruction decoder comprises decode logic.

16. An apparatus, as recited in claim 1, wherein the virtual machine instruction processor includes a just-in-time compiler implementation and the virtual machine instruction decoder comprises software executable on a hardware processor, the hardware processor including the execution unit.

17. An apparatus, as recited in claim 1, wherein the virtual machine instruction processor includes a bytecode interpreter implementation and the virtual machine instruction decoder comprises software executable on a hardware processor, the hardware processor including the execution unit.

18. A method for decoding virtual machine instructions in a virtual machine instruction processor the method comprising:
(a) determining if a first virtual machine instruction of a virtual machine instruction sequence is an instruction for pushing a first operand value onto the operand stack fom a data store merely as a first source operand for a second virtual machine instruction;

if the result of the (a) determining is affirmative, supplying an execution unit with a single folded operation equivalent to a foldable sequence comprising the first and second virtual machine instructions, the single folded operation including a first operand identifier selective for the first operand value, thereby obviating an explicit operation corresponding to the first virtual machine instruction; and if the result of the (a) determining is negative, supplying the execution unit with an operation equivalent to the first virtual machine instruction in the virtual machine instruction sequence.

19. A method as recited in claim 18, further comprising:
(b) determining if a third virtual machine instruction of the virtual machine instruction sequence is an instruction for popping a result value of the second virtual machine instruction from the operand stack and storing the result value in a result location of the data store; and if the result of the (b) determining is affirmative, further including a result identifier selective for the result location with the equivalent single folded operation, thereby further obviating an explicit operation corresponding to the third virtual machine instruction.

20. A method as recited in claim 19, further comprising:
if the result of the (b) determining is negative, including a result identifier selective for a top location of the operand stack with the equivalent single folded operation.

21. A method as recited in claim 18, wherein the (a) determining includes:
(a1) determining if the first virtual machine instruction is for pushing the first operand value onto the operand stack from the data store; and
(a2) determining if the second virtual machine instruction is for operating on first operand value on operand stack and pushing a result value of the second virtual machine instruction onto the operand stack such the first operand value is no longer represented in the uppermost entries of the operand stack.

22. A method as recited in claim 21, further comprising:
performing the (a1) determining and the (a2) determining substantially in parallel.

23. A method as recited in claim 21, further comprising:
performing the (a) determining and the (b) determining substantially in parallel.

24. A stack-based virtual machine implementation comprising:
a randomly-accessible operand stack representation;
a randomly-accessible local variable storage representation;
a virtual machine instruction decoder for selectively decoding virtual machine instrnctions and folding together a selected sequence thereof to eliminate unnecessary temporary storage of operands on the operand stack; and a hardware virtual machine instruction processor including a hardware stack cache, a hardware virtual machine instruction decoder, and an execution unit;

wherein the randomly-accessible operand stack local variable storage representations at least partially reside in the hardware stack cache, wherein the virtual machine instruction decoder comprises the hardware instruction decoder coupled to provide the execution unit with Op-code, operand, and result identifiers respectively selective for a hardware virtual machine instruction processor operation and for locations in the hardware stack cache as a single hardware virtual machine instruction processor operation equivalent to the selected sequence of virtual machine instructions.

25. A stack-based virtual machine implementation, as recited in claim 24, further comprising:

software encoded in a computer readable medium and executable on a hardware processor;

wherein the randomly-accessible operand stack local variable storage representations at least partially reside in registers of the hardware processor, wherein the virtual machine instruction decoder is at least partially implemented in the software, and wherein the virtual machine instruction decoder is coupled to provide opcode, operand, and result identifiers respectively selective for a hardware processor operation and for locations in the registers as a single hardware processor operation equivalent to the selected sequence of virtual machine instructions.

26. A hardware virtual machine instruction processor comprising:

an instruction cache unit including:
    an instruction cache; and
    an instruction buffer;

an integer execution unit including:
    an instruction decode unit comprising:
        a normal decode path;
        a fold decode path for decoding a sequence of virtual machine instructions from the instruction buffer and, if the sequence is foldable, supplying a single operation identifier, operand identifiers, and a destination identifier together equivalent to the sequence of virtual machine instructions; and
        a switch complex responsive to the folded decode path for selecting operation, operand, and destination identifiers from the folded decode path in response to a foldable sequence indication therefrom, and otherwise selecting operation, operand, and destination identifiers from the normal decode path;
    an integer unit coupled to the switch complex for executing in accordance with operation, operand and destination identifiers selected thereby; and
    a stack management unit coupled to the integer execution unit for representing operand stack and data store locations identified by the selected operand and destination identifiers.

* * * * *